US008213957B2

(12) United States Patent  
Bull et al.

(10) Patent No.: US 8,213,957 B2
(45) Date of Patent: Jul. 3, 2012

(54) NETWORK AUTONOMOUS WIRELESS LOCATION SYSTEM

(75) Inventors: Jeffrey F. Bull, Chalfont, PA (US); Matthew L. Ward, Collegeville, PA (US)

(73) Assignee: TruePosition, Inc., Berwyn, PA (US)

(*) Notice: Subject to any disclaimer, the term of this patent is extended or adjusted under 35 U.S.C. 154(b) by 533 days.

(21) Appl. No.: 12/428,325

(22) Filed: Apr. 22, 2009

(65) Prior Publication Data

US 2010/0273504 A1    Oct. 28, 2010

(51) Int. Cl.
*H04W 24/00*        (2009.01)
(52) U.S. Cl. ............... 455/456.1; 455/414.1; 455/436; 455/450; 370/328; 370/331; 370/338
(58) Field of Classification Search ............... 455/456.1, 455/414.1, 436, 450; 370/328, 338, 331
See application file for complete search history.

(56) References Cited

U.S. PATENT DOCUMENTS

| | | |
|---|---|---|
| 3,876,980 A | 4/1975 | Haemmig et al. |
| 3,921,076 A | 11/1975 | Currie |
| 4,053,890 A | 10/1977 | Woodson, III et al. |
| 4,083,003 A | 4/1978 | Haemmig |
| 4,169,245 A | 9/1979 | Crom et al. |
| RE31,254 E | 5/1983 | Brodeur |
| 4,404,655 A | 9/1983 | Naiff |
| 4,667,203 A | 5/1987 | Counselman, III |
| 4,728,958 A | 3/1988 | Choate |
| 4,728,959 A | 3/1988 | Maloney et al. |
| 4,740,792 A | 4/1988 | Sagey et al. |
| 4,894,662 A | 1/1990 | Counselman, III |
| 4,899,117 A | 2/1990 | Vig |
| 4,912,475 A | 3/1990 | Counselman, III |
| 5,046,066 A | 9/1991 | Messenger |
| 5,058,200 A | 10/1991 | Huang et al. |
| 5,119,104 A | 6/1992 | Heller |
| 5,155,590 A | 10/1992 | Beyers, II et al. |
| 5,191,342 A | 3/1993 | Alsup et al. |
| 5,208,756 A | 5/1993 | Song |

(Continued)

FOREIGN PATENT DOCUMENTS

EP    0 473 373 A2    3/1992

(Continued)

OTHER PUBLICATIONS

International Patent Application No. PCT/US2010/028951: International Search Report, dated Jun. 2, 2010, 5 pages.

(Continued)

*Primary Examiner* — Amancio Gonzalez
(74) *Attorney, Agent, or Firm* — Woodcock Washburn LLP

(57) ABSTRACT

A Network Autonomous Wireless Location System (NAWLS) is designed to allow for precise location of a mobile device (e.g., a cell phone) without interconnection to, and with minimal disruption of, the local wireless communications network. Using distributed radio network monitors (RNM) and a managed network emulator (NE); mobile devices are sampled, acquired or captured. Once triggered by the RNM or NE, an untethered wireless location system (U-WLS) is used to calculate a precise location. The U-WLS; comprising mobile receiver sites, each capable of self location, exchanging information with other components of the NAWLS, and receiving or exchanging signals from the mobile device; utilizes various network-based and handset-based wireless location techniques dependent on the deployed options. In addition, the NAWLS includes data links interconnecting the U-WLS, NE and RNM.

60 Claims, 23 Drawing Sheets

U.S. PATENT DOCUMENTS

| | | | |
|---|---|---|---|
| 5,216,429 A | 6/1993 | Nakagawa et al. |
| 5,235,341 A | 8/1993 | Effland et al. |
| 5,248,982 A | 9/1993 | Reinhardt et al. |
| 5,251,232 A | 10/1993 | Nonami |
| 5,265,121 A | 11/1993 | Stewart |
| 5,293,170 A | 3/1994 | Lorenz et al. |
| 5,311,173 A | 5/1994 | Komura et al. |
| 5,317,323 A | 5/1994 | Kennedy et al. |
| 5,327,144 A | 7/1994 | Stilp et al. |
| 5,335,250 A | 8/1994 | Dent et al. |
| 5,343,431 A | 8/1994 | Ohtsuka |
| 5,351,214 A | 9/1994 | Rouy |
| 5,384,574 A | 1/1995 | Counselman |
| 5,400,344 A | 3/1995 | Mori |
| 5,402,347 A | 3/1995 | McBurney et al. |
| 5,428,621 A | 6/1995 | Mehrotra et al. |
| 5,428,666 A | 6/1995 | Fyfe et al. |
| 5,428,667 A | 6/1995 | Easterling et al. |
| 5,442,806 A | 8/1995 | Barber et al. |
| 5,463,400 A | 10/1995 | Tayloe |
| 5,469,409 A | 11/1995 | Anderson et al. |
| 5,477,229 A | 12/1995 | Caille et al. |
| 5,487,185 A | 1/1996 | Halonen |
| 5,490,073 A | 2/1996 | Kyrtsos |
| 5,499,031 A | 3/1996 | Bodonyi |
| 5,500,648 A | 3/1996 | Maine et al. |
| 5,512,908 A | 4/1996 | Herrick |
| 5,515,062 A | 5/1996 | Maine et al. |
| 5,515,419 A | 5/1996 | Sheffer |
| 5,521,902 A | 5/1996 | Ferguson |
| 5,526,357 A | 6/1996 | Jandrell |
| 5,539,694 A | 7/1996 | Rouy |
| 5,553,101 A | 9/1996 | Lim et al. |
| 5,557,547 A | 9/1996 | Phaal |
| 5,570,099 A | 10/1996 | DesJardins |
| 5,577,087 A | 11/1996 | Furuya |
| 5,588,027 A | 12/1996 | Lim |
| 5,592,480 A | 1/1997 | Carney et al. |
| 5,602,903 A | 2/1997 | LeBlanc |
| 5,606,527 A | 2/1997 | Kwack et al. |
| 5,606,548 A | 2/1997 | Vayrynen et al. |
| 5,606,575 A | 2/1997 | Williams |
| 5,608,410 A | 3/1997 | Stilp et al. |
| 5,612,949 A | 3/1997 | Bennett |
| 5,614,862 A | 3/1997 | Sun |
| 5,619,212 A | 4/1997 | Counselman, III |
| 5,621,664 A | 4/1997 | Phaal |
| 5,623,414 A | 4/1997 | Misra |
| 5,629,707 A | 5/1997 | Heuvel et al. |
| 5,655,217 A | 8/1997 | Lemson |
| 5,668,837 A | 9/1997 | Dent |
| 5,726,972 A | 3/1998 | Ferguson |
| 5,729,235 A | 3/1998 | Guthrie et al. |
| 5,732,387 A | 3/1998 | Armbruster et al. |
| 5,734,487 A | 3/1998 | Rossi |
| 5,748,545 A | 5/1998 | Lee et al. |
| 5,757,767 A | 5/1998 | Zehavi |
| 5,774,802 A | 6/1998 | Tell |
| 5,786,790 A | 7/1998 | Abbott |
| 5,805,200 A | 9/1998 | Counselman, III |
| 5,812,522 A | 9/1998 | Lee et al. |
| 5,812,609 A | 9/1998 | McLochlin |
| 5,844,522 A | 12/1998 | Sheffer et al. |
| 5,859,612 A | 1/1999 | Gilhousen |
| 5,861,842 A | 1/1999 | Hitch et al. |
| 5,874,916 A | 2/1999 | DesJardins |
| 5,884,175 A | 3/1999 | Schiefer et al. |
| 5,887,259 A | 3/1999 | Zicker et al. |
| 5,890,068 A | 3/1999 | Fattouche et al. |
| 5,917,315 A | 6/1999 | Weckstrom |
| 5,918,172 A | 6/1999 | Saunders et al. |
| 5,918,180 A | 6/1999 | Dimino |
| 5,920,278 A | 7/1999 | Tyler et al. |
| 5,924,026 A | 7/1999 | Krishnan |
| 5,926,133 A | 7/1999 | Green |
| 5,926,763 A | 7/1999 | Greene et al. |
| 5,930,729 A | 7/1999 | Khamis et al. |
| 5,936,571 A | 8/1999 | DesJardins |
| 5,943,014 A | 8/1999 | Gilhousen |
| 5,946,618 A | 8/1999 | Agre et al. |
| 5,949,871 A | 9/1999 | Kabay et al. |
| 5,973,643 A | 10/1999 | Hawkes et al. |
| 5,999,808 A | 12/1999 | LaDue |
| 6,006,068 A | 12/1999 | Elkin et al. |
| 6,014,102 A | 1/2000 | Mitzlaff et al. |
| 6,031,418 A | 2/2000 | Fowler |
| 6,034,635 A | 3/2000 | Gilhousen |
| 6,035,202 A | 3/2000 | Camp |
| 6,047,192 A | 4/2000 | Maloney et al. |
| 6,061,565 A | 5/2000 | Innes et al. |
| 6,061,631 A | 5/2000 | Zhang |
| 6,088,586 A | 7/2000 | Haverty |
| 6,088,587 A | 7/2000 | Abbadessa |
| 6,091,362 A | 7/2000 | Stilp et al. |
| 6,097,336 A | 8/2000 | Stilp |
| 6,107,959 A | 8/2000 | Levanon |
| 6,108,555 A | 8/2000 | Maloney et al. |
| 6,115,596 A | 9/2000 | Raith et al. |
| 6,115,599 A | 9/2000 | Stilp |
| 6,115,834 A | 9/2000 | Jen et al. |
| 6,119,000 A | 9/2000 | Stephenson et al. |
| 6,119,013 A | 9/2000 | Maloney et al. |
| 6,133,868 A | 10/2000 | Butler et al. |
| 6,148,211 A | 11/2000 | Reed et al. |
| 6,157,343 A | 12/2000 | Andersson et al. |
| 6,172,644 B1 | 1/2001 | Stilp |
| 6,184,829 B1 | 2/2001 | Stilp |
| 6,236,365 B1 | 5/2001 | LeBlanc et al. |
| 6,236,856 B1 | 5/2001 | Abbadessa |
| 6,249,252 B1 | 6/2001 | Dupray |
| 6,266,013 B1 | 7/2001 | Stilp et al. |
| 6,266,014 B1 | 7/2001 | Fattouche et al. |
| 6,281,834 B1 | 8/2001 | Stilp |
| 6,285,321 B1 | 9/2001 | Stilp et al. |
| 6,298,050 B1 | 10/2001 | Van Heeswyk et al. |
| 6,317,081 B1 | 11/2001 | Stilp |
| 6,317,604 B1 | 11/2001 | Kovach, Jr. et al. |
| 6,321,090 B1 | 11/2001 | Soliman |
| 6,334,059 B1 | 12/2001 | Stilp et al. |
| 6,351,235 B1 | 2/2002 | Stilp |
| 6,385,185 B1 | 5/2002 | Huang |
| 6,388,618 B1 | 5/2002 | Stilp et al. |
| 6,400,320 B1 | 6/2002 | Stilp et al. |
| 6,430,397 B1 | 8/2002 | Willrett |
| 6,433,740 B1 | 8/2002 | Gilhousen |
| 6,463,290 B1 | 10/2002 | Stilp et al. |
| 6,483,460 B2 | 11/2002 | Stilp et al. |
| 6,487,179 B1 | 11/2002 | Leung |
| 6,492,944 B1 | 12/2002 | Stilp |
| 6,519,465 B2 | 2/2003 | Stilp et al. |
| 6,526,267 B1 | 2/2003 | Jokimies et al. |
| 6,539,229 B1 | 3/2003 | Ali |
| 6,563,460 B2 | 5/2003 | Stilp et al. |
| 6,603,428 B2 | 8/2003 | Stilp |
| 6,646,604 B2 | 11/2003 | Anderson |
| 6,661,379 B2 | 12/2003 | Stilp et al. |
| 6,765,531 B2 | 7/2004 | Anderson |
| 6,782,264 B2 | 8/2004 | Anderson |
| 6,873,290 B2 | 3/2005 | Anderson et al. |
| 7,013,147 B1 | 3/2006 | Kuwahara et al. |
| 7,023,383 B2 | 4/2006 | Stilp et al. |
| 7,072,656 B2 | 7/2006 | Willars et al. |
| 7,167,713 B2 | 1/2007 | Anderson |
| 7,187,905 B2 | 3/2007 | Immonen et al. |
| 7,271,765 B2 | 9/2007 | Stilp et al. |
| 7,315,567 B2 | 1/2008 | Sequeira |
| 7,427,952 B2 | 9/2008 | Bull et al. |
| 7,440,762 B2 | 10/2008 | Maloney et al. |
| 2002/0039904 A1 | 4/2002 | Anderson |
| 2002/0172223 A1 | 11/2002 | Stilp |
| 2003/0064734 A1 | 4/2003 | Stilp et al. |
| 2004/0203429 A1 | 10/2004 | Anderson et al. |
| 2006/0003775 A1 | 1/2006 | Bull et al. |
| 2006/0030333 A1 * | 2/2006 | Ward et al. ............ 455/456.1 |
| 2006/0135174 A1 | 6/2006 | Kraufvelin et al. |
| 2006/0262011 A1 * | 11/2006 | Bull et al. ............ 342/357.06 |
| 2007/0042784 A1 * | 2/2007 | Anderson ............ 455/450 |

| | | | |
|---|---|---|---|
| 2008/0056223 | A1* | 3/2008 | Manser .................. 370/342 |
| 2008/0132244 | A1 | 6/2008 | Anderson |
| 2008/0132247 | A1 | 6/2008 | Anderson |
| 2008/0139244 | A1* | 6/2008 | Vau et al. .............. 455/556.1 |
| 2008/0158059 | A1 | 7/2008 | Bull et al. |
| 2008/0220749 | A1 | 9/2008 | Pridmore et al. |
| 2010/0087204 | A1* | 4/2010 | Islam et al. ............. 455/456.1 |

FOREIGN PATENT DOCUMENTS

| | | |
|---|---|---|
| EP | 0 598 484 A2 | 5/1994 |
| EP | 0 621 734 A2 | 10/1994 |
| EP | 0 658 032 A1 | 6/1995 |
| EP | 0 669 771 A1 | 8/1995 |
| EP | 0 688 122 A1 | 12/1995 |
| EP | 0 792 074 A2 | 8/1997 |
| EP | 0 805 608 A1 | 11/1997 |
| EP | 0 805 609 A2 | 11/1997 |
| EP | 0 836 312 A2 | 4/1998 |
| EP | 0 848 567 A1 | 6/1998 |
| EP | 0 920 228 A1 | 6/1999 |
| EP | 1 093 312 A2 | 4/2001 |
| EP | 1 195 916 A2 | 4/2002 |
| EP | 1051053 | 9/2003 |
| FR | 2 772 927 A1 | 6/1999 |
| GB | 2354129 A | 3/2001 |
| JP | 61-209382 | 9/1986 |
| JP | H06-265623 | 9/1994 |
| JP | H08-508381 | 9/1996 |
| JP | H08-313278 | 11/1996 |
| JP | H10-500771 | 1/1998 |
| JP | H10-185600 | 7/1998 |
| JP | H10-512671 | 12/1998 |
| JP | 2001-166026 | 6/2001 |
| WO | WO 94/27160 | 11/1994 |
| WO | WO 96/25673 | 8/1996 |
| WO | WO 97/04530 | 2/1997 |
| WO | WO 97/44920 | 11/1997 |
| WO | WO 97/47148 | 12/1997 |
| WO | WO 98/10306 | 3/1998 |
| WO | WO 98/47019 | 10/1998 |
| WO | WO 99/31925 | 6/1999 |
| WO | WO 99/33303 | 7/1999 |
| WO | WO 00/40991 | 7/2000 |
| WO | WO 00/40992 | 7/2000 |
| WO | WO 00/40993 | 7/2000 |
| WO | WO 00/41319 | 7/2000 |
| WO | WO 00/41402 | 7/2000 |
| WO | WO 00/41403 | 7/2000 |
| WO | WO 00/41404 | 7/2000 |
| WO | WO 00/41417 | 7/2000 |
| WO | WO 01/56308 | 8/2001 |
| WO | WO 01/56308 A2 | 8/2001 |
| WO | WO 01/71927 | 9/2001 |
| WO | WO 01/76093 | 10/2001 |
| WO | WO 01/91399 | 11/2001 |
| WO | WO 02/30089 | 4/2002 |
| WO | WO 03/071303 | 8/2003 |
| WO | WO 03/084079 | 10/2003 |
| WO | WO 2004/015878 | 2/2004 |
| WO | WO 2004/034721 | 4/2004 |
| WO | WO 2004/092762 | 10/2004 |
| WO | WO 2006/135542 | 12/2006 |

OTHER PUBLICATIONS

3GPP TS 25.305, "User Equipment (UE) Positioning in Universal Terrestrial Radio Access Network (UTRAN) Stage 2," Mar. 2002 (50 pages).
J-STD-036. "Enhanced Wireless 9-1-1 Phase II," Jun. 2002 (294 pages).
3GPP TS 04.08, "Mobile radio interface layer 3 specification," Dec. 2003 (623 pages).
FCC Order on Reconsideration #FCC 07-177 "Recommendations of the Independent Panel Reviewing the Impact of Hurricane Katrina on Communications Networks," Adopted: Oct. 2, 2007, (36 pages).
3GPP TS 43.059, "Functional Stage 2 description of Location Services (LCS) in GERAN," Nov. 2007 (69 pages).
3GPP TS 24.008, "Mobile radio interface Layer 3 specification; Core network protocols; Stage 3," Dec. 2007 (550 pages).
3GPP TS 23.882, "3GPP System Architecture Evolution: Report on Technical Options and Conclusions (Release 8)," Sep. 2008 (234 pages).
U.S. Appl. No. 11/948,244, "Automated Configuration of a Wireless Location System," filed Nov. 30, 2007, (38 pages).
U.S. Appl. No. 12/192,057, "Hybrid GNSS and TDOA Wireless Location System," filed Aug. 14, 2008, (44 pages).
U.S. Appl. No. 09/228,215, filed Jan. 11, 1999, Stilp, et al.
U.S. Appl. No. 09/228,673, filed Jan. 12, 1999, Stilp, et al.
U.S. Appl. No. 09/539,363, filed Mar. 31, 2000, Stilp, et al.
U.S. Appl. No. 09/595,687, filed Jun. 16, 2000, Stilp, et al.
Al Midfa, et al., "Performance Evaluation of Direction-of-Arrival (DOA) Estimation Algorithms for Mobile Communication Systems," IEEE: VTC, 2000, pp. 1055-1059.
ANSI TIA/EIA Standard IS 553A, Jun. 2003, 137 pages.
CDMA—EIA/TIA Standard IS-95A; ANSI J-STD-008, May 1995, 654 pages.
Chester, et al., "VLSI Implementation of a Wide Band, High Dynamic Range Digital Drop Receiver," IEEE, 1991, pp. 1605-1608.
Choi, "Alternating Projection for Maximum-Likelihood Source Localization Using Eigendecomposition," IEEE Signal Processing Letters 6(4), Apr. 1999, pp. 73-75.
Civil Action No. 01-0823-GMS, *True Position, KSI Inc.*, vs. *Allen Telecom, Inc.*, Mar. 11, 2003, 1-48 and 1-32 pages of index.
Clark, et al., "Precision Geodesy Using the Mark-III Very-Long-Baseline Interferometer System," IEEE Trans. on Geoscience and Remote Sensing GE-23(4), 1985, pp. 438-449.
Clark, et al., "Synchronization of Clocks by Very-Long-Baseline Interferometry," IEEE Trans. on Instrumentation and Measurement IM-28(3), 1979, pp. 184-187.
Counselman, III, "Array Antennas," IEEE AES Systems Mag. 23(12), 1998, pp. 15-19.
EPO Application No. EP 10 15 3860: European Search Report dated Jun. 15, 2010.
Friedlander, "Sensitivity Analysis of the Maximum Likelihood Direction-Finding Algorithm," IEEE Trans. on Aerospace and Electronic Systems 26(6), Nov. 1990, pp. 953-968.
Fudge, et al., "Derivative constraints for high resolution direction finding with correlated interfaces," SPIE 2750, 1996, pp. 76-87.
Greater Harris County 9-1-1 Emergency Network, "A Sneak Preview of Future Emergency Services & Cellular Phone Usage," Dec. 11, 1996, 3 pages.
GSM Association, "Terms & Acronyms" published by the GSM Association 2005 http://www.gsmworld.com/technology/glossary.shtml, 27 pages.
Hahn, et al., "Optimum Processing for Delay-Vector Estimation in Passive Signal Arrays," IEEE Trans. on Information Theory IT-19(5), Sep. 1973, pp. 608-614.
Interferometrics, Inc., Cellular Radiolocation System, Abbreviated Report—Phase 3, May 10, 1993, pp. 1-9.
Japanese Application 2000-592658: Notice of Reason for Rejection dated May 14, 2009.
Japanese Application 2000-592660: Notice of Reason for Rejection dated Feb. 25, 2010.
Japanese Patent Application No. 2009-288640: Notice of Reason for Rejection dated Jul. 5, 2010.
Kaveh, et al., "The Statistical Performance of the Music and the Minimum-Norm Algorithms in Resolving Plane Waves in Noise," Trans. on Acoustics Speech and Signal Processing ASSP34(2), Apr. 1986, pp. 331-341.
Kelley, et al., "Array Antenna Pattern Modeling Methods That Include Mutual Coupling Effects," IEEE Trans. on Antennas and Propagation 41(12), Dec. 1993, pp. 1625-1632.
Kennedy, et al., "Direction Finding and "Smart Antennas" Using Software Radio Architectures," IEEE Communications Magazine, May 1995, pp. 62-68.
Klukas, et al., "Line-of-Sight Angle of Arrival Estimation in the Outdoor Multipath Environment," IEEE Trans. on Vehicular Technology 47(1), Feb. 1998, pp. 342-351.
Krim, et al., "Two Decades of Array Signal Processing Research," IEEE Signal Processing Magazine, Jul. 1996, pp. 67-93.

Mobile Station—Land Station Compatibility Standard for Dual-Mode Narrowband Analog Cellular Technology, TIA/EIA Standard IS-88, Jan. 1993, 113 pages.

Mouly, et al., "The Pseudo-Synchronisation, a Costless Feature to Obtain the Gains of a Synchronised Cellular Network," 1997, pp. 51-55.

Muhamed, et al., "Comparison of Conventional Subspace-Based DOA Estimation Algorithms with Those Employing Property-Restoral Techniques: Simulation and Measurements," IEEE, 1996, pp. 1004-1008.

Oh, et al., "Efficient Realisation of Alternating Projection Algorithm for Maximum Likelihood Direction Finding," Electronics Letters 25(20), Sep. 1989, pp. 1325-1326.

Ozanich, (correspondence author), "Wireless Integration Project: Texas 9-1-1 Professionals from Government Industry Telecommunications," Oct. 3, 1996, 5 pages.

PCT Application No. PCT/US2010/028951: International Search Report dated Jun. 2, 2010.

Press Release, "Report on the New Jersey Wireless Enhanced 911 System Trial Jan. 22 to Apr. 30, 1997 The First 100 Days," Jun. 16, 1997, 32 pages.

Press Release, "TruePosition, Inc. Signs Contract with Greater Harris County 9-1-1 Emergency; Network for Wireless E9-1-1 Phase 2 Services in Houston; First Commercial Implementation of Wireless Location System," Jun. 19, 1998, 2 pages.

Rappaport, et al., "Position Location Using Wireless Communications on Highways of the Future," IEEE Communications Magazine, Oct. 1996, pp. 33-41.

Rogers, "Phase and Group Delay Calibration of a Very Long Baseline Interferometer by East Coast VLBI Group," NASA Conference Publication: Radio Interferometry Techniques for Geodesy 2115, 1979, pp. 255-261.

Roller, et al., "Effects of Mutual Coupling on Super-Resolution DF in Linear Arrays," IEEE, 1992, pp. V-257-V-260.

Roy, et al., "ESPIRT—Estimation of Signal Parameters Via Rotational Invariance Techniques," IEEE, 1989, pp. 984-995.

Shan, et al., "On Spatial Smoothing for Direction-of-Arrival Estimation of Coherent Signals," IEEE Trans. on Speech and Signal Processing ASSP-33(4), Aug. 1985, pp. 806-811.

Sheinvald, et al., "Direction Finding with Fewer Receivers via Time-Varying Preprocessing," IEEE Trans. on Signal Processing 47(1), Jan. 1999, pp. 2-9.

Sheinvald, et al., "Localization of Multiple Sources with Moving Arrays," IEEE Trans. on Signal Processing 46(10), Oct. 1998, pp. 2736-2743.

Song, "Automatic Vehicle Location in Cellular Communications Systems," IEEE Trans. on Vehicular Technol. 43(4), 1994, pp. 1-6.

State of New Jersey Department of Law and Public Safety Division of State Police, "Report on the New Jersey Wireless Enhanced 911 System Trial Jan. 22 to Apr. 30, 1997 The First 100 Days," Jun. 16, 1997, 33 pages.

Stilp, "Time Difference of Arrival Technology for Locating Narrowband Cellular Signals," Proceedings of the SPIE, 1996, pp. 134-144.

Stoica, et al., "Maximum Likelihood Methods for Direction-of-Arrival Estimation," IEEE Trans. on Acoustics Speech and Signal Processing 38(7), Jul. 1990, pp. 1132-1143.

Stoica, et al., "MUSIC, Maximum Likelihood, and Cramer-Rao Bound," IEEE Trans. on Acoustics Speech and Signal Processing 37(5), May 1989, pp. 720-741.

Stoica, et al., "MUSIC, Maximum Likelihood, and Cramer-Rao Bound: Further Results and Comparisons," IEEE Trans. on Acoustics Speech and Signal Processing 38(12), Dec. 1990, pp. 2140-2150.

Stoica, et al., "Performance Study of Conditional and Unconditional Direction-of-Arrival Estimation," IEEE Trans. on Acoustics Speech and Signal Processing 18(10), Oct. 1990, pp. 1783-1795.

Stoica, et al., "Novel Eigenanalysis Method for Direction Estimation," IEEE Proceedings 137(F1), Oct. 1989, 8 pages.

Swasey, "911 Demo Is 'A Success,'" Wireless Week, Jan. 27, 1997, 1 page.

TDMA—Third Generation Wireless; EIA/TIA Standard ANSI/TIA-136-000-E, Jan. 14, 2004, 65 pages.

Technical Report GSM 01.04 V8.0.0 (May 2000), Digital cellular telecommunications system (Phase 2+); version 8.0.0 (Release 1999); Abbreviations and acronyms, May 2000, 17 pages.

Texas Wireless Integration Project, "World Premier Presentations and Demonstrations of Technology," Houston, Texas, Dec. 5-11-12, 1996, pp. 1-29.

Triton PCS License Company L.L.C., Phase II E911 Implementation Report, May 1, 2003, 12 pages.

TruePosition Cellular Location System, "Wireless Location for Enhanced 911 Emergency Services: Responses to Bell South Wireless, Inc.; Industry Request for Information," Apr. 19, 1996, pp. 1-61.

*TruePosition, Inc. and KSI, Inc.*, v. *Allen Telecom, Inc.*, C.A. No. 01-0823-GMS, "Defendant's Response to Plaintiff's First Set of Interrogatories," Apr. 1, 2002, pp. 1-20.

*TruePosition, Inc. and KSI, Inc.*, v. *Allen Telecom, Inc.*, C.A. No. 01-0823-GMS, "Defendant's Supplemented Response to Interrogatory No. 4," Jul. 12, 2002, 4 pages.

*TruePosition, Inc. and KSI, Inc.*, v. *Allen Telecom, Inc.*, C.A. No. 01-0823-GMS, Deposition of Joseph Kennedy, May 14, 2002, pp. 1-27, 31-53, 63-75, 81-86, 90-100, 105-110, 116-121, 124, 149-150, 152-158, 164-165, 167-221, and 224-260.

TruePosition, Inc., "Best Effort Scenario for Call Routing and Final Location," Aug. 7, 2002, 3 pages.

TruePosition, Inc., "Progressive Position for Call Routing by Non-Wideband PDEs," Jul. 31, 2002, 3 pages.

TruePosition, Inc., "TR-45: Enhanced Wireless J-STD-036-A 1 9-1-1 Phase 2," Aug. 2000, 28 pages.

TruePosition, Inc., "TR-45: Enhanced Wireless TIA/EIA/J-STD-036-A 1 9-1-1 Phase 2," Aug. 2000, Contents, Chapters 1-9, and Annexes A-H.

TruePosition, Inc., Telecommunications Industry Associate, "J-STD-036 Suggested Improvements and Workplan," Jul. 9, 2002, 2 pages.

TruePosition™ Cellular Location System, "System Specification," Apr. 20, 1995, pp. 1-31.

United Kingdom App. No. GB 0723933, Patent Acts Examination Report Under Section 18(3), Jun. 23, 2009, 3 pages.

Van Veen, et at., "Beamforming: A Versatile Approach to Spatial Filtering," IEEE ASSP Magazine, Apr. 1988, pp. 4-24.

Viberg, et al., "Detection and Estimation in Sensor Arrays Using Weighted Subspace Fitting," IEEE Trans. on Signal Processing 39(11), Nov. 1991, pp. 2436-2449.

Viberg, et al., "Sensor Array Processing Based on Subspace Fitting," IEEE Trans. on Signal Processing 39(5), May 1991, 1110-1121.

Wang, et al., "On the Performance of Signal-Subspace Processing—Part I: Narrow-Band Systems," IEEE Trans. on Acoustics, Speech, and Signal Processing, Oct. 1986, ASSP-34(5), pp. 1201-1209.

Warner, "Vendor to Give Houston First Phase II E911 System," Wireless Week, Jun. 29, 1998, 1 page.

Wax, et al., "A New Least Squares Approach to Blind Beamforming," IEEE, 1997, 3477-3480.

Yang, et al., "DF Directed Multipath Equalization," IEEE, 1995, 1418-1422.

Zoltowski, et al., "A Vector Space Approach to Direction Finding in a Coherent Multipath Environment," IEE Trans. on Antennas and Propagation AP-34(9), Sep. 1986, pp. 1069-1107.

* cited by examiner

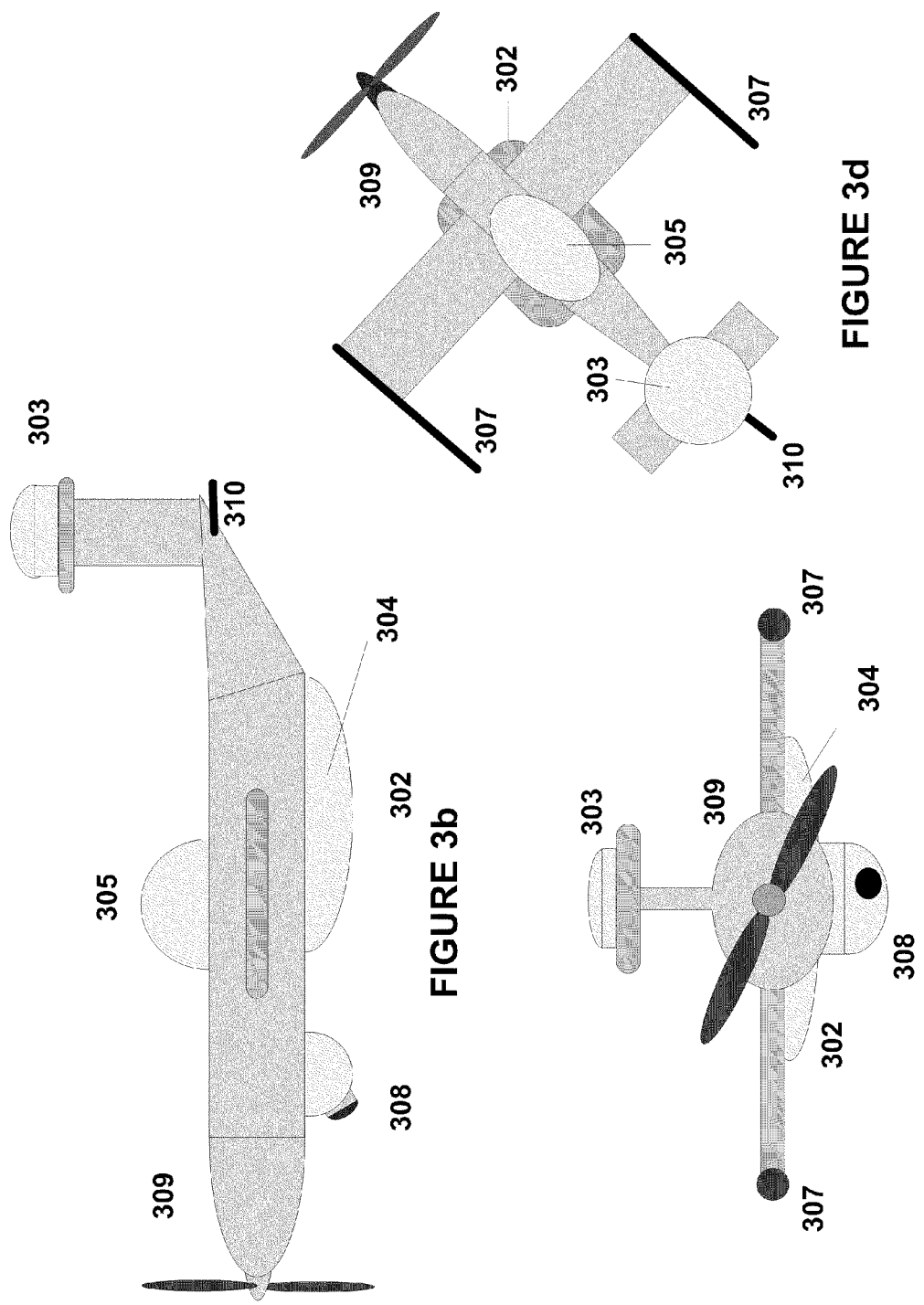

NETWORK AUTONOMOUS WIRELESS LOCATION SYSTEM

CROSS REFERENCE

This application is related by subject matter to U.S. application Ser. No. 11/198,996, filed Aug. 8, 2005, entitled "Geo-Fencing in a Wireless Location System" (the entirety of which is hereby incorporated by reference), which is a continuation of U.S. application Ser. No. 11/150,414, filed Jun. 10, 2005, entitled "Advanced Triggers for Location Based Service Applications in a Wireless Location System," which is a continuation-in-part of U.S. application Ser. No. 10/768,587, filed Jan. 29, 2004, entitled "Monitoring of Call Information in a Wireless Location System," now U.S. Pat. No. 7,167,713, which is a continuation of U.S. application Ser. No. 09/909,221, filed Jul. 18, 2001, entitled "Monitoring of Call Information in a Wireless Location System," now U.S. Pat. No. 6,782,264 B2, which is a continuation-in-part of U.S. application Ser. No. 09/539,352, filed Mar. 31, 2000, entitled "Centralized Database for a Wireless Location System," now U.S. Pat. No. 6,317,604 B1, which is a continuation of U.S. application Ser. No. 09/227,764, filed Jan. 8, 1999, entitled "Calibration for Wireless Location System," now U.S. Pat. No. 6,184,829 B1.

TECHNICAL FIELD

The present invention relates generally to methods and apparatus for locating wireless devices, also called mobile stations (MS), such as those used in analog or digital cellular systems, personal communications systems (PCS), enhanced specialized mobile radios (ESMRs), and other types of wireless communications systems. More particularly, but not exclusively, the present invention relates to locating mobile devices without connection to the underlying wireless communications network.

BACKGROUND

A goal of the present invention is to provide an ad hoc network-autonomous wireless location system (NAWLS) capable identifying and locating mobile devices. These network autonomous systems will preferably be used for law enforcement and disaster recovery purposes to acquire the MS identifiers, such as the TMSI, IMEI, and IMSI (i.e., the Temporary Mobile Subscriber Identity, International Mobile Station Equipment Identity, and International Mobile Subscriber Identity, respectively), and to locate the identified mobile devices. The subject matter of the present application relates to various systems in the wireless location and other related fields. This "background art" is briefly summarized below.

Network-Based Wireless Location Systems

Network-based wireless location systems (WLS) have in the past been deployed either as overlay networks or integrated into the wireless network infrastructure. These "in-network" solutions allow for location determination and wide area surveillance of mobile devices in commercial wireless networks. While "in-network" solutions offer powerful intelligence and law enforcement capability, it is not always possible to have a hard-wired connection to the networks of interest because the wireless networks use incompatible signaling transport, lack the requisite triggering-tasking-provisioning interface(s), or are simply non-cooperative. However, many of the location capabilities of "in-network" location solutions can be obtained without a hardwired connection to the wireless network(s) of interest.

One example of an early network-based WLS is described in U.S. Pat. No. 5,327,144, "Cellular Telephone Location System," Jul. 5, 1994. This TruePosition Inc. patent describes a cellular telephone location system for recording the location of one or more mobile cellular telephones. The disclosed system comprises three or more cell site systems, each located at a cell site of a cellular telephone system. Each cell site system includes an antenna that may be mounted on the same tower or building as the antenna employed by the cellular telephone system and equipment that may be housed in the equipment enclosure of the corresponding cell site. The cell site systems are coupled via T1 communication links to a central site. The central site may be collocated with the cellular telephone system's MTSO. The central site is further coupled to a database, which may be remotely located from the central site and made available to subscribers.

Another even earlier example is described in U.S. Pat. No. 4,728,959, "Direction Finding Localization System," Mar. 1, 1988 owned by the applicant. This patent describes a system combining the relative insensitivity of phase angle differences of a radio signal to the signal distortions inherent in an urban environment with digital signal processing techniques to produce an accurate and economical way to locate a mobile telephone in a cellular telephone network. Phase angle measurements indicative of the angle of direction of a mobile transmitter station from each of a plurality of land stations are obtained and are processed to produce a probability density function. The probability density functions are combined to produce an area of uncertainty representing the position of the mobile transmitter station.

Wireless Location System with Mobile LMU

Published patent application US20080158059A1, "Portable, Iterative Geolocation of RF Emitters," filed Dec. 27, 2006, owned by TruePosition Inc., discloses that iterative geolocation of a stationary RF emitter through the use of TDOA may include the use of a single portable geolocation sensor, a pair of portable geolocation sensors and three or more portable geolocation sensors. Adding portable geolocation sensors to the iterative process reduces the constraints on the signals to be located as well as providing a reduction in the number of iterations required to obtain improved location accuracy.

Advanced Triggers and Geo-Fencing

Published patent application US20060030333A1, "Geo-fencing in a Wireless Location System," filed Aug. 8, 2005, owned by TruePosition Inc., discloses methods employed by a WLS for locating a wireless device operating in a geographic area served by a wireless communications system. An exemplary method includes defining a geo-fenced area. The method then includes monitoring a set of predefined signaling links of the wireless communications system, and detecting that a mobile device has performed any of the following acts with respect to the geo-fenced area: (1) entered the geo-fenced area, (2) exited the geo-fenced area, and (3) come within a predefined degree of proximity near the geo-fenced area. A high-accuracy location function may then be triggered in order to determine the geographic location of the mobile device. In this application, the approach of changing the beacon settings of the operator network is described as a way to create geo-fenced areas for detection and localization of GSM and UMTS mobiles. Fundamentally, locating a mobile transmitter with networked receiver technology does not require a physical/wired connection with the network. As long as the geographically distributed receiver(s) can determine their own three-dimensional position, and their own three-dimensional velocity, if moving, while they are acquiring and collecting the signal of interest (SOI), then the transmitting mobile device(s) can be located. Thus, a network autonomous architecture of the kind described herein below offers the convenience of a "wireless only" connection to the network(s) of interest as well as the secondary advantage of portable and mobile operation since a hard-wired network connection is not required. The price to pay for this convenience is additional hardware and software compared to an in-network wireless location solution.

Published patent application US20060003775A1, "Advanced Triggers for Location-based Service Applications in a Wireless Location System," filed Jun. 10, 2005, owned by TruePosition Inc., discloses an exemplary method including monitoring a set of signaling links of a wireless communications system, and detecting at least one predefined signaling transaction occurring on at least one of the predefined signaling links. Then, in response to the detection of the at least one predefined network transaction, at least one predefined location service is triggered.

Automated Configuration using Downlink Receivers

Published patent application US20080132247A1, "System For Automatically Determining Cell Transmitter Parameters To Facilitate The Location Of Wireless Devices," filed Dec. 1, 2006, owned by TruePosition Inc., describes techniques for locating wireless devices involving the MS making measurements of the signals transmitted by geographically distributed base stations within a wireless network. If some key site information is known about these transmitters, such as the transmitter location, transmit signal power, signal propagation, and transmit signal timing, measurements of these transmit signals by a MS can be used to determine the position of the MS. An automatic method to detect transmitters, identify key transmitter information, and utilize the base station transmit signals to perform location is presented. In addition, this system facilitates the use of cell site transmit signals that are part of multiple wireless networks.

Published patent application US20080132244A1, "Subscriptionless Location Of Wireless Devices," filed Dec. 27, 2006, owned by TruePosition Inc., describes wireless location techniques involving a wireless device making measurements of signals transmitted by geographically distributed base stations within a wireless network. If some key site information is known about these transmitters, such as the transmitter location, transmit signal power, signal propagation, and transmit signal timing, measurements of these transmit signals by a device to be located can be used to determine the position of the device. In this example, all information exchange between the device and the location node is facilitated by a data link that is not provided by the wireless network providing signals used in the location estimation process. Accordingly, devices may be located based on downlink signal measurements made by the devices, where the devices are not part of the wireless network, are not provided wireless service by the network, and do not possess the ability to transmit signals to the wireless network, and where communication resources of the wireless network are not consumed to facilitate location.

IMSI Catcher

European Patent EP1051053 "Method For Identifying A Mobile Phone User Or For Eavesdropping On Outgoing Calls," Frick et al., published Sep. 7, 2003, discloses a method for identifying a MS in a GSM radio communications network using a virtual base transceiver station (VBTS) and an instrumented test mobile telephone. The method requires the VBTS and a test mobile be in close proximity with the target mobile to acquire the same broadcast channel (BCCH) information as the target mobile. The VBTS uses the acquired BCCH information to emulate a BTS other than the one presently serving the MS. The MS, detecting a new higher power beacon with a new Location Area Code (LAC), then executes a Location Update to the VBTS, allowing the pre-existing TMSI, IMEI, and IMSI to be collected.

U.S. patent application Ser. No. 11/996,230, "Acquiring Identity Parameters by Emulating Base Stations," Pridmore et al., filed Jul. 17, 2006, discloses a method to acquire the identity (pre-existing TMSI, IMEI, MS-ISDN and IMSI) of multiple GSM or dual-mode GSM/UMTS devices by emulating multiple base stations.

While the above described methods and systems allow for the collection of identities of mobile devices, a wide-area system suitable for identifying and locating GSM or dual-mode GSM/UMTS devices while intelligently minimizing the disruption of the local wireless communications network is not disclosed. While the system described in EP1051053 may possess a location of the interrogated mobile due to the need for close proximity to the interrogated MS, the system in application Ser. No. 11/996,230 (Pridmore et al) widens the coverage area to a multi-cell area, increasing the effects of interference, but then cannot locate the interrogated MS more precisely than the cell/sector level; i.e., the system does not appear to be able to locate the MS more precisely than the GSM Cell Global Identifier (CGI) or UMTS Cell Identity (CI) level.

As mentioned above, it would be advantageous to law enforcement and disaster rescue personnel to have access to an ad hoc network-autonomous wireless location system (NAWLS) capable of quickly identifying and locating mobile devices without co-operation of the local wireless network operators. Such a system will preferably use standardized radio messaging, without further connection to the underlying radio network, to acquire the MS identifiers, such as the TMSI, IMEI, MS-ISDN and IMSI,. The present application describes a system achieving these goals.

SUMMARY

The following summary is intended to provide an overview of the inventive systems and methods described herein. This summary is by no means intended to limit the scope of protection of the claims appearing at the end of this specification.

Embodiments of the present invention generally provide for collection of mobile-specific and subscriber-specific information, including temporary and permanent identifiers, with mobile location in wireless networks via radio messaging without requiring a physical or wired connection to local wireless networks. For example, using a network autonomous, untethered WLS comprising a set of geographically distributed receivers and mobile location servers coupled with one or more network emulator (NE) transceivers, the identity and location of mobile GSM and multi-mode mobile devices can be accomplished over a wide area without connection to the underlying communications network. This same system can function to minimize disruption of the local network by monitoring the wireless network and emulated network and adjusting the emulated network transmissions and parameters as needed. The system can also be used to generate ad hoc geo-fenced areas, including quiet zones where subscriber service can be limited. The illustrative embodiments can also be used in border areas of wireless networks and in areas where wireless communications network coverage is lost or intermittent. These ad hoc networks may not require operator cooperation or awareness especially if erected in-building.

The inventive techniques and concepts described herein apply to cellular frequency reuse communications systems. These systems generally are time and frequency division multiplexed (TDMA/FDMA) radio communications systems including the widely used Global System for Mobility (GSM), and Orthogonal Frequency Division Multiple Access (OFDMA) wireless systems (E-TRAN/LTE and WiMAX), as well as code-division radio communications systems such as CDMA (IS-95, IS-2000) and Universal Mobile Telecommunications System (UMTS), the latter of which is also known as W-CDMA.

Other features of the present invention are described below:

BRIEF DESCRIPTION OF THE DRAWINGS

The foregoing summary as well as the following detailed description is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 3b—Enhanced UAV for aerial or mixed aerial/terrestrial Untethered Wireless Location System deployments (side view).

FIG. 3c—Enhanced UAV for aerial or mixed aerial/terrestrial Untethered Wireless Location System deployments (front view).

FIG. 3d—Enhanced UAV for aerial or mixed aerial/terrestrial Untethered Wireless Location System deployments (top view).

DETAILED DESCRIPTION OF ILLUSTRATIVE EMBODIMENTS

Figure 1:
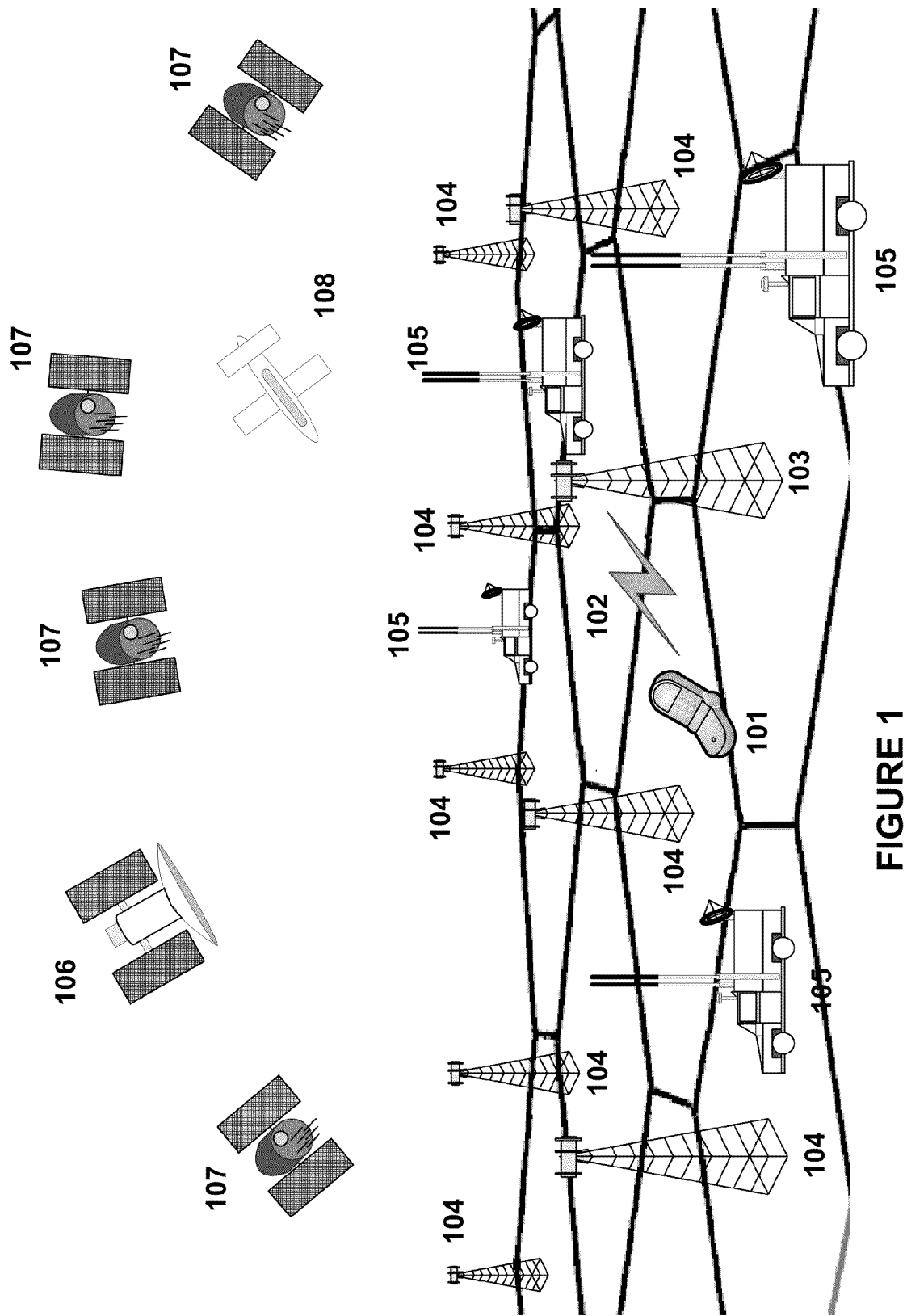
FIG. 1—Example deployment of the Untethered Wireless Location System.

GSM base station (BTS) simulators and instrumented test mobiles have been used for decades to provide security and law enforcement agencies a method to quickly sample (interrogate and identify mobiles) in close proximity to the GSM BTS simulator. This technique proved ill-suited to scaling to larger areas due to the resulting interference with the local wireless communications network and the loss of mobile location.

By using a distributed set of receivers with location capability without a connection to the local communications network (the basis of an Untethered Wireless Location System and Radio Network Monitor) with the GSM base station simulator transceivers (the Network Emulator) together making a Network Autonomous Wireless Location System (NAWLS), a wide geographic area can be interrogated. Since the receivers can both receive and locate local wireless communication network base stations, the transmitted information elements as well as the transmission power of the GSM base station simulator can be adjusted to minimize interference while optimizing broadcast power used. In addition, by adjusting the transmitted information, the rate of mobile sampling can be optimized by balancing the sampling network capabilities while minimizing communication network impacts.

As a result of the minimization of impact to the wireless communications network, new applications become available. If the NAWLS samples and then collects mobile stations to the emulated network, active local selective service control can be accomplished. If continuous tracking is required, the NAWLS samples, collects and secures the mobile by placing it on a silent traffic channel resulting in service denial and continued visibility to the Wireless Location System.

The active local selective service control location and tracking capability may also be accomplished using onboard mobile location capacity, e.g. GPS, EOTD or OTDOA among others, with the WLS and mobile cooperating over the emulated network's radio connection. Alternatively, if a completely passive sampling system is needed, the untethered (network autonomous) WLS (U-WLS) may be used to perform real-time location and record over-the-air radio data for later analysis and extraction of encrypted and unencrypted mobile identity information.

The U-WLS can be implemented in multiple forms depending on the available resources and location quality-of-service requirements. In a passive network-based wireless location system, the mobile device operates in a standard fashion to register with the wireless network, to make and receive calls, to transmit and receive messages and to initiate or connect to data sessions. No changes to the circuitry or software of the mobile device are necessary to the operation of a network-based wireless location system.

In an active network-based wireless location system, the mobile device operates in a standard fashion to register with the wireless network, to make and receive calls, to transmit and receive messages and to initiate or connect to data sessions. Here again, no changes to the circuitry or software of the mobile device are necessary to the operation of a network-based wireless location system. However, radio messaging may be transmitted or exchanged with the mobile device to provoke a response. This response can include re-registration of the mobile device, a page response, placement of the mobile device on a control channel (or set of control channels), and/or placement of the mobile device on a traffic (voice or data) channel. (See U.S. Pat. No. 6,097,336, Aug. 1, 2000, "Method for Improving the Accuracy of a Wireless Location System".)

Triggering and Tasking of a network-based wireless location system has been standardized for emergency services (J-STD-036 "*Enhanced wireless 9-1-1 phase II*") and commercial services (3GPP TS 43.059 "*Functional stage 2 description of Location Services (LCS) in GERAN*" for GSM and 3GPP TS 25.305 "*User Equipment (UE) positioning in Universal Terrestrial Radio Access Network (UTRAN)*; Stage 2" for UMTS, LTE positioning has not yet been standardized at the time of this application).

Triggering refers to the event initiating a location estimate (such as recognition of a string of dialed digits in the called number). See, e.g., U.S. patent application Ser. No. 11/150, 414, "Advanced Triggers for Public Security Applications in a Wireless Location System," and U.S. Pat. No. 6,119,000, "Method And Apparatus For Tracking Identity-Code Changes In A Communications System," for a description of radio and network triggering events and related radio information.

Tasking includes the passing of network and radio information to the network-based WLS needed to calculate a low-accuracy cell-ID with power based ranging location estimate or commence use of geographically deployed receivers (LMUs) in the service area for a, Time-of-Arrival (TOA), Time-Difference-Of-Arrival (TDOA), Angle-of-Arrival (AoA) or TDOA/AoA hybrid location estimate. For mobiles with onboard location capability, the U-WLS can collect location information from the handset by emulating the various servers to support Enhanced-cell-ID (ECID), Enhanced Observed Time Difference (EOTD), Observed Time Difference of Arrival (OTDOA), Global Navigation Satellite System (GNSS) positioning, Assisted GNSS positioning, and hybrid handset/network based positioning. A current functional example of a GNSS system is the Navstar Global Positioning System (GPS).

FIG. 1

FIG. 1 shows an illustrative embodiment of a U-WLS as implemented using an ad hoc network of enhanced cell-site-on-wheels (COWS). The mobile device 101 is shown transmitting an uplink signal 102 to the serving cell 103. This uplink signal, although low power so as to minimize interference with the other local cell sites 104, can be detected by the local U-WLS receiving sites 105. In wideband systems (such as IS-95, IS-2000, and UMTS), the serving cell can be multiple cells using the soft or softer handoff capability of spread spectrum systems.

In this example, the U-WLS uses the GNSS constellation 107 to provide radio signals to determine precise location, timing and velocity for each U-WLS receiving site 105 (The U-WLS receivers are also known as Radio Network Monitor (RNM) receivers, Location Measurement (LMU) receivers and Untethered BTS (U-BTS) transceivers). Other time and frequency stable timing sources such as High-Definition Television (HDTV) or purpose-built precise timing radio broadcast, or even wired systems, may be used in place or to supplement the GNSS receiver. The U-WLS, in this example, uses inter-node signaling via a communications satellite 106. Inter-node signaling can use other radio packet data systems, which include as examples commercial wireless data systems, unused radio bands, unlicensed spectrum radio transmissions or even optical band transmissions.

An aerial component 108 may be used either to provide non-satellite radio relay service between U-WLS sites, provide airborne imaging, or even serve as a U-WLS platform providing extended coverage and three dimensional diversity to the U-WLS network. (See U.S. Pat. No. 7,427,952, Sep. 23, 2008, "Augmentation Of Commercial Wireless Location System (WLS) With Moving And/Or Airborne Sensors For Enhanced Location Accuracy And Use Of Real-Time Overhead Imagery For Identification Of Wireless Device Locations".) Use of the aerial component, be it an unmanned aerial vehicle, a light plane, blimp, balloon, or helicopter is optional in the example system. However, the U-WLS may be entirely aerial based depending upon the deployment configuration desired.

FIG. 2a

Figure 2A:
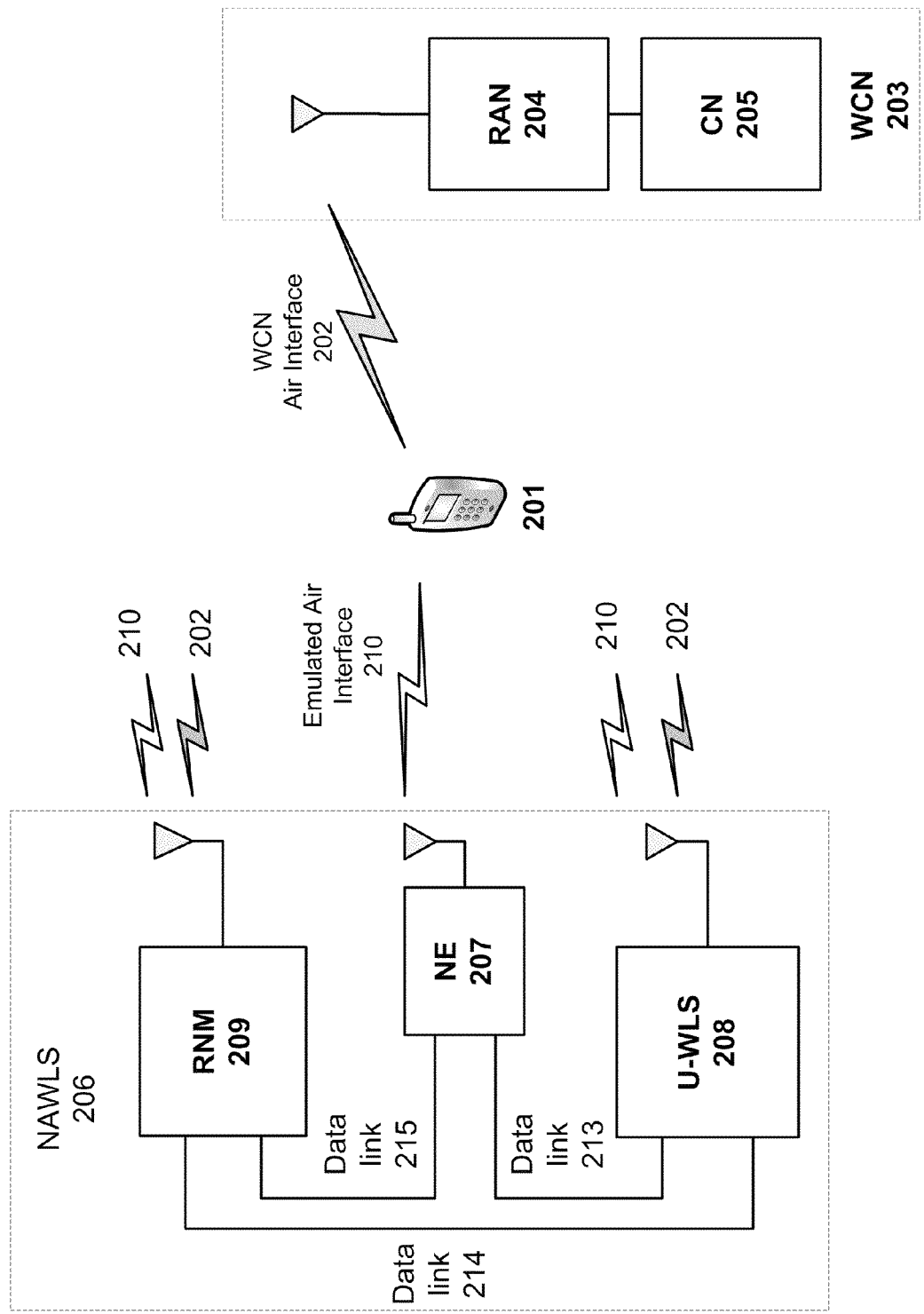
FIG. 2a—Block schematic depiction of the Network Components and interfaces in a single mode (e.g. GSM) wireless communications network.

FIG. 2a depicts a schematic representation of a deployment of the Network Autonomous Wireless Location System. Shown are the functional components and the interconnections, both wired and wireless. In FIG. 2a, use of a single radio air interface (e.g. GSM) type is portrayed.

The mobile device 201 (also known as a Mobile Station (MS), a User Equipment (UE) or handset) is capable of communicating via the radio air interface 202 with the local wireless communications network (WCN) 203. The radio air interface 202 includes uplink and downlink communication channels as defined in interoperability standards set for the radio air interface type (for instance, the GSM radio air interface (the Um interface) was defined by the European Telecommunications Standards Institute (ESTI) and is now under modification by the $3^{rd}$ Generation Partnership Program (3GPP) under ETSI's authority).

The local wireless communications network (WCN) 203 comprises a Radio Access Network (RAN) 204 and Core Network (CN) 205. The Radio Access Network (RAN) 204 provides radio signaling 202 between the mobile 201 and the core network (CN 205). The CN 205 manages the mobility management and switching of calls between mobile users, and between mobile and fixed network (landline) users. Together, the RAN 204 and CN 205 make up the wireless communications network (WCN) 203 that provides the mobile device 201 communications linkage with switching (circuit switched) and routing (packet switched) and various telecommunications services including location-based services.

Interconnection (not shown) of the RAN 204, the CN 205 and other external wired and wireless networks is as defined in national and international Telecommunications interoperability standards.

The NAWLS 206 comprises three functional nodes: the Network Emulator (NE) 207, the untethered Wireless Location System (U-WLS) 208 and Radio Network Monitor (RNM) 209. The aforementioned functional nodes may be combined physically and electronically.

The NE 207 comprises one or more geographically distributed untethered base stations (U-BTS) and control functions, and provides an independent wireless communications network, emulating both RAN and CN networks (such as the GSM Base Station Subsystem (BSS) and the GSM Network Switching Subsystem (NSS)) as necessary. An existing example of the U-BTS is the Rhode Schwartz GA900 test base station. The NE 207 provides the emulated air interface 210 that includes a broadcast beacon (the BCCH in GSM) used to actively sample, acquire or capture the mobile device 201. The NE 207 supplied air interface 210 may also include, on an individual mobile device basis, a set of emulated duplex channels with mobile uplink and accompanying downlink to the mobile device 201 in cases where a traffic/data channel allocation is necessary to identify, locate or silence the mobile device 201. The NE 207 provides triggering and tasking information to the U-WLS for location initiation and receiver tuning. The NE 207 also performs a management function, coordinating the activities of the NAWLS.

The U-WLS 208 provides the network-based uplink time-difference-of-arrival (U-TDOA), Angle-of-Arrival (AoA), and/or TDOA/AoA hybrid location technologies to locate the mobile phone 201 using the uplink mobile transmissions, such uplink transmissions may be on either on the WCN supplied air interface 202 or the emulated air interface 210. The U-WLS 208 also provides location server capacity and functionality for the handset based location techniques such as Enhanced Observed Time Difference (E-OTD), Observed Time Difference of Arrival (OTDOA), and A-GNSS (Assisted Global Navigation Satellite System, for example, the U.S.AF Navstar Global Positioning System). The U-WLS 208 may also use hybrid techniques such as U-TDOA/A-GNSS to optimize a location.

The U-WLS 208 is connected to the NE 207 via a digital data link 213. The digital data link 213 is used by the NE 207 to trigger the U-WLS 208 to perform a location. The digital data link 213 is also used by the U-WLS to inform the NE 207 that a location has been completed (success or failure, reason code), that additional power is needed to locate the mobile 201, that an inter-RAT handoff is needed, and/or that allocation to a traffic channel is needed. Digital data link 213 may include a wireless connection. The data link 213 may also be used by the U-WLS 208 and NE 207 to use the on-board location technology (EOTD, GPS, OTDOA, A-GPS, etc) resident on the mobile 201 and develop a location using the mobile's built-in location technology.

The Radio Network Monitor (RNM) 209 is a passive software defined radio receiver capable of receiving uplink and downlink transmissions (including broadcasts) from the mobile device 201, the RAN 204 and/or the NE 207. The RNM 209 may be deployed in a variety of fashions such as a discrete set of narrowband or wideband receivers, may be co-located with the geographically distributed U-WLS 208 receivers, may be co-located with the Network Emulator's Untethered Basestation (U-BTS) transceiver(s) or may be incorporated into the receivers or transceivers to take advantage of the shared circuitry and antennae.

An early version of the RNM 209 is described in, e.g., TruePosition's U.S. patent application Ser. No. 11/150,414; filed Jun. 10, 2005, "Advanced Triggers for Location-based Service Applications in a Wireless Location System".)

The RNM 209 is connected to the U-WLS 208 via a digital data link 214 allowing the RNM 209 to task the U-WLS 208 to locate a mobile device 201 involved in a network transaction. Digital Data link 214 may include a wireless connection. Network transactions include messaging for Mobile Origination, Mobile Termination, Location Update, Cell Change Command, AnyTimeInterrogation (specialized paging), SMS Origination, and SMS Termination.

The RNM 209 is connected to the NE 207 via a digital data link 215, allowing the RNM 209 to inform the NE 207 of WCN radio air interface 202 settings such as the received beacons (e.g. BCCH) frequencies, power levels and informational content. Digital Data link 215 may include a wireless connection. The RNM 209 may also monitor the NE 207 supplied emulated radio air interface 210 with its emulated BCCH downlink and the emulated uplink and downlink control and traffic channels to detect interference and cause the NE 207 to reduce broadcast radio power level and to reduce power used in the radio air interface 210 either in part or on any one or set of uplink and downlink channels.

The RNM 209 may also trigger the U-WLS to perform a location estimate based upon pre-programmed triggers as detailed in TruePosition's U.S. patent application Ser. No. 11/150,414; filed Jun. 10, 2005, "Advanced Triggers for Location-based Service Applications in a Wireless Location System".

FIG. 2b

Figure 2B:
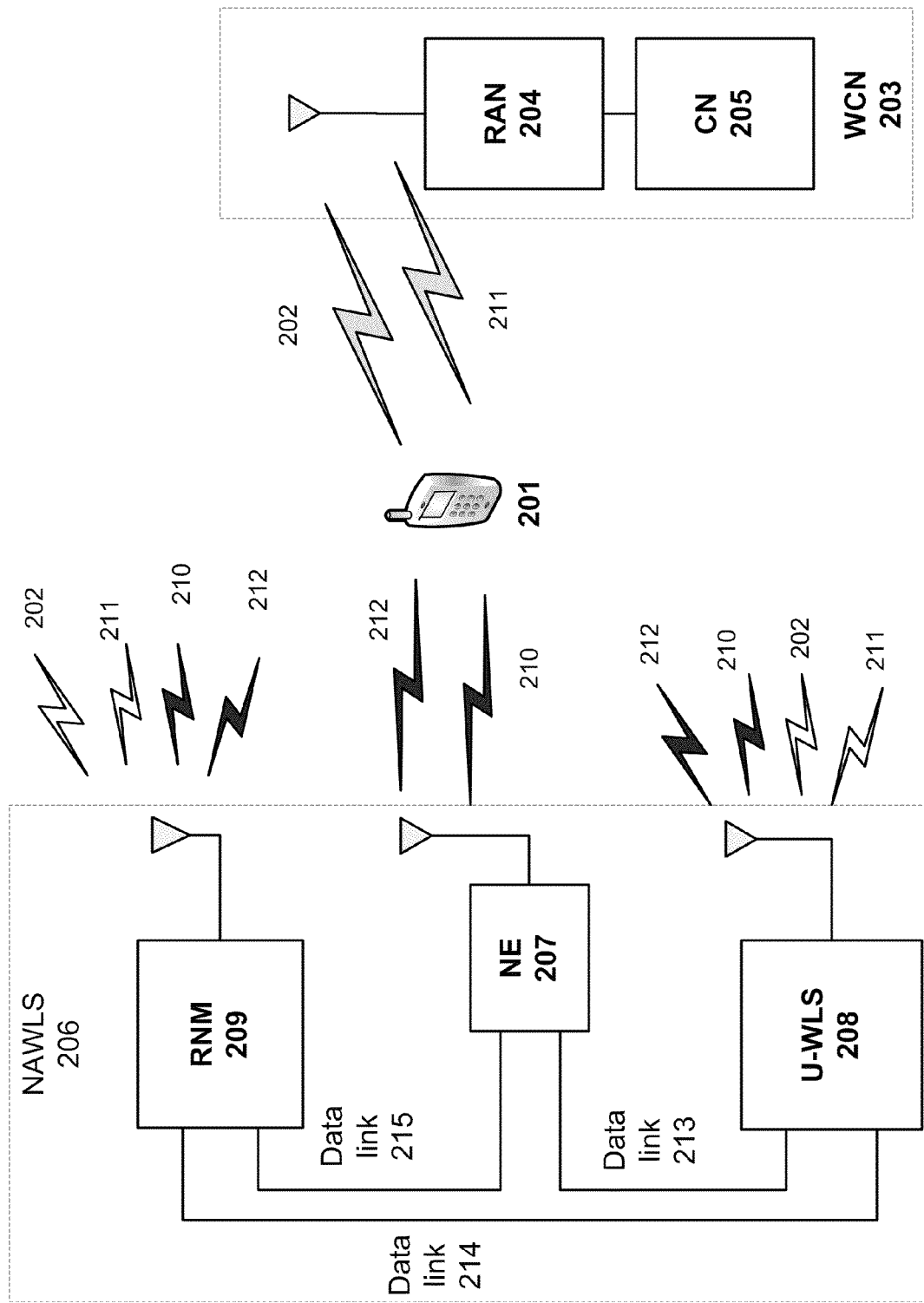
FIG. 2b—Block schematic depiction of the Network Components and interfaces in a multi-mode mode (e.g. GSM, UMTS, and LTE) wireless communications network.

FIG. 2b depicts a schematic representation of a deployment of the Network Autonomous Wireless Location System in a multi-mode scenario where multiple air interfaces (such as GSM and UMTS, GSM and LTE, or GSM with UMTS and LTE) are available to the mobile device 201. Shown are the functional components and the interconnections, both wired and wireless.

The mobile device 201 (also known as a Mobile Station (MS), a User Equipment (UE) or handset) is capable of communicating via using either a first radio air interface 202 or a second radio air interface 211 with the local wireless communications system (WCN) 203. The first and second radio air interfaces 202 211 includes uplink and downlink communication channels as defined in interoperability standards set for the radio air interface type (for instance, the GSM radio air interface (the Um interface) was originally developed by the European Telecommunications Standards Institute (ESTI) and the UMTS (the Uu interface) and LTE air interfaces were both developed by the $3^{rd}$ Generation Partnership Program (3GPP)).

The local wireless communications system (WCN) 203 comprises a Radio Access Network (RAN) 204 and Core Network (CN) 205. The Radio Access Network (RAN) 204 provides radio signaling 202 between the mobile 201 and the core network (CN 205). The CN 205 manages the mobility management and switching of calls between mobile users, and between mobile and fixed network (landline) users. Together, the RAN 204 and CN 205 make up the wireless communications network (WCN) 203 that provides the mobile device 201 communications linkage with switching (circuit switched) and routing (packet switched) and various telecommunications services including location-based services.

Interconnection (not shown) of the RAN 204, the CN 205 and other external wired and wireless networks is as defined in national and international Telecommunications interoperability standards.

The NAWLS 206 comprises three functional nodes; the Network Emulator (NE) 207, the untethered Wireless Location System (U-WLS) 208 and Radio Network Monitor (RNM) 209. The aforementioned functional nodes may be combined either in hardware or as software applications sharing common computing and radio hardware.

The NE 207 provides an independent wireless communications network, emulating both a RAN and CN networks (such as the GSM Base Station Subsystem (BSS) and the GSM Network Switching Subsystem (NSS)). The NE 207 provides the first emulated air interface 210 and a second emulated air interface 212 both including a broadcast beacon (the BCCH in GSM, BC in UMTS, BCCH in LTE) used to actively sample, acquire or capture the mobile device 201. The NE 207 supplied first emulated air interface 210 may also include, on an individual mobile device basis, a set of emulated duplex channels with mobile uplink and accompanying downlink to the mobile device 201 in cases where a traffic/data channel allocation is necessary to identify, locate or silence the mobile device 201. The NE 207 also performs a management function, coordinating the activities of the NAWLS through either a centralized or distributed network of controllers. Functioning as the wireless network, the NE 207 also can provide triggers for mobile location based on network transactions.

The NE 207 may be set to trigger on call connection events or radio interface events (deemed 'network transactions'). These events may comprise a single message or a series of messages, each related to the call connection or radio event. For the single mode GSM network and mobile device used as an illustrative example, these events include: (1) Network Measurement Report Received, (2) Mobile Originated Call Placed, (3) Mobile Terminated Call Received, (4) Mobile Originated SMS Sent, (5) Mobile Terminated SMS Received, (6) Handover (Begins), (7) Handover (Completed), (8) Location Update, (9) RF Channel Assignment, (10) IMSI Attach, (11) IMSI Detach, (12) Mobile Originated Call Disconnect (13) Mobile Terminated Call Disconnect, and (14) Identify Equipment Response (15) Call Failure.

The U-WLS 208 provides the network-based Time-of-Arrival (TOA), uplink time-difference-of-arrival (U-TDOA), Angle-of-Arrival (AoA), and/or hybrids of the various network-based location technologies to locate the mobile phone 201 using the uplink mobile transmissions made on the WCN supplied air interfaces 202 211 or the emulated air interfaces 210 212. The U-WLS 208 also provides location server capacity and functionality for the handset based location techniques such as Enhanced Observed Time Difference (E-OTD), Observed Time Difference of Arrival (OTDOA), and A-GNSS (Assisted Global Navigation Satellite System, for example, the U.S.AF Navstar Global Positioning System). The U-WLS may also use hybrid techniques such as U-TDOA/A-GNSS to optimize a location.

The U-WLS 208 is connected to the NE 207 via a digital data link 213. The digital data link 213 is used by the U-WLS to inform the NE 207 that a location has been completed (success or failure, reason code), that additional power is needed to locate the mobile 201, that an inter-RAT handoff is needed, and/or that allocation to a traffic channel is needed. The digital data link 213 also is used by the NE 207 to in some cases (such as when the mobile identity is a trigger, or when a handover is performed) to trigger the U-WLS 208 to perform a location. Digital data link 213 may include a wireless connection. The data link 213 may also be used by the U-WLS 208 and NE 207 to use the on-board location technology (EOTD, GPS, OTDOA, A-GPS, etc) resident on the mobile 201 and develop a location using the mobile's built-in location technology. A mobile-based technique(s) may be combined with network-based technique(s) to determine a hybrid location estimate for greater location accuracy and/or yield.

The Radio Network Monitor (RNM) 209 is a passive software defined radio (SDR) receiver capable of receiving uplink and downlink transmissions (including broadcasts) from the mobile device 201, the RAN 204 and/or the NE 207. The RNM 209 may be deployed in a variety of fashions such as a discrete set of receivers, may be co-located with the geographically distributed U-WLS receivers, may be co-located with the Network Emulator's Untethered Basestation (U-BTS) transceiver(s) or may be incorporated into the receivers or transceivers to take advantage of the shared circuitry and antennae.

An early version of the RNM 209 is described in, e.g., TruePosition's U.S. patent application Ser. No. 11/150,414; filed Jun. 10, 2005, "Advanced Triggers for Location-based Service Applications in a Wireless Location System" as is the radio and network transactions triggering mechanisms available.

The radio network monitor (RNM) 209 allows the wireless location system to passively monitor the traffic between the mobile phone and the BTS on both the uplink and downlink. For the single mode GSM network and mobile device used as an illustrative example, the RNM 209, implemented as a wideband receiver or bank of narrowband receivers located within the area of interest, scans and discovers, or is pre-set with frequency, timeslot, codes and/or hopping sequence, to monitor the Random Access Channels (RACH), Access Grant Channels (AGCH) and control channels (SDCCH in GSM/GPRS) for messages of interest. Since, in this embodiment, the RNM 209 has no capability to decrypt encrypted information the GSM message transactions of interest will be restricted to: (1) call originations, (2) call terminations, (3) short message service (SMS) originations, (4) SMS terminations, (5) location update requests, and (6) identity requests.

Wireless devices can be located without physical connection to the wireless carrier's infrastructure through the use of the RNM 209 by receiving the Access Grant Channels (AGCH) on the downlink transmissions from the BTS and accessing the messaging information contained therein which includes the timing advance (TA), channel reference number and frame number. This information is obtained by detecting, demodulating and decoding the unencrypted AGCHs from the BTS's downlink transmissions. This is used as a network-autonomous trigger for the wireless location system enabling it to locate the wireless device with UTDOA by receiving subsequent uplink transmissions from the mobile devices on SDCCH. The wireless device's location can also be estimated, albeit with much less accuracy than UTDOA or AoA, with CGI+TA. The CGI+TA can be improved with other information from the AGCH as well as other a priori information about the wireless network. Demodulating and decoding the initial SDCCH transmissions from the mobile device will provide identifying information about the mobile device, specifically the TMSI or IMSI. If ciphering is not enabled in the wireless network further demodulation and decoding of SDCCH transmissions from the wireless device will provide other identifying information such as IMEI, MSISDN as well as calling number or called number.

The RNM 209 is connected to the U-WLS 208 via a digital data link 214 allowing the RNM 209 to task the U-WLS 208 to locate a mobile device 201 involved in a network transaction. Digital Data link 214 may include a wireless connection. Network transactions include messaging for Mobile Origination, Mobile Termination, Location Update, Cell Change Command, AnyTimeInterrogation (specialized paging), SMS Origination, and SMS Termination.

The RNM 209 is connected to the NE 207 via a digital data link 215, allowing the RNM 209 to inform the NE 207 of WCN radio air interface 202 settings such as the received beacons (e.g. BCCH) frequencies, power levels and informational content. Digital Data link 215 may include a wireless connection. The RNM 209 may also monitor the NE 207 supplied emulated radio air interfaces 210 211 with its emulated Beacon downlink and the emulated uplink and downlink control and traffic channels to detect interference and cause the NE 207 to reduce broadcast radio power level and to reduce power used in the emulated radio air interfaces 210 211 either in part or on any one or set of uplink and downlink channels.

FIG. 2c

Figure 2C:
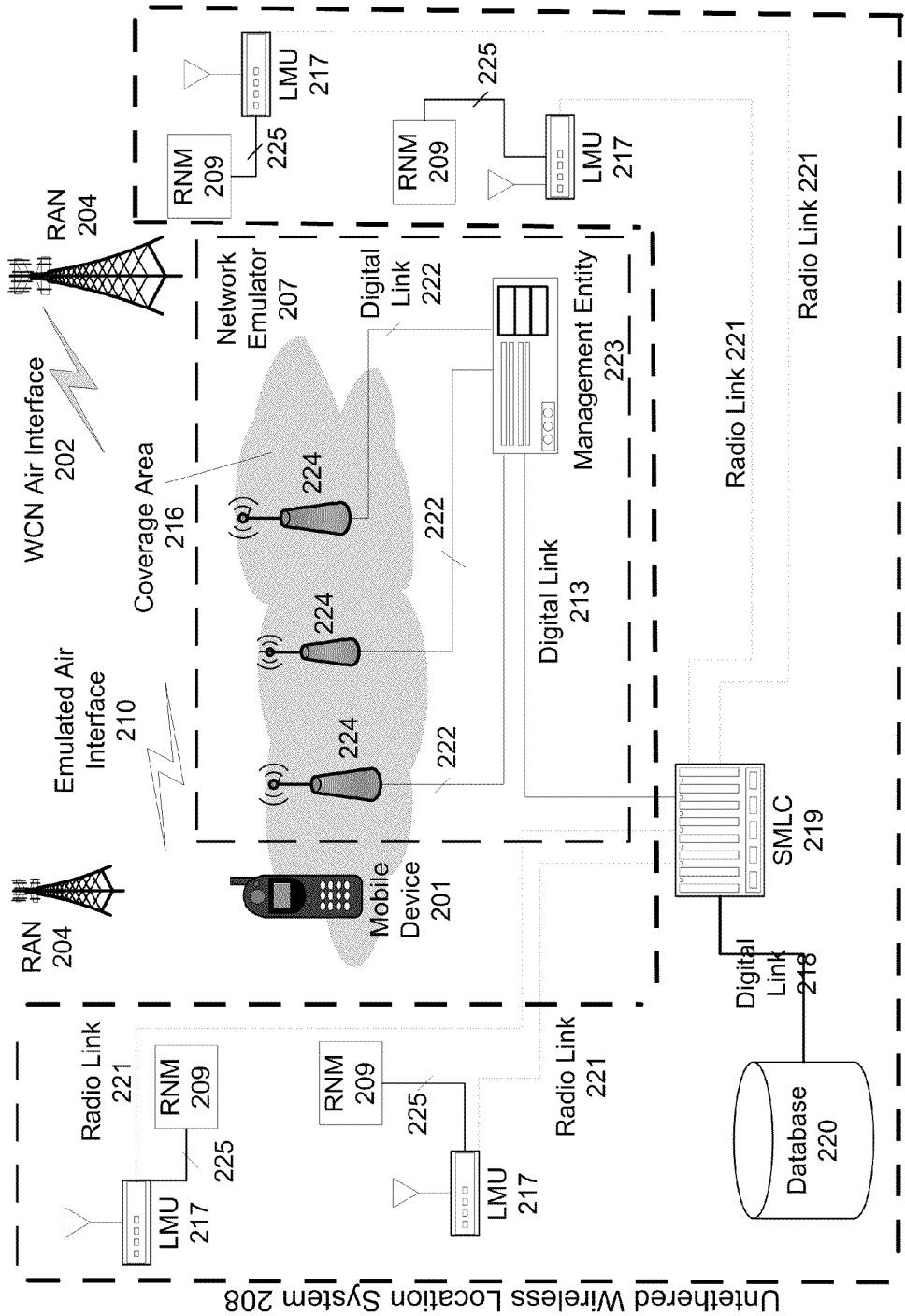
FIG. 2c—Illustrative example of Network Autonomous Wireless Location System as deployed with a U-WLS, a distributed NE and with co-located RNM and LMU components.

FIG. 2c depicts an illustrative example of NAWLS as deployed with distinct subsystems comprising an Untethered Wireless Location System with distributed Network Emulator (NE) network and co-located Radio Network Monitor (RNM) and Location Measurement Units (LMU) components.

The U-WLS 208 in this example deployment configuration comprises multiple passive receivers (also called Location Measurement Units (LMUs)) 217, a Serving Mobile Location Center (SMLC) 219 and a Centralized Database 220. In this FIG. 2c example, the U-WLS 208 also contains the Radio Network Monitor (RNM) 209 receivers co-located with the LMUs 217. The LMUs 217 comprise a network of geographically distributed receivers. Early embodiments of these LMUs (formerly called Signal Collection Systems in earlier TruePosition U.S. patents) are detailed in TruePosition U.S. Pat. No. 6,266,013, Jul. 24, 2001, "Architecture For A Signal Collection System Of A Wireless Location System". The LMU has both uplink (mobile-to-basestation) and downlink (basestation-to-mobile) radio monitoring capability. The LMU includes a radio timing receiver or a highly accurate internal clock for precise time synchronization.

The distributed RNM 209, shown here as included in the LMU hardware and software and uses the uplink and downlink access provided by the LMU 217 and associated antennae. Interconnection between the LMU 217 and RNM 209 (in this deployment option) is made via the digital data link 225 which may be wired or wireless.

Alternatively, the RNM 209 can be a separate system and interconnected by a wired or wireless data link 214 as shown in FIGS. 2a and 2b.

The geographically distributed RNM 209 was introduced and detailed in TruePosition U.S. patent application Ser. No. 11/150,414; "Advanced Triggers for Public Security Applications in a Wireless Location System". In the FIG. 2c example system deployment, the RNM 209 provides both uplink (mobile-to-network) and downlink (network-to-mobile) broadband monitoring capability. The RNM monitoring capability is used to detect mobile originated transmissions, WCN originated transmissions and NE originated transmissions. The RNM 209 passive monitoring capability can be used to detect and locate the base station of the local Radio Access Networks (RAN) 204, for example the local GSM, CDMA, UMTS, and/or LTE networks) via the base station broadcast transmissions as detailed in U.S. patent application Ser. No. 11/948,244, filed Nov. 30, 2007, "Automated Configuration of a Wireless Location System".

In the FIG. 2c example, the SMLC 219 is shown as a single bank of processors connected to the LMUs 217 via wireless or wired digital data links 221. In other implementations, multiple distributed SMLC processors interconnected by wired or radio interconnections are possible. The SMLC 219 is typically co-located with the centralized database 220. The database 220 is given further detail in U.S. Pat. No. 6,317,604, Nov. 13, 2001, "Centralized Database System For A Wireless Location System" and U.S. patent application Ser. No. 11/948,244, "Automated Configuration of a Wireless Location System".

The standardized operations for an LMU and SMLC functioning in a GSM radio access network are detailed in 3GPP Technical Standard 43.059 *"Functional stage 2 description of Location Services (LCS) in GERAN"* and for operation in a UMTS radio access network in 3GPP Technical Standard 25.305, *"Stage 2 functional specification of User Equipment (UE) positioning in UTRAN"*. The 3GPP standards efforts for the OFDM-based Long-Term-Evolution (LTE) are still in development at the time of this application.

To overcome the limitations of a purely passive Network Autonomous system, the NAWLS system depicted in the FIG. 2c example system also implements a Network Emulator (NE) 207. An embodiment of the Network Emulator may consist of one or more untethered base transceiver stations (U-BTS) 224 and a management entity (ME) 223 housed on a computer server. The U-BTS(s) 224 emulate(s) the radio air interface of a cellular base station in the local RAN 202 to temporarily attract mobile devices 201 and provoking communications which allow for mobile location and identification. The ME 223 provisions, activates and otherwise controls the U-BTS(s) 224, across a wired or wireless digital link 222 in cases where the U-BTS 224 and ME 223 do not share circuitry. The ME 224 also collects location information from the SMLC 219 pushed across a wired or wireless data link 213. It is the ME 223 server which hosts or interfaces with the external (to the NAWLS) location applications that require mobile location and/or identification.

Since the uplink radio transmissions from the mobile device 201 will be temporarily under control of the NE 207, the ME 223 can query and collect mobile identity information such as the International Mobile Station Identifier (IMSI), the International Mobile Equipment Identifier (IMEI) and the Mobile Subscriber International Services Digital Number (MS-ISDN). The ME 223 can also control communications with the Mobile Device 201 allowing the SMLC 219 to function as a Location server for a variety of Mobile-based location techniques.

Figure 3A:
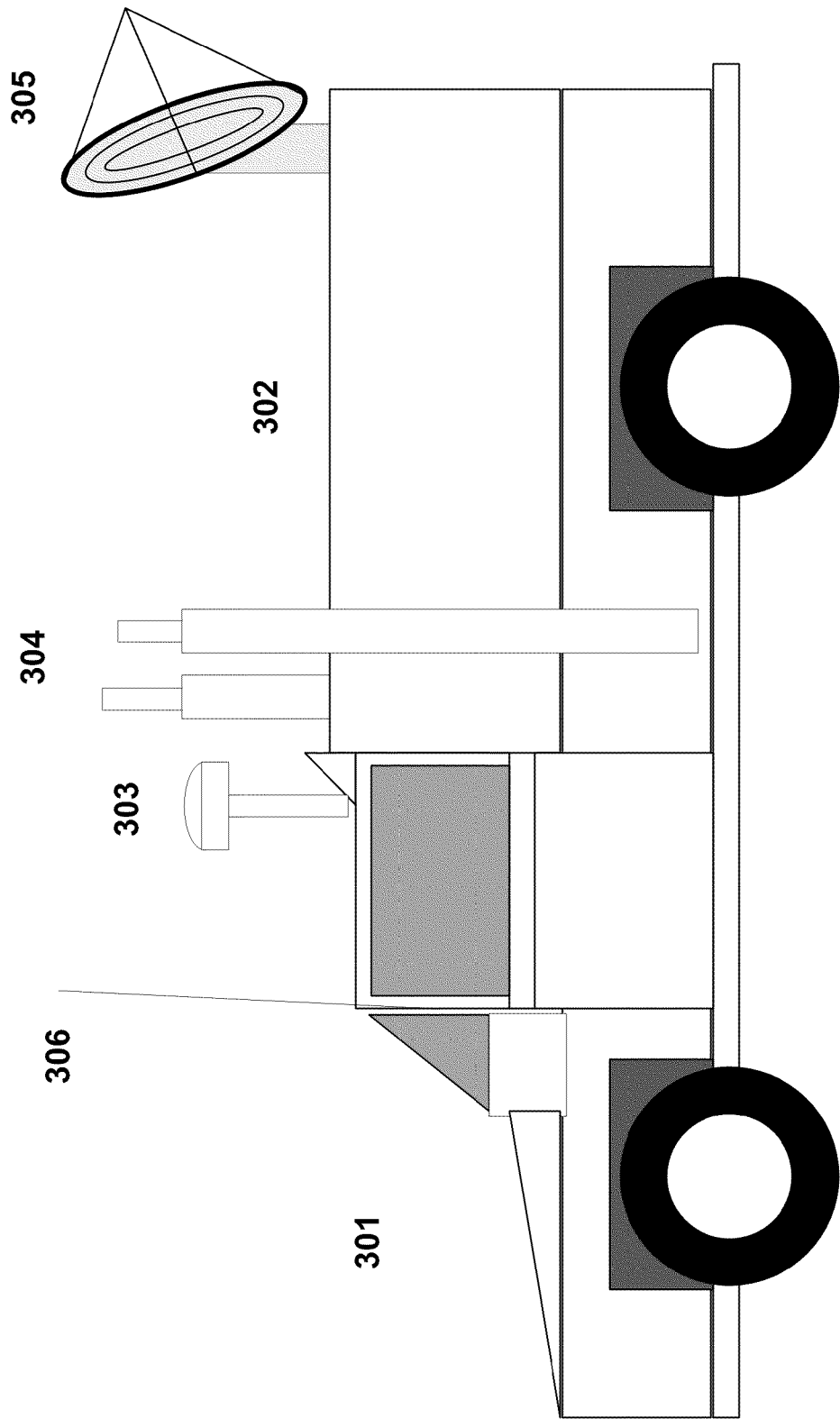
FIG. 3a—Enhanced Cellsite-On-Wheels (COW) for mobile/portable Untethered Wireless Location System deployments.

FIGS. 3a-b-c-d

In FIG. 3a, the enhanced COW 105 is depicted. The COW (or the Cell-on-Light-Truck (COLT)) platform 301 is readily available and is used to provide ad hoc coverage or capacity in wireless communications network. The COW 105 contains a weather proof payload bay 302 to house the electrical circuitry (which includes the LMU 205 and can include SMLC 206 components) and power storage or generating components of the ground-based NAWLS unit 105. The COWs 301 possesses a GNSS (e.g. GPS) receiver 303 for determining the location and velocity of the COWs allowing for use while stationary or moving. Other time and frequency stable timing sources such as High-Definition Television (HDTV) or purpose-built precise timing radio broadcast system may be used in place or to supplement the GNSS receiver. An antenna system 304 (shown is a retractable two-mast configuration) allows the COW-borne LMU 205 to receive both the uplink and downlink signaling from the wireless communications system (WCS). A backhaul link is created and maintained by the backhaul antenna 305. In this example, the backhaul antenna 305 provides a satellite relay microwave data link. A local communications system (e.g. VHF radio) antenna 306 can be used for voice mediated coordination between COWs units or low bit rate inter-unit communications.

To provide an extended coverage area, to speed deployment of LMU receivers, to provide 3-dimensional diversity or to act as an airborne relay, the NAWLS may be deployed with an aerial component 108. FIG. 3b shows the side view of an example of the airborne NAWLS node 108 implemented on a unmanned aerial vehicle (UAV) airframe 309, although deployment of the aerial NAWLS node 108 may also be accomplished using a variety of manned or unmanned aircraft including light aircraft, balloons or blimps. As with the ground-based NAWLS 105, the aerial NAWLS node 108 includes uplink antenna 304 shown here in an aerodynamic fairing enclosing the electrical equipment payload bay 302. The uplink antennae 304 support the band and bandwidth of the wireless communications system allowing the LMU 205 (housed within the payload bay 302) to detect and locate uplink signaling on any control and traffic channel. As with the ground-based NAWLS, a GNSS receiver 303 provides precise positioning, timing, and velocity information to the LMU. Optical sensors 308 can be used to provide visual or multi-spectrum imagery to assist searchers for a located mobile device. A high-data rate digital signaling link between multiple airborne NAWLS components 108, ground-based NAWLS components 105, the SMLC 206, and the NAWLS command and control function node(s) 202 is provided by additional communications antenna 305. A local communications system (e.g. VHF radio) antenna 310 can be used for low bit rate communications with a command and control entity 202.

FIG. 3c shows a front view of the UAV-based aerial NAWLS node 310. This view shows the GNSS receiver antenna 303 and the optional optical sensor package 308. The aerial NAWLS component 108 also supports downlink receiver antennae 307 to provide the LMU with broadcast information and timing from the local wireless communications system. The ventral sited electrical equipment bay 302 houses both the LMU 205 and the uplink receiver antennae 304.

FIG. 3d shows a top view of the UAV-based aerial NAWLS node 301. This view shows both the GNSS receiver antenna 303, the downlink receiver antenna 307, and the digital communications link antenna 305 (in this example, the dorsal mounted antenna would be a satellite communications transceiver, other antennae and mountings would be used in other implementations). The ventral sited electrical equipment bay 302 houses both the LMU 205 and the uplink receiver antennae 304.

Although shown as a ground 105 or aerial 108 vehicle mounted systems, smaller man portable or backpack based NAWLS units are also possible. In-building or campus systems using distributed antenna systems (DAS) such as leaky coaxial cable to distribute U-BTS radio signaling used by the Network Emulator is also a deployment option.

Figure 4A:
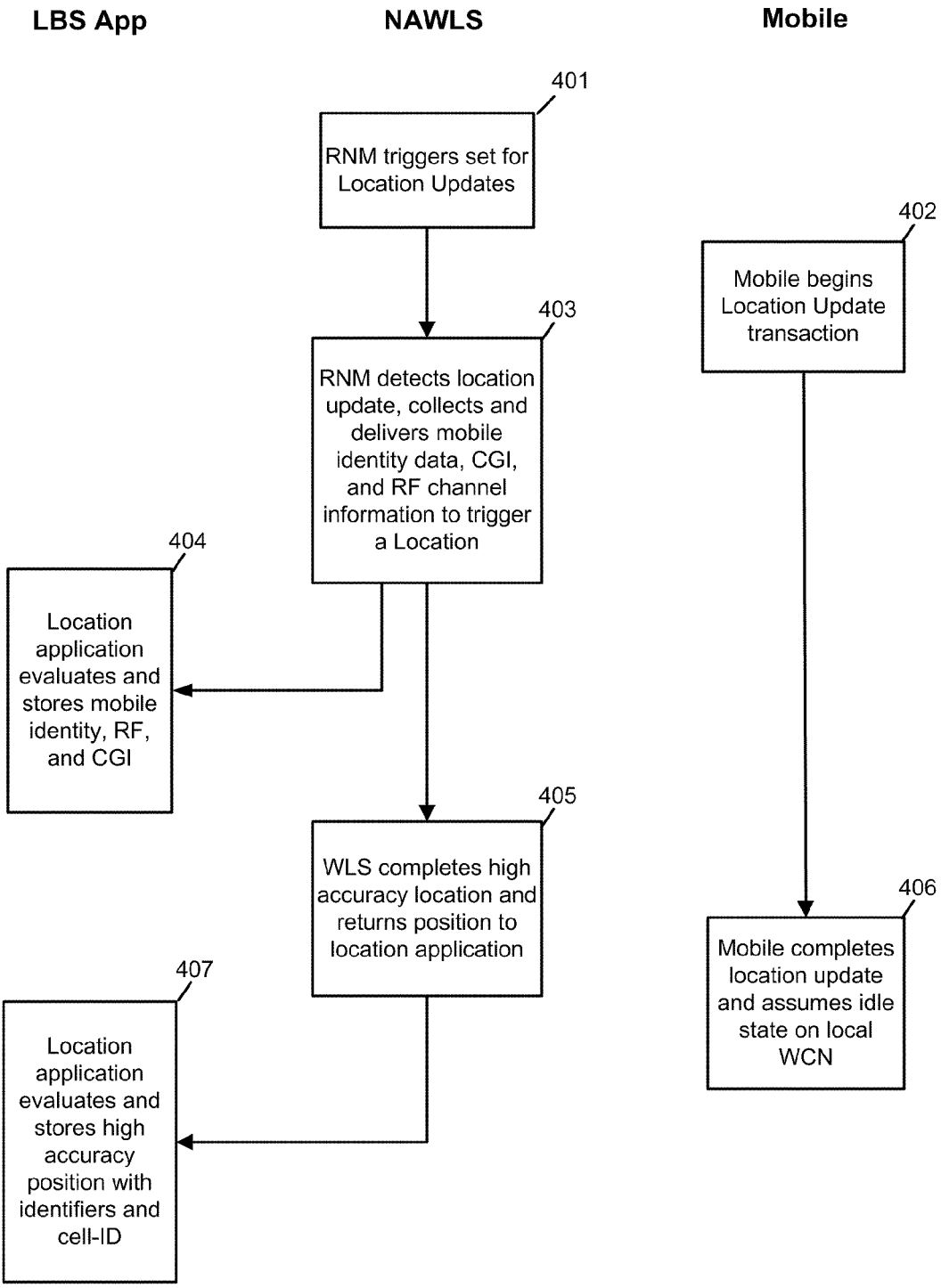
FIG. 4a—Operational Flow Chart for passive collection of temporary mobile identifiers and locations on Location Updates.

FIG. 4a—Passive Location via S-DCCH LU Monitoring

FIG. 4a shows an illustrative implementation of a procedure for locating and identifying a mobile during an example GSM Location Update procedure.

Figure 14:
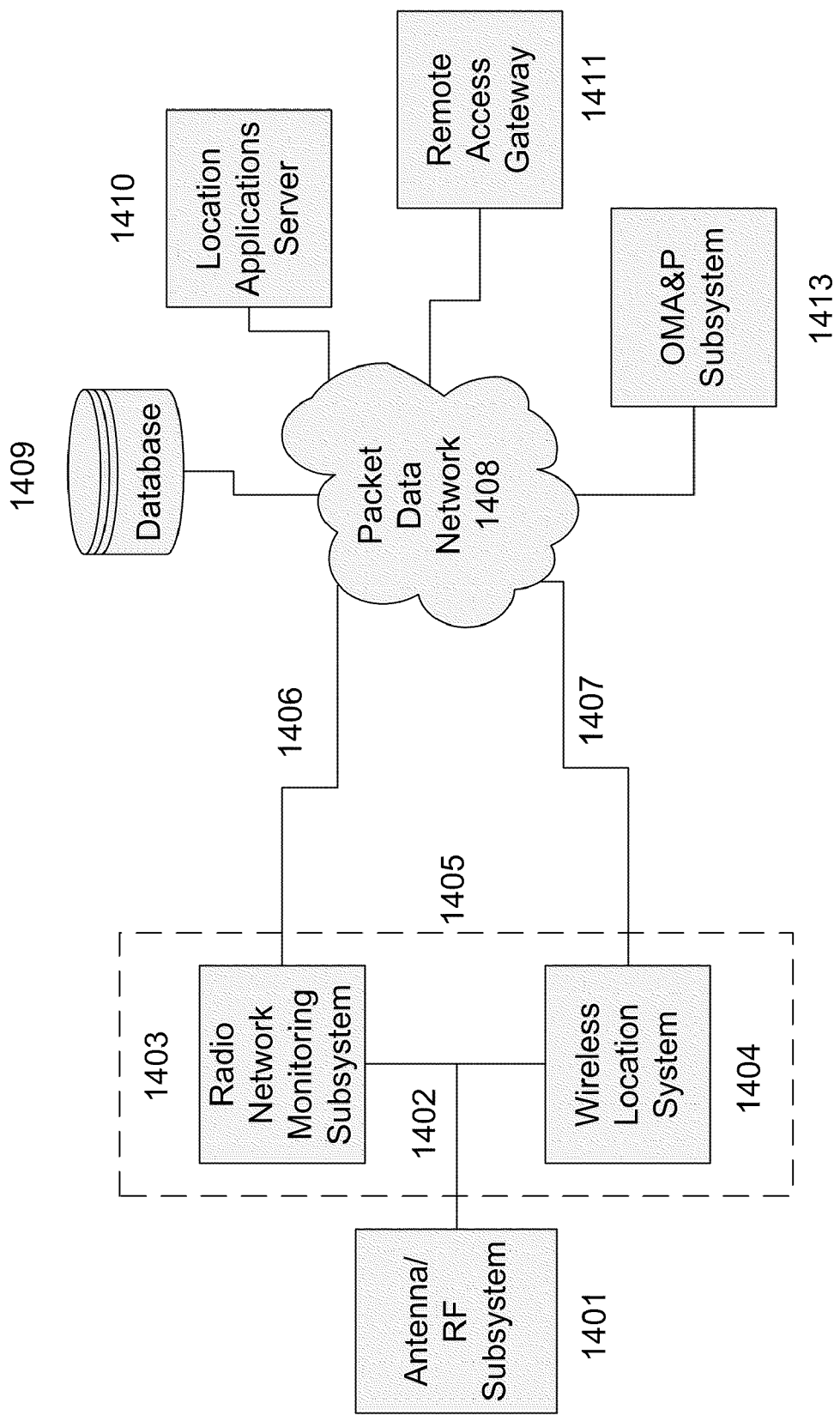
FIG. 14—Block schematic depiction of a passive wireless location system.

The passive network autonomous geolocation system is shown in FIG. 14. The area of interest (area of coverage) of the NAWLS is limited by the deployment 401 of the U-WLS and the RNM which can be co-located or separate with overlapping coverage. The RNM is set to monitor the local radio bands and can trigger the U-WLS on location updates 402. Since the NAWLS coverage area may not contain a Location Area (LA) boundary or be contiguous with a distinct Location Area, the Location Update procedure is only guaranteed to collect both mobile location and mobile identity for those mobile devices powered on within the area of interest 403. With the passive wireless location system, the area of interest 403 is the coverage area of the passive receiver network. For mobiles powering on within the area-of-interest, mobile location may be generated and the permanent International Mobile Subscriber Identity (IMSI) may be obtained.

For mobiles roaming into a new Location Area within the area-of-interest, mobile location may be calculated, but identification will in most cases be limited to the Temporary Mobile Subscriber Identity (TMSI).

As shown in FIG. 4a, the passive wireless location system (NAWLS) is deployed to the area of interest and its passive receiver network deployed and the Radio Network Monitor (RNM) set to trigger location attempts for Location Updates 401 occurring on the passively discovered and monitored uplink standalone dedicated control channels (S-DCCH). Once the Mobile Device begins a location update transaction 402, the RNM detects the transaction via the SDCCH messaging and collects the cell/sector identity (cell global identifier (CGI) in GSM, Cell Identity (CI) in UMTS) and the mobile identity (IMSI or TMSI) in use 403. The RNM delivers the collected information to a location application for evaluation and storage 404 while also tasking the wireless location system to perform a control channel location based on the collected serving cell/sector and RF channel information. The WLS completes a high accuracy TDOA, AoA or TDOA/AoA hybrid location 405 and returns the location estimate to the Location Application for evaluation and storage 407.

During the activities of the RNM, WLS and Location Application, the mobile device, unaware that it has been located, completes the location update and assumes idle state on the local Wireless Communications Network 406.

Figure 4B:
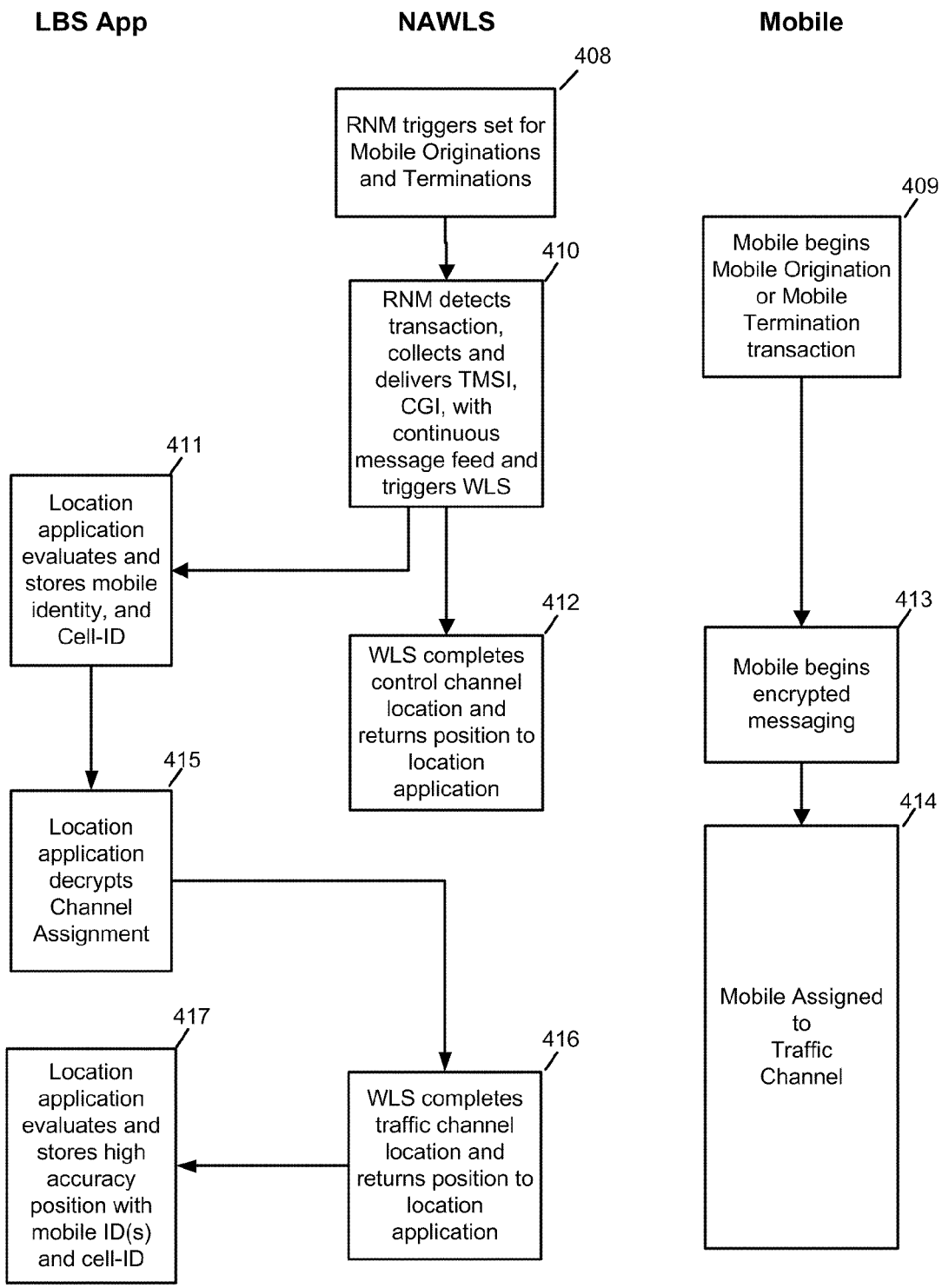
FIG. 4b—Operational Flow Chart for passive collection of temporary mobile identifiers and locations on Mobile Originations and Terminations.

FIG. 4b—Passive MO-MT

FIG. 4b shows an illustrative implementation of a procedure for locating and identifying a mobile during an example GSM Mobile Origination or Termination event.

As shown in FIG. 4b, the passive wireless location system (WLS) is deployed to the area of interest and its passive receiver network deployed and the Radio Network Monitor (RNM) set to trigger location attempts for mobile origination and terminations 408 occurring on the passively discovered and monitored uplink standalone dedicated control channels (S-DCCH). Once the Mobile Device begins mobile origination and termination and is assigned to an S-DCCH, the RNM detects the transaction via the SDCCH messaging and collects the cell/sector identity (cell global identifier (CGI) in GSM, Cell Identity (CI) in UMTS) and the mobile identity (IMSI or TMSI) in use 410. The RNM delivers the collected information to a location application for evaluation and storage 404 while also providing a continuous feed of the demodulated, but still encrypted uplink and downlink message stream. The RNM also collects RF channel information for tasking the wireless location system to perform a control channel location 412 based on the collected serving cell/ sector and RF channel information. The WLS completes a high accuracy TDOA, AoA or TDOA/AoA hybrid location 412 which is passed to the Location Application or evaluation and storage.

Meanwhile, the Location Application decrypts the Channel Assignment message 415, allowing the Location Application to task the WLS which then completes a traffic channel location and returns the new position estimate to the location application 416 for evaluation and storage with the collected mobile identification and cell/sector 417.

During the activities of the RNM, WLS and Location Application, the mobile device, unaware that it has been located, continues its session 414.

Figure 5A:
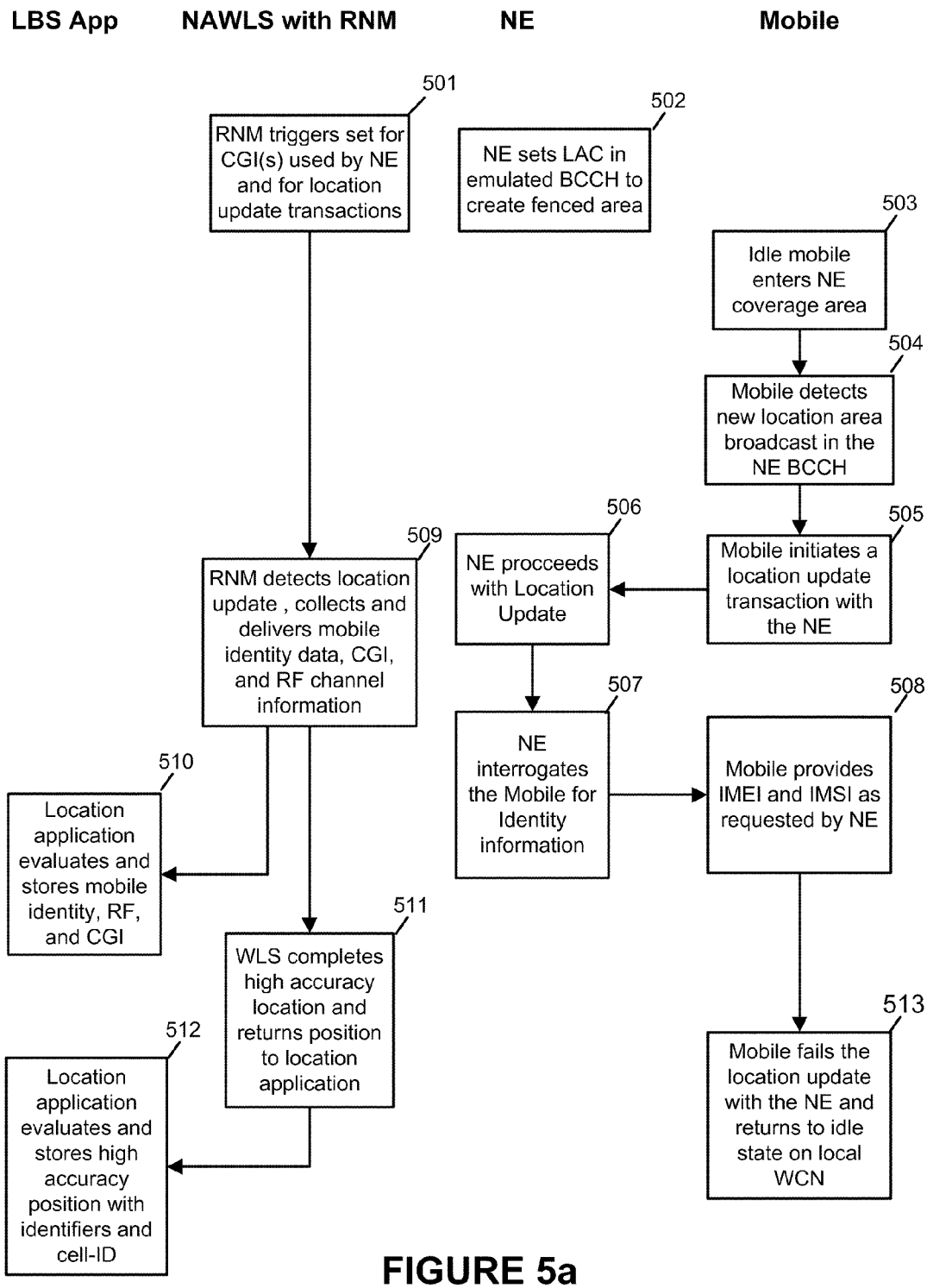
FIG. 5a—Operational Flow Chart for active sampling of temporary and permanent mobile and subscriber identifiers and high accuracy locations.

FIG. 5a—Active Sampling

FIG. 5a shows the procedure for locating and identifying a mobile during an example forced incomplete GSM Location Update procedure. This procedure is termed "Active Sampling", where Sampling includes use of an incomplete Location Update to the NE where the mobile ID is collected and the current location of a mobile device calculated for examination and database storage.

The U-BTS radio transceiver component(s) of the NE under the control of the Management Entity component of the NE is used to create a temporary geo-fenced area 502 (the area of the geo-fence is determined by the range of the U-BTS or coverage area of a distributed U-BTS) by broadcasting a beacon (Broadcast Channel and Synchronization) embedded with a unique Location Area Code (LAC) 502. An NE can be constructed using a single U-BTS to create a single geographic geofenced area, or multiple U-BTS can be coordinated by the Management Entity (ME) to provide larger contiguous geo-fenced areas or multiple separate geofenced areas. Each U-BTS comprising part of the NE coverage area may broadcast a unique LAC or may share a LAC with one or more other U-BTSs, generating smaller active geofences within the NE coverage area.

The RNM is set to trigger on location updates and the unique LAC 501 At some time, and idle mobile enters the geo-fenced area 503 either by movement, by the U-BTS activation, or the mobile power-on. The mobile detects the new location area 504 and begins the Location Update procedure 505, treating the U-BTS as a candidate base station and the Network Emulator (NE) as the local radio communications network. The NE proceeds with the Location Update 506.

The RNM detects the Location Update 509 either using the initial random access channel (RACH) Channel Request with the Establishment Cause value set to Location Update, the Immediate Assignment downlink message, or by the subsequent Location Updating Request on the Standalone Dedicated Control Channel (S-DCCH). The RNM extracts mobile identity information, serving cell, RF channel information then passes the information to the Location Application Database 510 and to the NA-WLS. Depending on the location technology (cell-ID with timing-based ranging, cell-ID with power-based ranging TOA, ECID, TDOA, AoA, and/or Hybrid) deployed as part of the NAWLS, a location estimate is computed 511.

Figure 6:
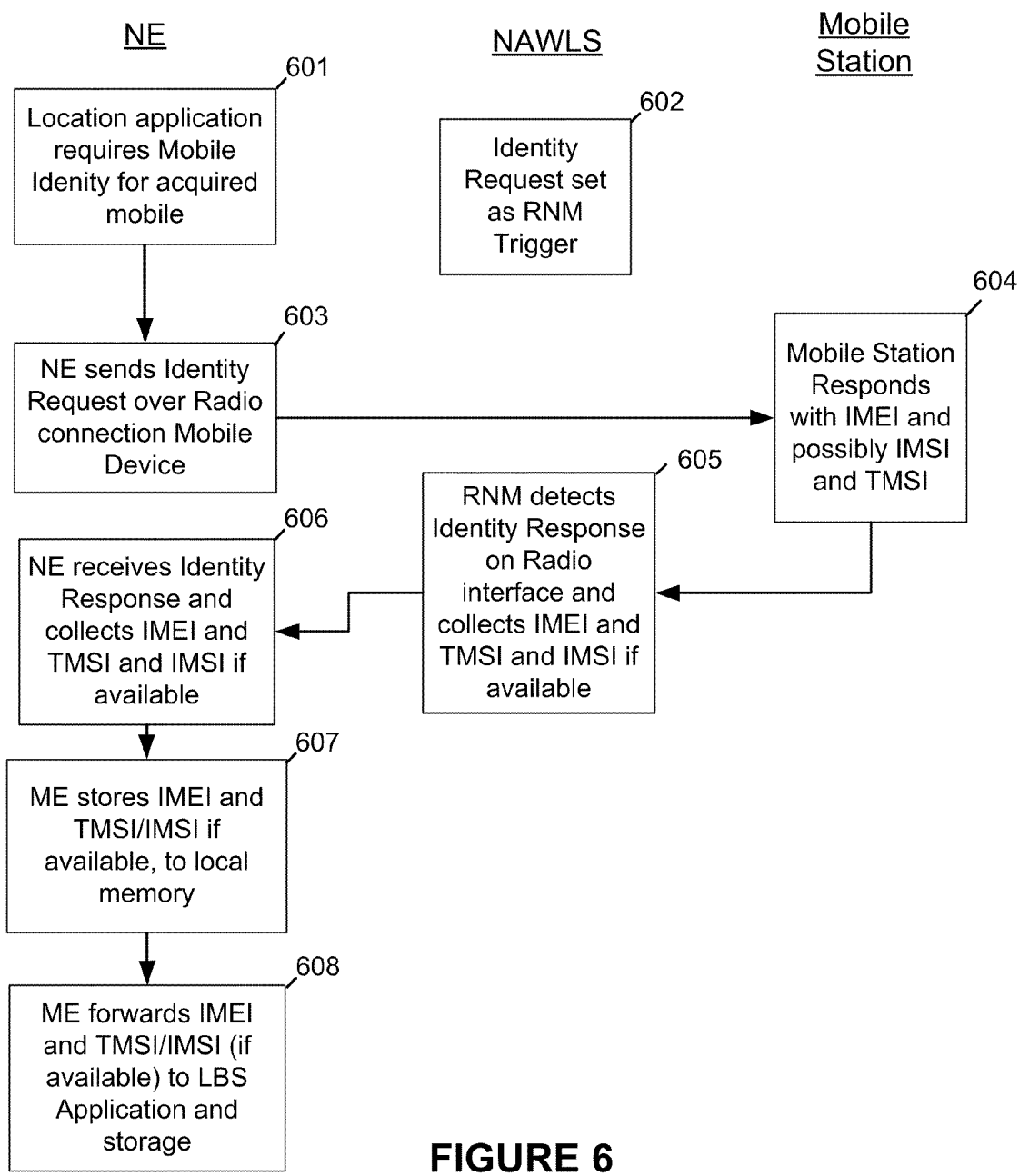
FIG. 6—Operational Flow Chart for the active collection of additional mobile identifiers.

During the Location Update Transaction, the NE interrogates the mobile for identity information 507 and the mobile responds with the requested identified 508. (For additional detail on identity interrogation, see FIG. 6.)

The location estimate and location error information are passed to the Location Application for evaluation, analysis and eventual storage 512. The mobile device has then failed its location update and returned to idle mode 513 (or completes a normal power-on registration) on the local WCN completely unaware of the identification and location actions performed.

Figure 5B:
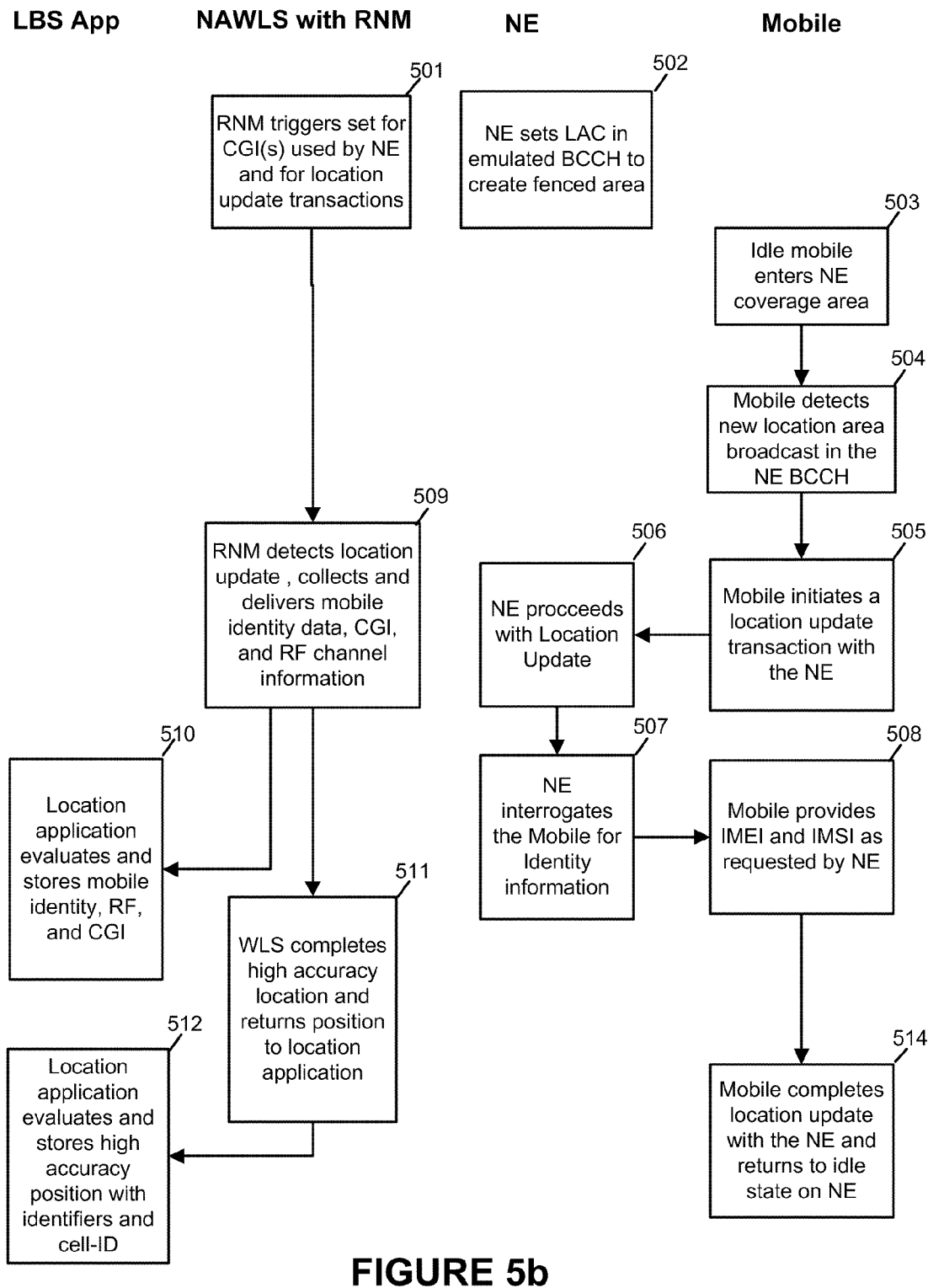
FIG. 5b—Operational Flow Chart for active collection of temporary and permanent mobile and subscriber identifiers and high accuracy locations.

FIG. 5b—Active Acquisition

FIG. 5b shows the procedure for locating and identifying a mobile during an example forced complete GSM Location Update procedure. This procedure is termed "active acquisition", where Acquiring includes use of a complete Location Update to the NE where the mobile ID is collected, current location is calculated and the mobile allocated mock or false control channel resources, under control of the NE, not the local WCN, allowing at-will re-location and service denial.

As with active sampling, the NE's U-BTS(s) are used to create a temporary geo-fenced area 502 (the area of the geo-fence is determined by the range of the U-BTS or coverage area of a distributed U-BTS) by broadcasting a beacon (Broadcast Channel and Synchronization) embedded with a unique Location Area Code (LAC) 502. As single U-BTS can be used to create a single geofenced area, or multiple U-BTS can be coordinated by the NE's Management Entity (ME) to provide larger areas or multiple separate geofenced areas.

The RNM is set to trigger on location updates and the unique LAC 501 At some time, and idle mobile enters the geo-fenced area 503 either by movement, by the U-BTS activation, or the mobile power-on. The mobile detects the new location area 504 and begins the Location Update procedure 505, treating the U-BTS as a candidate base station and the Network Emulator (NE) as the local radio communications network. The NE proceeds with the Location Update 506. Alternately, the NE can be set to trigger on Radio or Network events.

The RNM detects the Location Update 509 either using the initial random access channel (RACH) Channel Request with the Establishment Cause value set to Location Update or by the subsequent Location Updating Request on the Standalone Dedicated Control Channel (S-DCCH). The RNM extracts mobile identity information, serving cell, RF channel information then passes the information to the Location Application Database 510 and to the NA-WLS. Depending on the location technology (cell-ID with timing-based ranging, cell-ID with power-based ranging TOA, ECID, TDOA, AoA, and/or Hybrid) deployed as part of the NAWLS, a location estimate is computed 511.

During the Location Update Transaction, the NE interrogates the mobile for identity information 507 and the mobile responds with the requested identified 508. (For additional detail on identity interrogation, see FIG. 6.)

The location estimate and location error information are passed to the Location Application for evaluation, analysis and eventual storage 512.

The mobile device completes its location update and returned to idle mode registered to the network emulator and not the local wireless communications network (WCN) 514. This registration includes the assignment of mock uplink and downlink control channels, these channels under control of the NE, not the local WCN, preventing the mobile from receiving messaging from the local WCN and allowing the location application to trigger, via the NE, additional locations at any time.

Figure 5C:
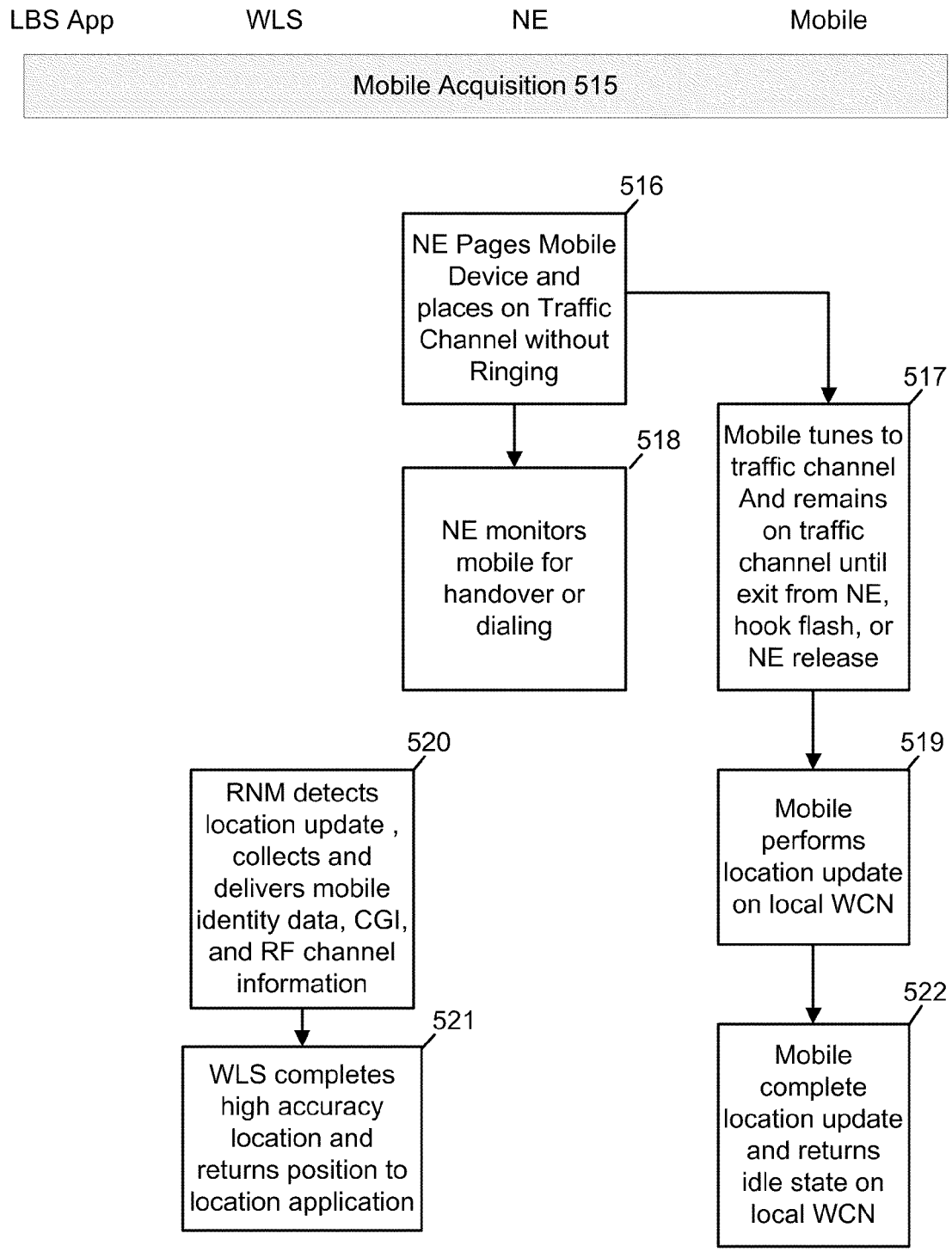
FIG. 5c—Operational Flow Chart for active capture of temporary and permanent mobile and subscriber identifiers and high accuracy locations.

FIG. 5c—Active Capture

FIG. 5c shows the procedure for service control and location of a mobile by an active network emulator. This procedure is deemed to "capture" a mobile device. Capturing includes use of a complete Location Update to the NE where the mobile ID is collected, current location is calculated and the mobile allocated mock control channel and traffic channel resources to allow continuous location and service denial.

Using the acquisition procedure detailed in FIG. 5c, the mobile is first acquired 515. Using the assigned mock control channels and the capabilities of the network emulator NE, the NE pages the mobile device via the serving U-BTS and places it on a traffic channel without ringing or otherwise alerting the phone's user 516. The mobile phone tunes to the NE provided traffic channel and remains on that channel until exit from the NE's coverage area, the user hangs up the call, or the NE releases the call 518. During the duration of the call, the NE monitors the call for handover requests back to the local WCN or for dialing by the phones user 519. If dialing is detected, the NE can play a service tone (for example a congestion tone) causing the user to terminate the call.

For whatever reason, once the traffic channel is lost or released, the mobile phone will perform a location update with the local WCN 520. Optionally, the RNM can be set to detect this Location Update transaction with the local WCN and passively collect the mobile identity information, cell/sector, and RF channel information 521 allowing a passive location by the WLS 522 and a final high accuracy location and velocity estimate after leaving the NE's coverage area.

The mobile device completes its location update with the local WCN and returned to idle mode registered to the local wireless communications network (WCN) 523.

FIG. 6

If the mobile identity is needed by the location application 601 and cannot be determined by forcing a location update, then the Identity Request Procedure is entered. The NE (via the serving U-BTS transceiver) and the Mobile device have previously established duplex communications where the U-BTS emulates a GSM Basestation. The NE, via the U-BTS, sends the Identity Request message to the mobile device 603 over the radio interface. The Mobile Station responds to the request with the Identity Response message that includes the International Mobile Equipment Identity (IMEI) of the MS and International Mobile Subscriber Identity (IMSI) of the SIM. The Radio Network Monitor (RNM) receives and detects the Identity Response message on the radio air interface and collects the IMEI, IMSI, and TMSI if available 605. The U-BTS also receives the Identity Response and collects the IMEI, IMSI, and TMSI if available 606. The NAWLS stores the IMEI, IMSI, and TMSI if available in local memory 607 regardless of the source. The NAWLS then forwards the mobile identity information to the Location Application 608. Alternately, the NE can be set to trigger the NAWLS on pre-set Radio or Network events while the RNM is used to monitor local radio bands and provide the NAWLS with radio channel data.

Figure 7:
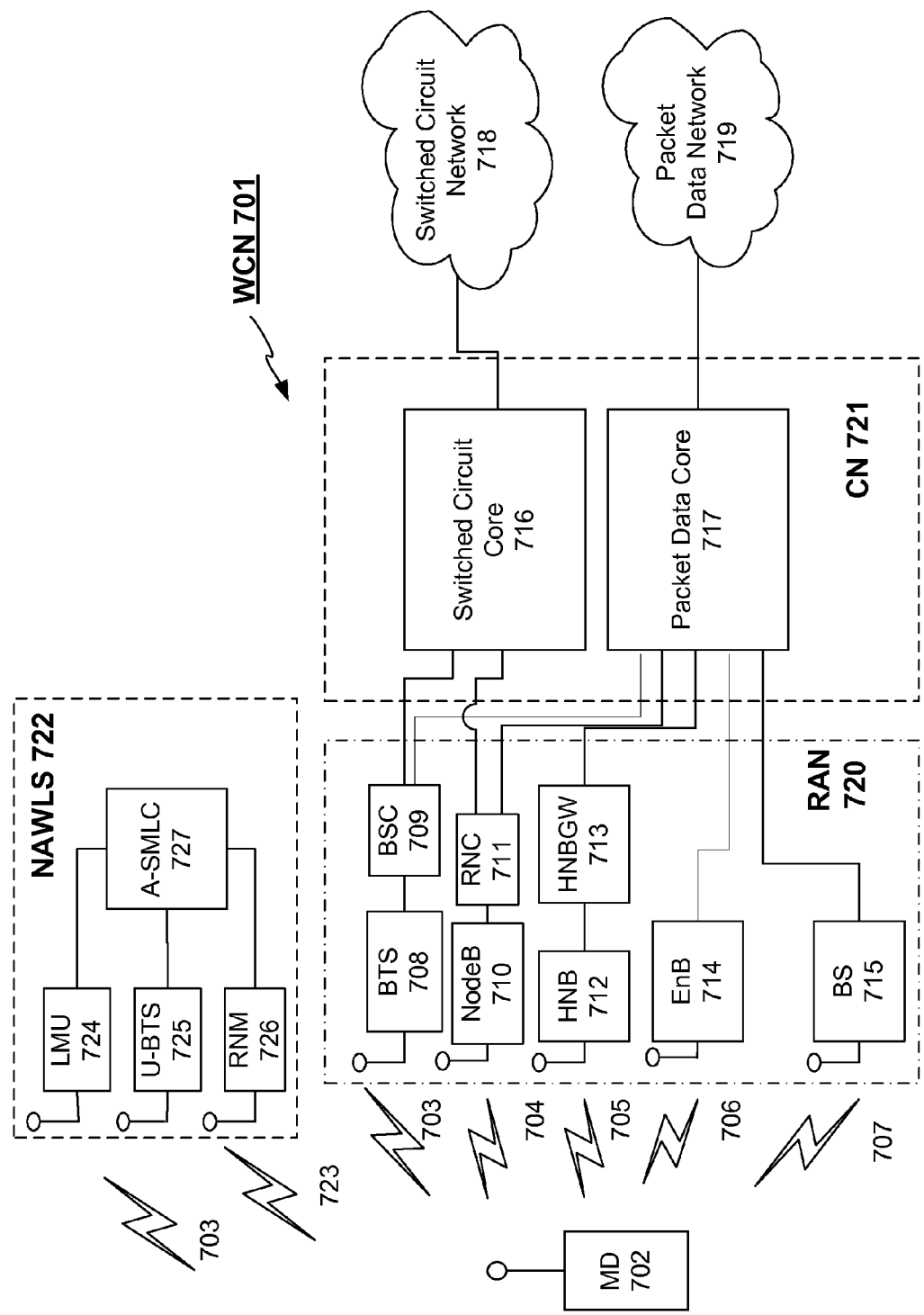
FIG. 7—Dual mode GSM/UMTS system with RNM and U-BTS.

FIG. 7—Multi-Mode LTE/GSM/UMTS System with NAWLS

FIG. 7 shows the architecture of an illustrative network reference model (NRM), using a simplification of the GERAN/UTRAN/LTE/GAN network. This architecture was originally established in 3GPP Technical Report 23.882, "*3GPP System Architecture Evolution: Report on Technical Options and Conclusions (Release 8)*"

In FIG. 7, the Wireless Communications Network (WCN) 701 is made up of the mobile device (MD) 702, the Radio-Access-Network (RAN) 720, the Core Network (CN) 721. The WCN 701 is in turn connected to external switched circuit networks 718 and Packet Data Networks 719.

The RAN 720 is shown as a multi-mode system with inter-radio-access-technology handovers possible between the various RAN technologies.

The GSM RAN technology with its Um 703 radio interface is enabled by the Base Transceiver Station 708 and Base Station Controller interconnected via the Abis interface.

The UTMS RAN technology with its Uu 704 radio interface is enabled by the NodeB 708 and Radio Network Controller (RNC) 711 with interconnected via the Tub interface.

The UMTS Femto-cell base RAN technology using the constrained power Uu-based 705 radio interface variant between the Mobile device 702 and the Home NodeB (HNB) 712 is connected to the Core Network via the Home NodeB Gateway (HNBGW) 713.

The LTE (also known E-TRAN) RAN technology with its OFDM-based 706 radio interface is enabled by the eNodeB 714 which connects directly to the Packet Data Core 717 of the Core Network 721.

The WLAN (such as a WiMAX or HiperLan radio network) RAN technology using its own radio communications link 707 is enabled by the radio base station (BS) 715 which connects directly to the Packet Data Core 717 of the Core Network 721.

Adjunct to the WCN network is the Network Autonomous Wireless Location Network (NAWLS) 722. The NAWLS includes geographically distributed elements (the RNM 726, the U-BTS 725, and the LMU 724) connected wirelessly to a remote Autonomous SMLC 727 which may further connect via wired or wireless links (not shown) to external LCS clients (not shown)

RNM

The radio network monitor (RNM) 726 is wideband multi-channel radio receiver, effectively a bank of ad hoc tunable narrowband receivers, tunable to both the uplink and downlink channels anywhere in the frequency band. The RNM 726 is preferably implemented as a distributed network of radio receivers capable of receiving RACH and SDCCH messages for autonomous generation of location services. The RNM 726 tunes to directed frequencies to gather data for the system. The RNM 726 can then forward the collected data to the A-SMLC 727. All RNMs 726 in a network are preferably time-and frequency-synchronized through the use of the Global Positioning Satellite (GPS) constellation (not shown).

The RNM 726 was initially implemented on an LMU radio receiver platform (the LMU as previously described in TruePosition's U.S. Pat. No. 6,782,264, deployable as a wideband software defined radio (the SCS) or as a bank of tunable narrowband radio receivers (the LMU))). The RNM 726 uses its radio receivers to collect signaling to trigger the wireless location system. The RNM 726 can detect and monitor both uplink (mobile device to BTS or NodeB or eNodeB or BS) and downlink radio communications. The GSM uplink and downlink radio air interface 703 is required, a second uplink and downlink radio air interface 723 is optional. The RNM 726 passively monitors message traffic within the wireless communications system as to trigger the wireless location system (WLS) and the network emulator (NE) based on pre-set criteria.

The RNM 726 and its operations, capabilities and functionality are described in more detail in U.S. application Ser. No. 11/150,414 "Advanced triggers for location-based service applications in a wireless location system".

LMU

The LMU 724, formerly known as the Signal Collection System (SCS), and also known as a mobile receiver site, is the primary component normally deployed at a carrier's cell sites, but in this case would be typically housed in mobile or portable forms with attendant antenna and facilities. The LMU 703 tunes to directed frequencies to gather data for the system. The LMU 703 then forwards the collected data to the SMLC 712 for Time-of-Arrival (TOA), Uplink Time-difference-of-Arrival (TDOA), Angle-of-Arrival (AoA), Signal Strength Measurements (SSM), Power Difference-of-Arrival (PDOA) or hybrid based location estimation. The LMUs 703 in a network are preferably time and frequency synchronized through the use of the Global Positioning System (GPS) or comparable wide-area timing source (not shown) or using highly stable internal clocks preset to a common system time. Use of the GPS or terrestrial radio broadcast timing signal may also be used to locate the LMU 703.

SMLC

The NAWLS network 722 further includes a Autonomous Serving Mobile Location Center (A-SMLC) 727. The A-SMLC 727 is preferably a high volume location-processing platform. The SMLC 727 contains U-TDOA, AoA, FDOA, PDOA and multipath mitigation algorithms for computing location, confidence interval, speed, and direction of travel. The A-SMLC also contains the software, data structures and database to enable use of mobile-based location techniques via the U-BTS 725 provided wireless communications link with the Mobile Device 702. These mobile-based and mobile-assisted location techniques include geo-techniques such as ECID, OTDOA, A-GNSS (A-GPS), and EOTD.

The primary functions of the Network Autonomous SMLC 727 are to receive reports on signal detection from the RNMs 726, to task LMUs 724, to receive signal and timing information from the LMUs 724, to perform location processing, and to calculate the location estimate for each signal. The SMLC 727 manages the LMU 724 and RNM 726 network(s) and provides local or remote access to location records. The SMLC 727 is responsible for the collection and distribution of location records. The SMLC 727 also maintains configuration information and supports network management. The A-SMLC 727 in the depicted example performs all the Network Emulator functions of command, control, coordination, data processing and data collection with the exception of transmission of the radio signaling required. Please note that in the deployment shown in FIG. 7, the A-SMLC 727 provides the functionality of a serving Mobile Location Center, a Network Emulator Management Entity, a GPS assistance server, and an OTDOA server.

U-BTS

A component of the Network Emulator, the Untethered Base Transceiver Station (U-BTS) 725 is the radio transceiver used by the NAWLS 727 to attract, sample, acquire or capture a Mobile Device 702. The U-BTS 725, under control of the A-SMLC 727, emulates the radio air interface(s) of a cellular base station in the local RAN 720 to temporarily attract mobile devices 702 and provoking communications which allow for mobile location and identification.

MD

The GSM, dual mode or multi-mode mobile device (MD) 702 should be capable of accessing the GSM network and may be able to access any of the other radio air interface types (UMTS, LTE, and/or WLAN). The Mobile Device 702 is also known as the Mobile, Mobile Phone, Mobile Station (MS), User Element (UE) or Mobile Subscriber Unit.

CN

A Core Network 721 provides interconnection services for the users of the WCN as well as administration capabilities for the network operator.

Switched Circuit Core

The Switched Circuit Core 716 allows interconnection of circuit-based voice and data connections to be made between wireless users and with land-side based users. Various call based services via a wireless intelligent network capability also reside in this section of the CN 721.

Packet Data Core

The Packet Data Core 717 allows interconnection of packet-based voice and data connections to be made between wireless users and with land-side based users. The Packet Data core provides basic routing and bridging functions as well as various network services.

Deployment—BTS, Node B Mapping

When the U-WLS is first deployed to an area or at anytime thereafter, the RNM 206 downlink monitoring facility will be used to scan for local beacons (BCCH, BCH). As described in TruePosition U.S. patent application Ser. No. 11/948,244, "Automated Configuration of a Wireless Location System," the WLS can locate these beacons geographically using downlink TDOA and store the beacon frequency, antenna geographic location, and broadcast information content in the SMLC database. The U-WLS may use the BTS/NodeB geographic locations for planning the deployment of NE(s), setting NE transmitter powers to minimize interference, and in location calculations involving handset-based techniques such as ECID, E-OTD, OTDOA, and A-GPS.

A. NE Beacon Adjustments

The Network Emulator (NE) node imitates base station beacons to entice mobiles within range of the NE transmission to register with the NE. By altering the beacon broadcast (in the prior art, the NE beacon is a duplicate of proximate beacon with an altered Location Area Code (LAC)) the mobile's uplink communications with the NE can be made more visible to an Untethered Wireless Location System (U-WLS) present in the same geographic area.

As described in European Patent EP1051053 "Method for identifying a mobile phone user or for eavesdropping on outgoing calls"; Frick et al. published Sep. 7, 2003; and U.S. patent application Ser. No.; 11/996,230; "Acquiring Identity Parameters by Emulating Base Stations"; Pridmore et al., filed: Jul. 17, 2006; a test mobile is used to scan the local beacons which the 'Virtual Base Station' or 'Simulated Base Station' then emulates the local base stations by changing the Location Area (broadcast in the System Information—Location Area Identification parameter block) so that the mobile attempts a location registration, transmitting a Location Update Request with the currently assigned TMSI to the NE.

For GSM systems the cell reselection by an idle mobile, or cell selection by a just powered on mobile to the NE requires Location Update. For UMTS mobiles, a Location Update to the NE is followed by the NE initiating a cell reselection to the GSM cell provided by the NE. The NE initiated cell reselection is done by moving UE to connected mode (cell_dch) and then issuing CELL CHANGE ORDER command (3GPP TS 25.931 section 7.13.5)

The NE may use directional antenna to both shape the area of acquisition and to avoid interference with local base stations. Shaping of the area of acquisition could be performed to limit the number of mobile's attempting to register or to increase the beacon power to a specific area.

A1. Active Beacon Broadcast Power Settings

An NAWLS may maintain real-time monitoring of both the RAN beacon transmissions and NE beacons. Using the geographically distributed RNM receivers, historical information, network propagation modeling, and terrain mapping, the NAWLS may actively adjust the transmit power of the NE(s) to limit co-channel interference. The NAWLS may also adjust the beacon transmit power to actively limit the number of mobile devices attempting to access the NE random access channel to prevent overload of the NE or U-WLS in the identification and location of the mobile devices.

Beacon Informational Elements

In a cellular, frequency reuse, wireless communications network, base stations broadcast network and cell information needed by mobile devices to access the wireless communications system. This broadcast is generally known as a beacon.

In a GSM system, four different System Information blocks (numbers 1-4) are transmitted on the BCCH, while blocks 5 and 6 are sent via the downlink slow associated control channel (SACCH) once a radio connection is in place. Details of the System Information blocks for GSM may be found in ETSI specification 04.08 "*GSM Mobile radio interface layer 3 specification.*" *The network broadcast system information for GERAN-based (EDGE) systems and UTRAN (UMTS) and E-UTRAN-based (LTE) systems may be found in* 3GPP Technical Specification (TS) 24.008 "*Mobile radio interface Layer 3 specification; Core network protocols; Stage 3*".

In the prior art, (European Patent EP1051053; Frick et al. published Sep. 7, 2003, a Virtual Base Station (VBTS) obtained a Broadcast Allocation (BA) list of base stations from the BCCH and copied these System Information blocks from local network base station beacon broadcasts using an instrumented mobile device to register with the local network. For the VBTS to collect mobile devices via the Location Update procedure, the received Location area identification (The Location Area Code (LAC) would be altered before the beacon was rebroadcast.

In the newly conceived NAWLS, the distributed RNM collects beacon information from local base stations without registration with the local wireless communications network and then the NE changes parameters within the System Information blocks derived from the collected beacons to make the mobile uplink more visible to the wireless location system, to minimize impact on the local network, and to prevent overload of the U-WLS and associated components. Since the mobile device is acquired through the transmission of an emulated beacon, the beacon parameter can be altered so that the accuracy and yield of the WLS is improved.

1) Emergency Call (EC) Control Parameter

To lessen the impact of the mobile identity and location scanning, the beacon for the NE may be set with the RACH control parameter element for Emergency Call set to disallow Emergency Calls.

In addition to the System Information—RACH control parameter Emergency Call (EC) flag set to disable Emergency Calls, GSM Mobiles with access classes 11-15 may be blocked from registering at the NE since mobile access control groups 11-15 are not barred when the EC flag is set.

2) Beacon Settings—Call Re-Establishment

In addition to the System Information—RACH control parameter, the call re-establishment flag may be set to not allow reestablishments 3) Beacon Settings—Access Control All GSM mobiles are members of one out of 10 randomly allocated mobile population groups, these groups were defined as Access Class (AC) 0 to 9 as originally defined in GSM specification 02.11. Certain GSM mobiles may have additional access classes allowing high-priority access. Access classes 11-15 are allocated to specific high priority users:

11—For Network Operator Use (e.g. test mobiles)
12—Security Services
13—Public Utilities (water/electrical/gas/etc)
14—Emergency Services
15—For Network Operator Use (e.g. employee phones)

Using the distributed RNM to scan for mobile registration, originations, and terminations, a histogram of the local network traffic can be generated without impact to the carrier network. Using this call density map, the NE's U-BTS generated beacon power and the access classes permitted to register to the NE can be controlled via changes to the beacon broadcast information elements to minimize impact to the wireless network and to maximize the resource use of the NE.

For instance, an area with large cells (rural) and low traffic density (as developed by the RNM) would allow the NE to use high-power U-BTS broadcasts with all access classes allowed to shorten the sample period. In and area with small cells and high traffic density (again as developed by the RNM), the NE would adjust individual U-BTS antenna power setting lower and apply allow each access class in turn by changing the access class in the System Information—RACH control Parameters data block.

In an effort to maintain the potentially covert nature of the NE, access classes 11-15 may be blocked at all times.

4) Cell Options

The NE can change the System Information Block 3 in the mimicked beacon to benefit the NAWLS. The SIB 3 block includes the Cell Options parameter. Within the Cell Options Parameter are the informational elements PWRC and DTX.

PWRC is power control. A TDOA, AoA or hybrid wireless location system is more precise when the mobile broadcast power is highest. So, PWRC be set by the NE to disable power control.

DTX is Discontinuous Transmission. A TDOA, AoA or hybrid wireless location system is more precise when transmission is continuous, so DTX will be set by the NE so mobiles must not use DTX when communicating with the U-BTS.

On the SACCH

Once the mobile device has been sampled and then registered to the emulated network by the NE, additional information may be delivered by the Slow Associated Control Channel (SACCH). System Information Block 4 may be used to convey to the mobile new cell selection parameters which include the Cell-Reselect-Hysteresis element, which may be reset up to 14 dB. Also on the SACCH, the System Information Block 5 may be delivered to transmit new Neighbor Cell Description parameters to limit the mobile's handover and re-selection potentials.

Figure 8A:
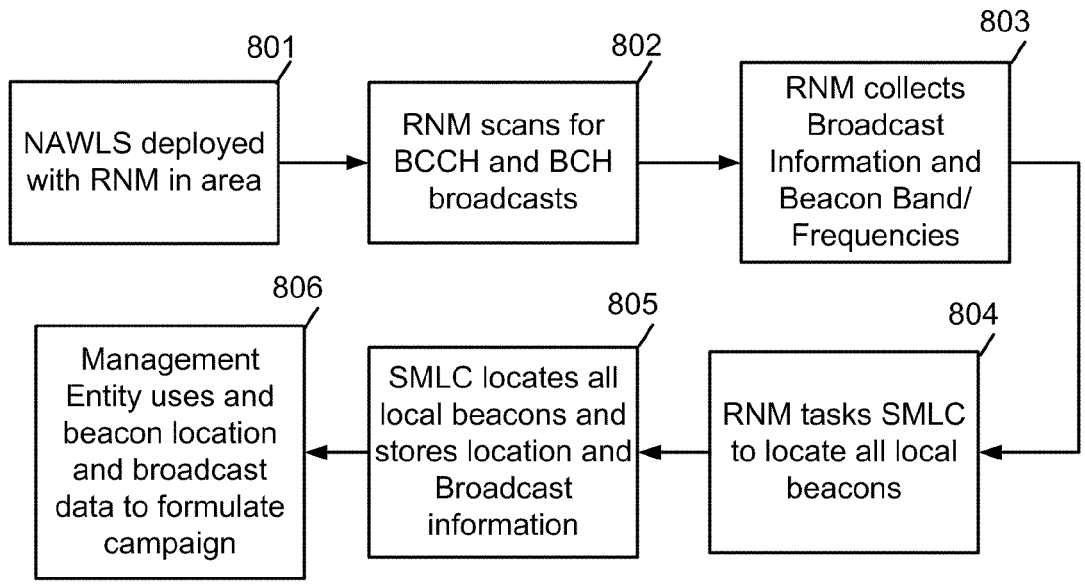
FIG. 8a—Operational Flow Chart for collection of local beacon locations and beacon informational content for campaign planning and modeling.

FIG. 8*a* is used to illustrate and procedure for collecting information about the local wireless communications network for use in a Network Autonomous Wireless Location System (NAWLS). Once the NAWLS has been deployed in the geographic area of interest 801, the Radio Network Monitor (RNM) is used to scan known frequency bands for BCCH (GSM) and BCH (UMTS) beacon broadcasts 802. The RNM receiver collects the broadcast information from each beacon with the associated frequency, band and channel information 803. The RNM then tasks the SMLC to locate each beacon, passing the collected signal and broadcast contents information to the SMLC 804. The U-WLS's SMLC, using its associated LMU's downlink receiver capabilities (which may be shared with the RNM) with the TDOA and or TDOA/AoA location capability, locates all beacons and stores the location information and broadcast contents information in the WLS database 805. The NE's Management Entity (ME) will use the collected beacon location, beacon content information and radio signal characteristics with maps, propagation models and potentially test call information to formulate the campaign where mobile station identity and location information can be collected 806.

Figure 8B:
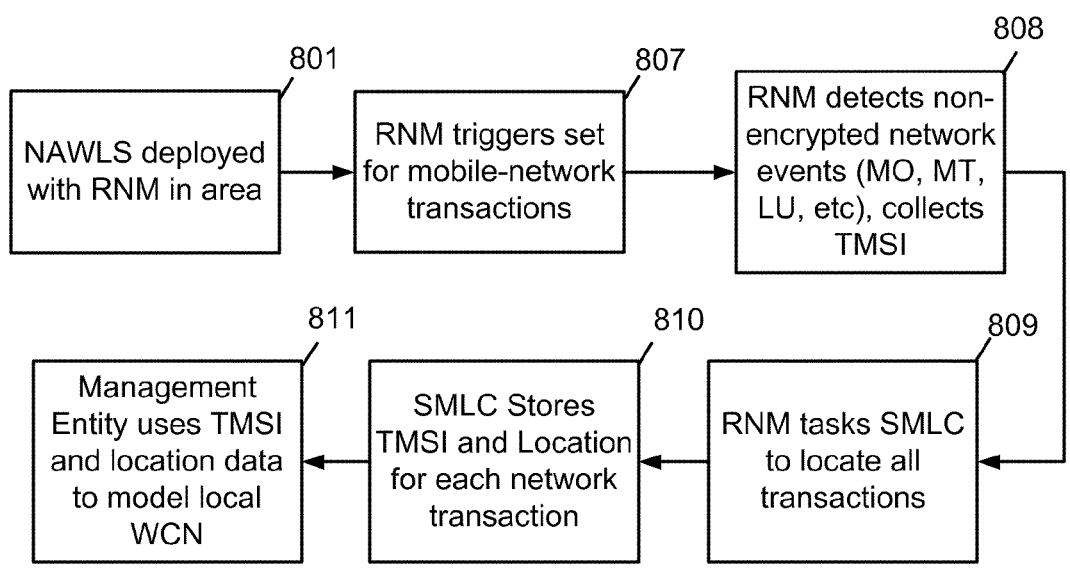
FIG. 8b—Operational Flow Chart for passive collection of mobile network transactions and mobile identifiers and locations for campaign planning and modeling.

In FIG. 8b, a call traffic map is created from passively monitoring network transactions to better formulate the mobile acquisition and location campaign. The NAWLS must be deployed to the local geographic area of interest 801. The Radio Network Monitor, using the collected beacon information content collected in step 803, scans for mobile-to-network control channel transactions such as mobile originations, terminations, registrations; and collects the temporary mobile identifiers associated with those events 808. The U-WLS's SMLC is tasked on each control channel event, and then locates these control channel events (as detailed in TruePosition U.S. Pat. No. 5,327,144, Jul. 5, 1994, "Cellular Telephone Location System," and U.S. Pat. No. 5,608,410, Mar. 4, 1997, "System For Locating a Source of Bursty Transmissions") and stores the results and associated information in the WLS database 810. The ME will then use the individually identified mobile locations and the beacon locations with collateral information to model the local Wireless Communications Network (WCN) 811.

Figure 8C:
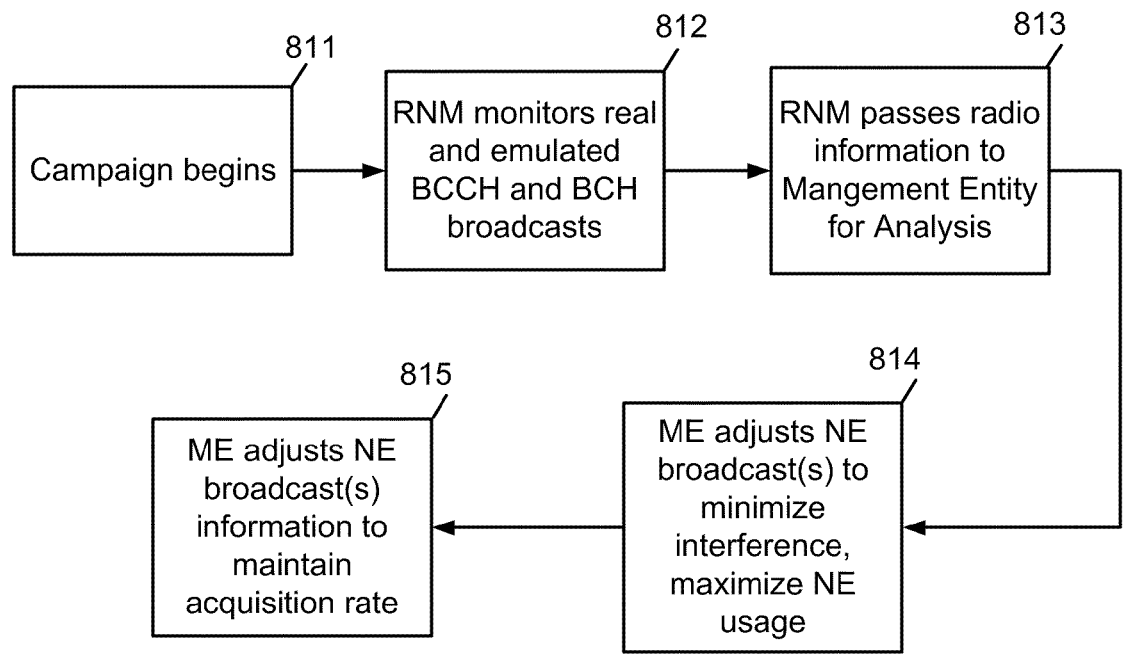
FIG. 8c—Operational Flow Chart for monitoring of the local wireless communications network and the emulated network for real-time adjustment and optimization of the emulated network during the campaign.

FIG. 8c is used to illustrate a procedure for using the Radio Network Monitor and radio propagation modeling to manage the broadcast(s) from the emulated network to minimize interference while maximizing NE resource utilization and the mobile acquisition rate. Starting with Step 811, the Campaign is started with all NAWLS system components in place and initial beacon, channel radio strengths, and beacon contents set. The RNM is used to monitor the beacon transmissions of both the emulated network and the local wireless communications network. Signal information is passed to the Management Entity for analysis 813 against the model previously created 811. The ME adjusts the NR broadcasts to both minimize the interference levels with the local wireless network and to maximize the NE resource usage in acquiring and collecting mobiles 814. The ME also adjusts the information broadcast by the NE the beacon(s) to maintain the acquisition rate at the adjusted power levels 815.

FIG. 9a

Figure 9A:
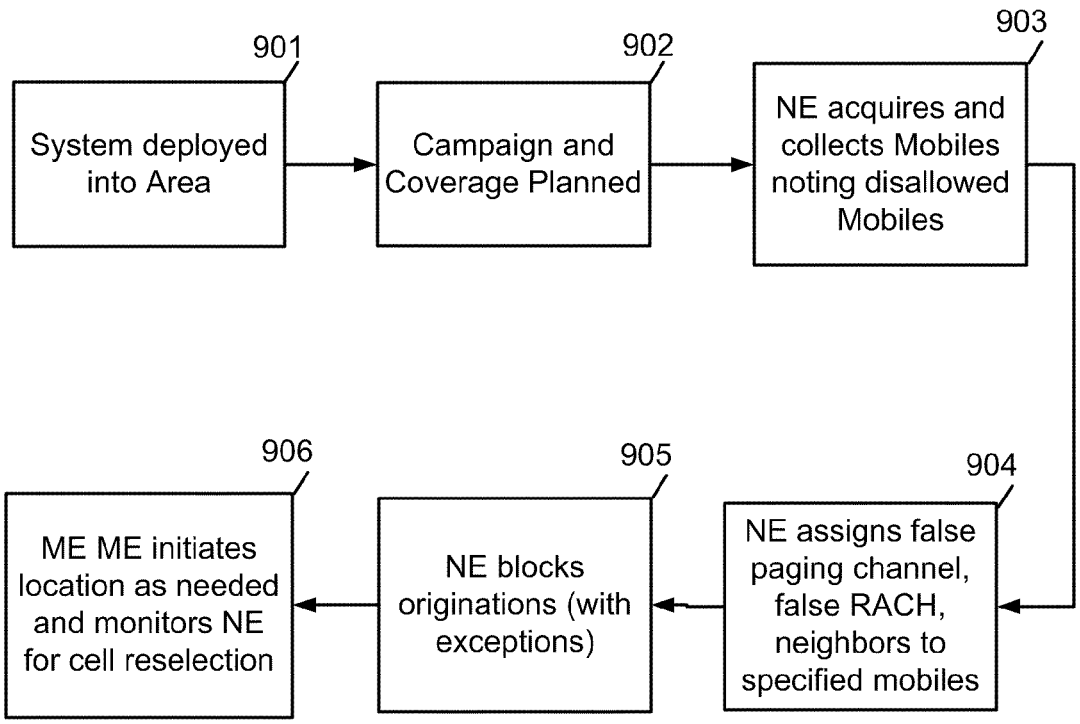
FIG. 9a—Operational Flow Chart for implementation of selective subscriber service denial using emulated control channels and based on subscriber identity and proximity to emulated network.

FIG. 9a is used to illustrate a procedure for using the U-WLS to create an ad hoc geofenced area where subscriber services can be selectively denied using emulated, mock control channel resources. Once the NAWLS is deployed in the geographic area 901 and the Campaign and coverage planning and modeling have been accomplished 902, the Network Emulator (NE) is set to acquire all idle mobiles 903 and then collect them by assigning them to false control channels 904. Collected mobile IDs are checked by the ME against pre-set data for allowed (white list), not-allowed (black-list), or conditionally allowed (grey list, includes conditional logic like time-of-day, allowed calling/called numbers, priority levels, etc). To block outgoing (mobile originated) calls from disallowed mobile devices, the NE, via the U-BTS transceiver station, emulates a RACH channel and an SDCCH allowing for prompt disconnection by emulating a congested network (DISCONNECT message on the downlink S-DCCH with cause value #42 "Switching equipment congestion" binary (0101010)) 905. Since the Beacon(s) of the NE have been set with the Emergency Call Flag in the RACH Control Parameters Block of the System Information Type 1 information word, an emergency services call would force the mobile to deselect the NE currently camped on and perform a location update and then mobile origination on the local wireless network cell with the strongest beacon signal. The ME monitors the local radio traffic via the Radio Network Monitor for cell reselection 906 outside the NE cluster via a location update request message from the collected mobile 906 all the while initiating location requests to the U-WLS as needed by the location-based services application. Even though the mobile has left the geo-fenced area, identification and location on mobile-network transactions (originations, terminations, Any_Time_Interrogations, SMS) is still possible until the TMSI is changed by the local network.

FIG. 9b

Figure 9B:
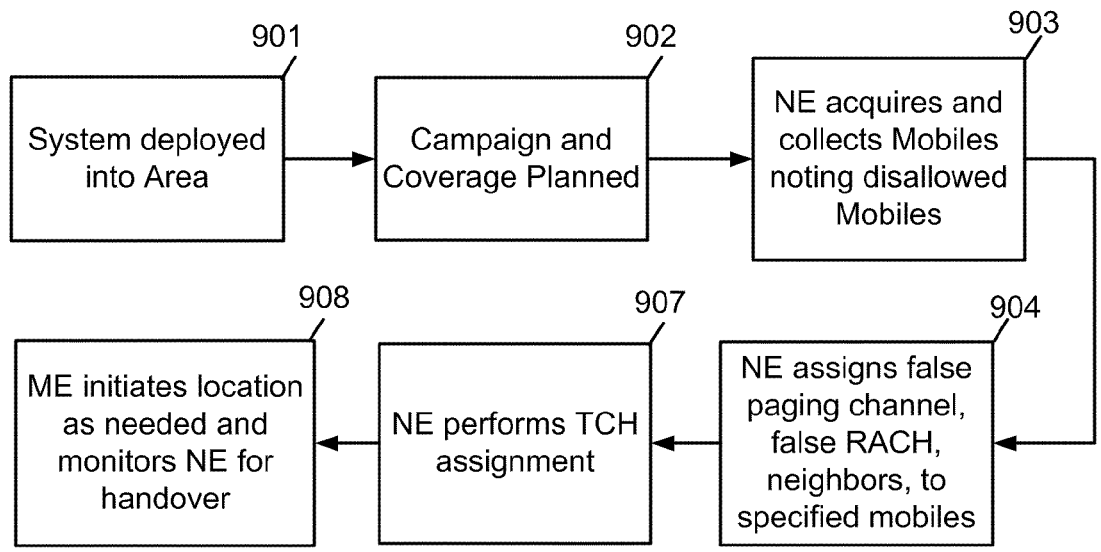
FIG. 9b—Operational Flow Chart for implementation of selective subscriber service denial using emulated traffic channels and based on subscriber identity and proximity to emulated network.

FIG. 9b is used to illustrate a procedure for using the U-WLS to create an ad hoc geofenced area where subscriber services can be selectively denied using emulated traffic channel resources. Once the NAWLS is deployed in the geographic area 901 and the Campaign and coverage planning and modeling have been accomplished 902, the Network Emulator (NE) is set to acquire all idle mobiles 903 and then collect them by assigning them to false control channels 904. Collected mobile IDs are checked by the ME against stored data for allowed (white list), not-allowed (black-list), or conditionally allowed (grey list, includes conditional logic like time-of-day, allowed calling/called numbers, priority levels, etc). For specified disallowed mobiles, NE uses the U-BTS's emulated control channel resources to perform a modified Mobile-Terminated call where ringing of the mobile phone is suppressed, but a traffic channel is assigned 907. During the course of the modified Mobile-Terminated call, a congestion tone is played by the NE over the channel. The ME monitors the NE and the collected mobile for handovers, initiating location requests to the U-WLS as needed 908 by the location-based services application. If the handover attempt is to a cell not part of the NE cluster, the ME terminates the call immediately, otherwise the call is allowed to handover to other network emulator nodes in the distributed cluster. After call termination, the mobile will perform a location update with the local wireless communications network. Even though the mobile has left the geo-fenced area, identification and location on mobile-network transactions (originations, terminations, Any_Time_Interrogations) is still possible until the TMSI is changed by the local network.

Figure 10A:
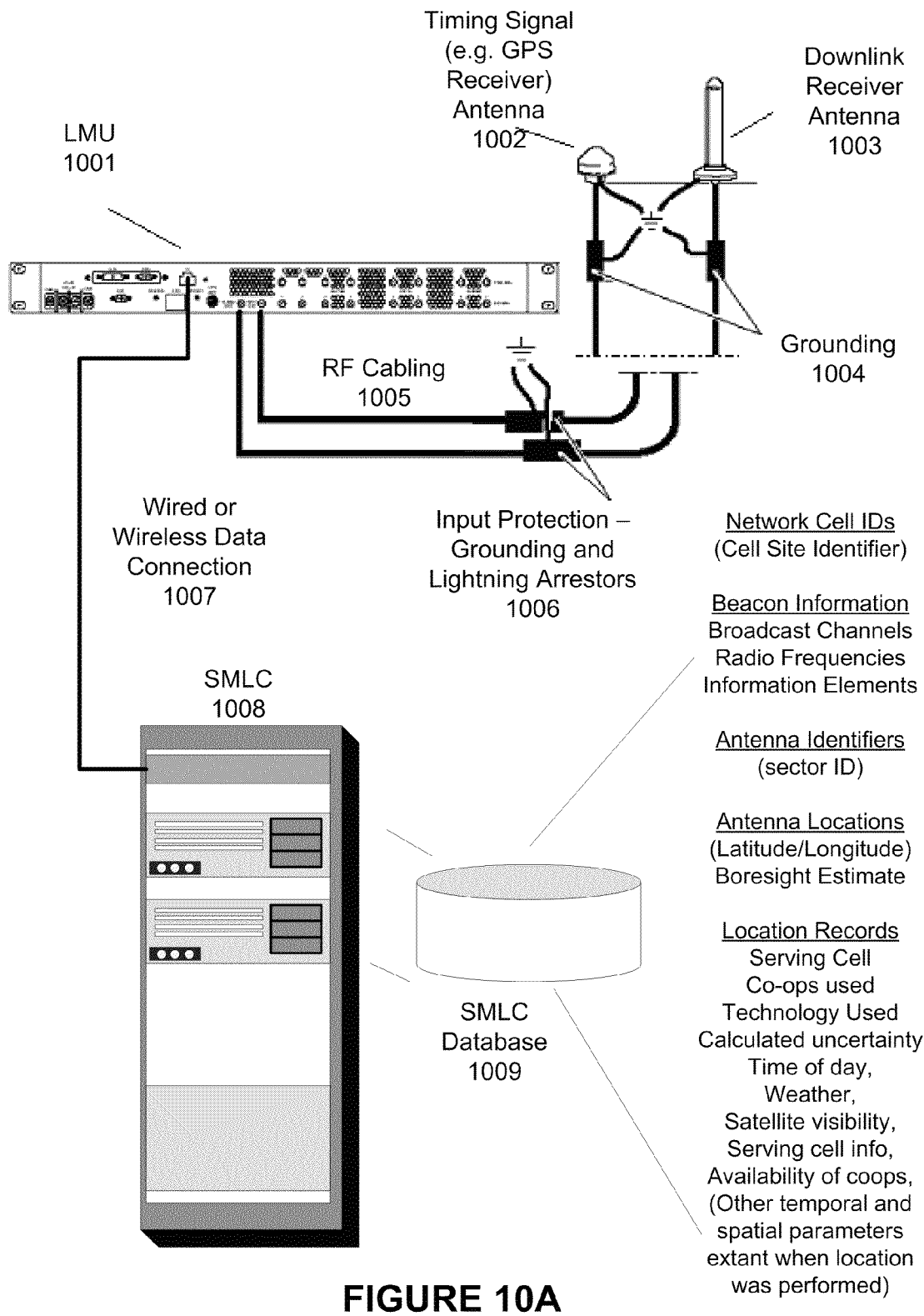
FIG. 10a—Depiction of the Wireless location system nodes, interconnection and database facilities to support Network Autonomous Ad Hoc Wireless Location.

FIG. 10a shows the present deployed overlay wireless location system comprising the LMU 1001, the GPS Receiver Antenna 1002, the downlink receiver antenna 1003, the radio frequency cabling 1005, grounding 1004 and input protection 1004 needed to safely interface the LMU 1001 to the exterior mounted antennae 1002, 1003. Although depicted as presently deployed, the network autonomous system would preferably use wireless links and requires the more extensive SMLC database 1009 (as shown). As shown in FIG. 10a, the LMU 1001 connects to the SMLC 1008 via a wired or wireless connection 1007 which carries TCP/IP packet-based communications. The SMLC 1008 hosts the WLS Database 1009 which contains the network cell identifiers, network antenna identifiers, network antenna locations, LMU locations LMU identifiers, wireless network cell locations, wireless network cell identification information as well as historical location and other wireless network data. Use of the LMU's downlink receive antenna subsystem allows the LMU to detect and demodulate the beacon broadcasts from surrounding cells and sectors. Originally used to receive and demodulate the beacon of the resident cell and sectors, the beacons of non-resident cells and sectors in proximity to the LMU and thus collect the CGI, BSIC, and frame timing offsets of each beacon, the LMU's downlink receive antenna subsystem may be integrated with the Radio Network Monitor for passive location both network base stations and mobile devices.

In the ad hoc U-WLS, the downlink receive antenna subsystem will be used to receive and demodulate the beacons of geographically proximate cells and sectors of the underlying wireless communications network. The downlink receiver subsystem of the LMU is also used for signal collection for a TDOA-based location estimate of each CGI/CI detected by the LMU.

During the initialization of the U-WLS, all detectable beacons from the deployment area's cells and sectors are identified via CGI or CI and the list of CGI/CI uploaded to the SMLC. Under the direction of the SMLC, the Wireless location system (WLS) performs TDOA location calculations for each cell or sector downlink transmission antenna. The produced table of CGI/CI values and CGI/CI antenna locations will be used to provision the SMLC and along with the wireless system information broadcast by the local Basestation(s) the U-BTS.

Periodic or ad hoc scanning of the detectable beacons by the downlink receiver subsystem can be used to detect changes in the local wireless communication system's configuration. Dependent on the campaign duration, this may not be necessary.

The GSM system uses the broadcast control channel or BCCH, a downlink (BTS to Mobile device) channel, to convey the beacon function on a per CGI basis. The UMTS network uses the Broadcast Channel, a downlink UMTS transport channel that is used to broadcast cell and system information on a per CI basis. The available information broadcast for use by a mobile station (MS) or User Equipment (UE) for selection and access to a GSM or UMTS system is stored in the central database indexed on a CGI/CI basis.

Figure 10B:
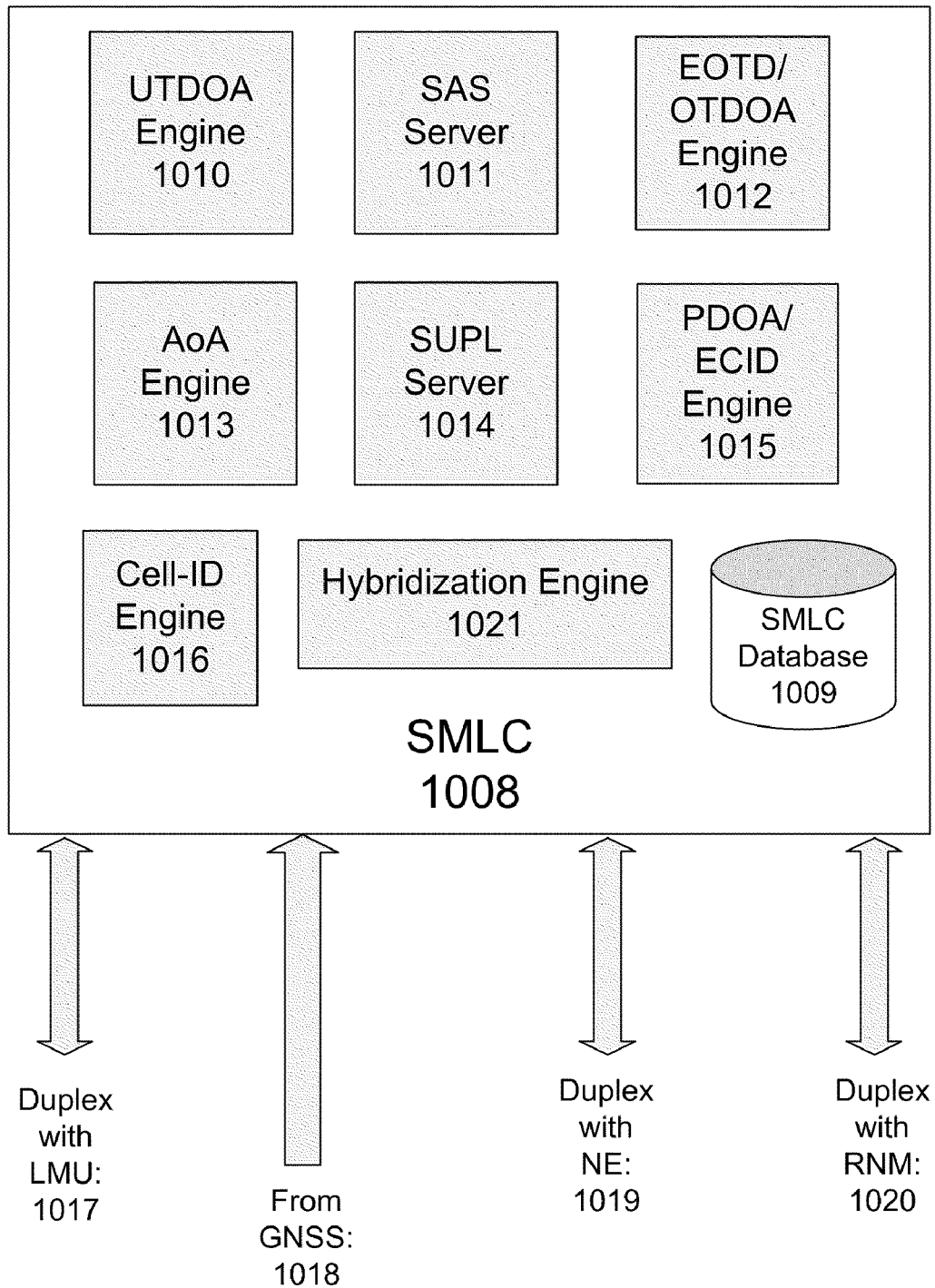
FIG. 10b—Depiction of the Location Computation Resources at the Untethered Serving Mobile Location Center.

In FIG. 10b, a representation of the SMLC location computational resources and interfaces is depicted. The SMLC 1008, is a general computing platform or a cluster of such platforms. The SMLC 1008 contains within its programming the algorithms and data structures (henceforth deemed "engines" or "servers") for location calculation using multiple location techniques and hybrids of said techniques. Dependent on the network-based, mobile-based or satellite-based receivers available for use by the wireless location method, the SMLC 1008 may contain (depending on user elections) a Uplink time-difference-of-arrival (U-TDOA) engine 1010, an Angle-of-Arrival engine 1013, a Standalone Assistance Server (SAS) 1011, a SUPL server 1014, an Enhanced Time-difference of Arrival (EOTD) and Observed Time Difference Engine 1012, and a Power-difference-of-Arrival (PDOA) and Enhanced Cell-ID (ECID) Engine 1015 and a Cell-ID Engine 1016 (Cell-ID here includes cell-ID with timing-based or and/or power-based ranging (e.g. CGI+ TA, CI+RTT, CGI+RSSI, etc).

The SMLC 1008 uses TruePosition's constrained Weighted Least Squares Algorithm as introduced in TruePosition's U.S. Pat. No. 5,327,144; "Cellular telephone location system" as part of the Hybridization Engine 1021 to produce the highest accuracy location estimate at the highest yield using the available location technologies.

The SMLC 1008 communicates with the distributed network of U-TDOA and/or AoA receivers (the Location Measurement Units (LMUs)) in duplex fashion 1017, distributing channel information to the receiver network and receiving signal-of-interest data from the tasked receivers. Additional LMU network housekeeping, management and provisioning messaging use the same duplex link 1017.

The SMLC 1008 receives timing information, ephemeris data, and almanac data from the GNSS receiver via packet data link 1018 for use by the SAS server 1011 or SUPL server 1014 in creating the assistance data package used by the mobile-based and mobile-assisted GNSS techniques enabled by the SAS server 1011.

A duplex packet data link 1019 with the Network Emulator (NE) is maintained SMLC 1008. The SMLC-NE link 1019 is used by the SMLC to communicate with mobiles captured by the NE allowing use of mobile-based location techniques (ETOD, OTDOA, PDOA, ECID, Cell-ID) in conjunction with the local radio communications network data collected by the RNM and stored in the SMLC database 1009.

The SMLC 1008 maintains a packet data link to the Radio Network Monitor (RNM) system 1020. This link 1020 is used to convey radio signal information collected by the RNM from the local wireless communications network and the Network Emulator. Additional RNM system housekeeping, management and provisioning messaging use the same duplex link 1020.

Figure 11:
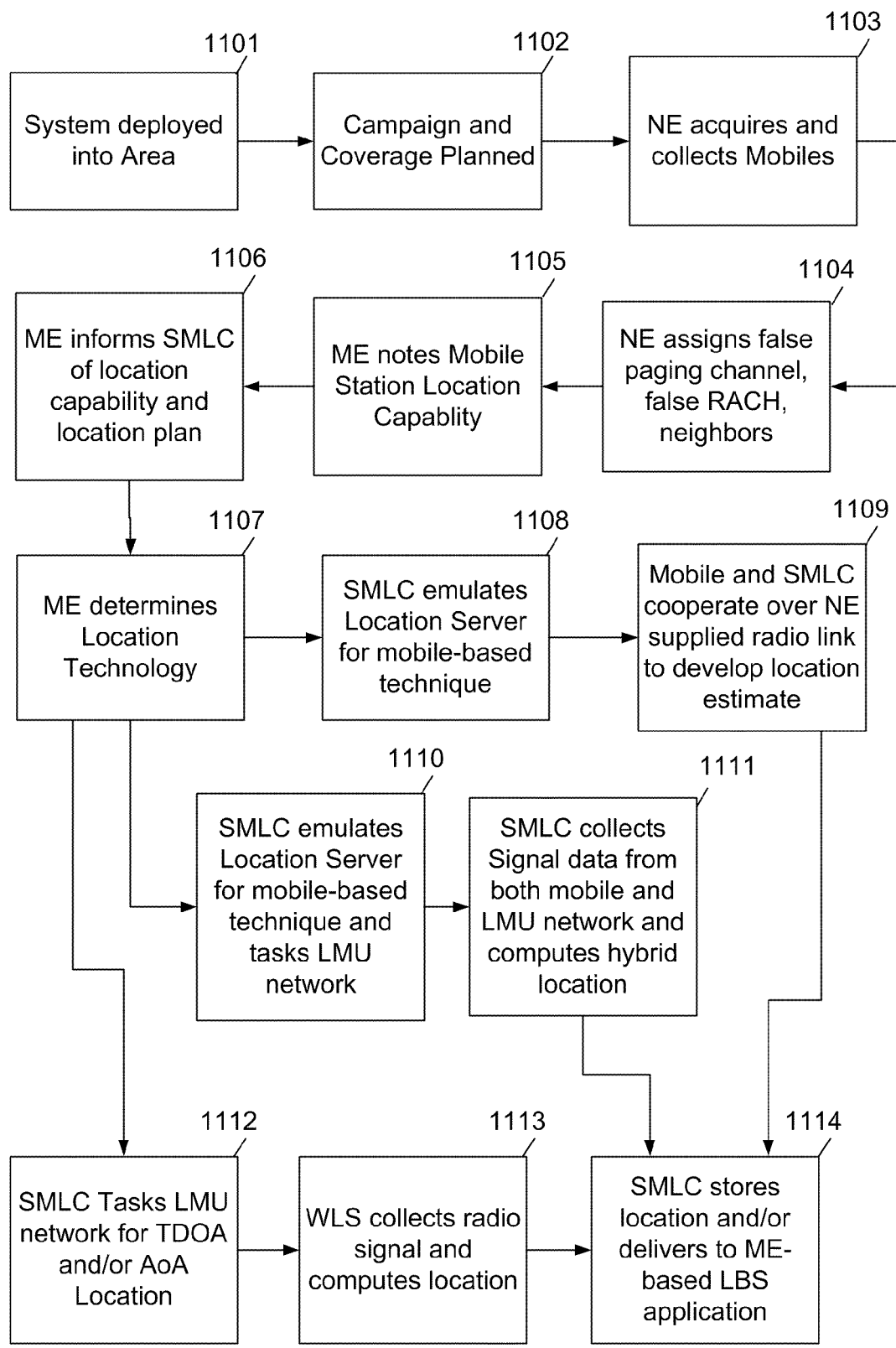
FIG. 11—Operational Flow Chart for use of mobile-based location technologies under the temporary control of the Untethered Wireless Location System.

In FIG. 11, an example of how the U-WLS can make use of a mobile's on-board location capability can be used for mobile positioning. After the U-WLS is deployed to the desired area 1101, and the campaign and coverage area has been determined 1103, the network emulator(s) are used to acquire and collect local idle mobile stations 1103. The NE assigns the mobile to a set of false control channels and limits the neighbor list to prevent the mobile from handing off before positioning can be completed.

Once the Network Emulator has acquired a Mobile device, the mobile's onboard location capabilities (if any) become available to the NE for use in locating the Mobile device.

As part of the acquisitions and collection process, the Management Entity (ME) notes the Mobile Station's Location Capability (part of Mobile Station Classmark Type 3 as defined in 3GPP 24.008 v7.0.0) 1105. The mobile LCS capability and the rough location (cell/sector, cell/sector with timing advance or cell/sector with path loss) are used by the ME to determine a location plan with priority, periodicity, and accuracy quality of service. This location plan is transmitted to the SMLC along with the relevant radio channel, device capability, and rough location information 1106.

If the ME has elected for a mobile-based location estimate, then the SMLC emulates the Location Server for that technology (EOTD, OTDOA, GPS, A-GPS, SUPL) using the local network information (beacon identifications and antenna locations) previously collected and if needed, the GPS reference signals collected by the LMU or RNM based GPS receivers. The SMLC signals the mobile for a Network Initiated Location Request over the NE supplied radio channels and together a mobile assisted or mobile-based location estimate is developed 1109.

If the ME has elected for a network-based location estimate, then the SMLC tasks the LMU network for a U-TDOA or AoA location 1112 based on the LMU deployment's capabilities. The Wireless Location System (LMU network and SMLC) collect the radio signal and computes a location 1113.

If the ME has elected for a hybrid mobile-network location, the SMLC emulates the location server for the requested mobile-based technology and tasks the LMU network 1110. The SMLC collects signal information from both the mobile and LMU networks and computes a hybrid location based on all available signal and collateral (such as map data or propagation models; see U.S. Pat. Nos. 6,108,555 and 6,119,013 both entitled "Enhanced Time-Difference Localization System" for more details on collateral information useful to a WLS) information 1111. An example of a TDOA/A-GPS hybrid wireless location system can be found in U.S. Pat. No. 7,440,762, Oct. 21, 2008, "TDOA/GPS Hybrid Wireless Location System", incorporated herein by reference. Regardless of the mobile, network or hybrid wireless location technique used, the SMLC stores the location estimate and related information (as shown in FIG. 10) and can deliver the location to a location application, for example based on the ME server, either in real-time, on request or periodically.

Using the Mobile Location Capability—ECID

If the NAWLS elects not to use TDOA or AoA location technique, the Enhanced-Cell-ID (ECID) is available for all GSM capable mobile devices. ECID is especially useful for long duration location series in geo-fencing applications when using the NE to acquire the mobile and tune the mobile to a silent traffic channel.

As detailed in U.S. patent application Ser. No. 11/150,414, "Advanced Triggers For Location-Based Service Applications In A Wireless Location System," the Measurement Report (MR) may be sent by a GSM mobile periodically during an active voice or data session and may be sent while the mobile device in on a control channel. The MR is used by the mobile device to inform the wireless network of the mobile device's potential need for a handover and contains downlink (base station to mobile device) measurements on neighboring transmitters (sector antennae or omni-directional cell antennae).

For all digital cellular wireless networks, during a voice or data session, the mobile device uses idle time to retune its receiver to monitor the broadcast channels (also known as beacons) of nearby base station antennae. For the serving or primary cell, the mobile measures both the beacon receive level and the receive quality; for all other neighbors in the measurement report, only receive level is normally available. In some spread-spectrum technologies, the path-loss measurement is returned rather than the received beacon strength.

In GSM measurement request is only available during an active (encrypted) session on the FACCH and thus the RNM 209 cannot normally be used without key sharing. However; a mobile that has been acquired by the NE 207 can either suppress ciphering for the duration of the NE session allowing the RNM 209 to acquire the MR or the NE can communicate the MR to the U-WLS 208 directly for use in an ECID location.

The ECID handset-based location technique relies on the mobile device's ability to record the power levels (RXLev) of multiple potential handover candidate/neighbor cells. This technique adds a power-difference-of-arrival (PDOA) measurement, derived from the existing GSM Measurement Report (MR), in an attempt to improve a CGI+TA-based location estimate.

The PDOA value is based on the received signal levels (RXLEV) collected by the mobile for the serving cell and at least three neighboring cells. Since the PDOA data collection requires visibility to three or more neighbor cell sites, yield will be less than 100%. The effects of RF multipath, mobile receiver quality, and granularity of the 7-bit RxLEV measurement act to reduce location accuracy.

Since ECID uses PDOA multi-lateration, the geographic layout of the neighbor cells also affects the quality of the location through geographic dilution of precision. The limitation of only 6 neighbor cell RxLEV measurements present in the MR limits accuracy by limiting potential GDOP reduction though site selection. Since the NE can control the neighbor list broadcast in the BCCH. Since the NE can collect the MR reports from the mobile device, the ECID technique can be used to localization in cases where TDOA or AoA location is unobtainable, or the case when the NE has assigned the mobile device to a traffic/data channel.

Using the Mobile Location Capability—E-OTD

If the NE 207 determines that the mobile acquired possesses E-OTD (Enhanced Observed Time Difference) capability (as described in 3GPP TS 03.71). The NE 207 may signal the mobile to perform such location attempt by issuing a location request to the MS 201 and receiving location estimates or measurement results in response. Either MS-based or MS-assisted E-OTD may be selected by the NE 207.

Using the Mobile Location Capability—GNSS

If the NE 207 determines that the mobile acquired possesses GNSS capability, it informs the U-WLS over data link 213. The U-WLS 208, emulating the 3GPP defined Standalone-Assistance Server (also known as the Standalone-SMLC), as defined in 3GPP TS 25.305 *"UE positioning in UTRAN—Stage 2"*, may then elect to issues a location request to the mobile device 201 via the datalink 213, the NE 207 and the second mobile uplink and downlink 211.

A stand-alone GPS receiver (a) must search for satellite signals and decode the satellite navigation messages before computing its position—tasks which require strong signals and additional processing time. A cellular telephone network can assist a GPS receiver (b) by providing an initial approximate position of the receiver and the decoded satellite ephemeris and clock information. The receiver can therefore utilize weaker signals and also more quickly determine its position.

Using the Mobile Location Capability—A-GNSS

If the NE 207 determines that the mobile acquired possesses A-GNSS capability, it informs the WLS over date link 213. The WLS, emulating the 3GPP defined Standalone-Assistance Server (SAS), may then elect to issues a location request to the mobile device 201 via the datalink 213, the NE 207 and the second mobile uplink and downlink 211. The U-WLS 208 emulates the standalone assistance server (SAS) and provides to the GNSS receiver: precise GNSS satellite orbit and clock information; initial position and time estimate, satellite selection, range, and range-rate information.

In the preferred MS-assisted mode, the U-WLS 208 via the network emulator supplies assistance data to the handset's A-GPS engine via the radio link. The handset then measures apparent distance from the GPS satellites in view and sends the data to the U-WLS 208, which calculates the phone's location. The Assisted mode lightens the load on the mobile's GNSS receiver which simply collects range measurements and transmits them to the WLS via the emulated network radio connection.

Using the Mobile Location Capability—SUPL

If the NE 207 determines that the mobile acquired possesses A-GNSS capability, it informs the WLS over date link 213. The U-WLS 208, emulating the OMA defined SUPL server may then elect to issues a location request to the mobile device 201 via the datalink 213, the NE 207 and the second mobile uplink and downlink 211.

The emulated SUPL A-GNSS server 208 is a fully OMA compliant location solution. The OMA standard uses the NE 207 provided packet data link to transport data between the mobile handset 201 (GNSS-equipped mobile phones known as SUPL Enabled Terminals or SETs) and the emulated A-GNSS server within the SMLC to support location. The emulated SUPL system 208 uses the NE 207 provided data communications and services such as Short Message Service (SMS), Switched Circuit Data and GPRS. The emulated SUPL server 208 supports both Mobile Station (MS)-Based and MS-Assisted A-GNSS Modes. In the described system, only the network-initiated location procedures are supported, allowing the mobile device 201 be located by the network Using the Mobile Location Capability—OTDOA If the NE 207 determines that the mobile device acquired possesses OTDOA capability, it informs the WLS over date link 213. The U-WLS 208, emulating the UMTS serving SMLC may then elect to issue a location request to the mobile device 201 via the data link 213, the NE 207 and the second mobile uplink and downlink 211. Normalization of the relative time offsets would occur at the WLS. OTDOA uses the relative timing offset of the Common Pilot Channel (CPICH) associated with different Node Bs in the RAN network. Each OTDOA measurement describes a line of constant difference (a hyperbola) along which the UE may be located. The UE's position is determined by the intersection of hyperbolas for at least three pairs of Node Bs. In this case, the Node Bs would be associated with local UMTS wireless communications networks and potentially the NE 207. The time differences between local NodeB CPICH would be determined by the RNM 209 and passed to the U-WLS 208 for use via data link 214.

As a unique feature, since the U-WLS 208 and RNM 209 have located all local Node Bs for every network operator, the NE 207 may force the mobile device (UE in UMTS) 201 to find the CPICH of every local network and an optimal configuration with the best signal strength and topology may be used in the location determination.

If multiple NE's 207 or multiple U-BTSs 224 under the same NE 207 are deployed in the area with common clocks (such as the GPS derived System Time, pre-synchronized highly stable internal clocks, or receivers for a terrestrial radio timing signal) the CPICH of the NEs 207 emulated BCH 210 may be used and an absolute timing offset determined.

TDOA, also known as multi-lateration, is based on measuring the difference in the signal's propagation time between pairs of geographically distributed receiver sites and determining the location via correlation processing. U-TDOA (Uplink Time Difference of Arrival) determines a mobile phone's location by comparing the times at which a cell signal reaches multiple (three or more) Location Measurement Units (LMUs). LMUs are normally installed at the operator's base stations. In untethered mode, the U-TDOA LMU receivers are dispersed in and around the area of interest. Since location accuracy of U-TDOA is influenced by the receiver deployment density and network layout of LMUs, the untethered ad hoc wireless location system U-TDOA accuracy can be optimized by placing receiver antennae at the most advantageous locations.

Since U-TDOA relies on mobile phone uplink (mobile-to-base station) transmissions, U-TDOA requires no modifications to the mobile phone. As a network-based technology, U-TDOA requires only that the mobile phone transmits for location, thus both control channel and traffic (data/voice) channel locations are possible.

The uplink Angle of Arrival (AOA) location method uses an antenna containing a multiple element array in which the exact location of each AOA (Angle of Arrival) element is known precisely. Each element is small and capable of receiving a separate signal. By measuring signal strength, time of arrival, and phase at each element of the array, it is possible to calculate the line-of-sight path from transmitter to receiver. Placing another receiver with the same antenna configuration in a different location allows you to repeat the process. The intersection point of the two line-of-sight paths represents the location of the transmitting mobile phone.

Like U-TDOA, AoA employs specialized receivers at the base stations in addition to the construction of directional antenna arrays on the existing cell tower. In untethered deployments, the AoA LMU receivers are dispersed in and around the area of interest. Since location accuracy of AoA by the receiver deployment density and network layout of LMUs, the untethered ad hoc wireless location system AoA accuracy can be optimized by placing receiver antennae at the most advantageous locations.

Hybrid Location of the Mobile

The Untethered Wireless Location System (U-WLS) may be designed to support multiple, simultaneous positioning technologies. Every location technology has strengths and weaknesses. By combining the strengths of multiple technologies, the hybrid solution ensures high location performance regardless of the handset or environment. While the hybrid location solution can be configured with different types of handset and network-based location technologies (such as Cell ID (CID), Enhanced Cell ID (E-CID), time-of-arrival (TOA), power-difference-of-arrival (PDOA), time or power based single site ranging, Angle of Arrival (AOA), Uplink Time Difference of Arrival (U-TDOA), and Assisted Global Positioning Systems (A-GPS)) to meet the needs of the application, the optimum version in terms of accuracy, latency and yield, is to combine A-GPS with U-TDOA.

The A-GPS and U-TDOA version of the hybrid location solution can operate in two different ways. In fallback mode, A-GPS and U-TDOA locations are performed a serial or parallel arrangement, in which the location system calls on one method when the performance of the other has deteriorated due to environmental conditions. For example, U-TDOA would be the operative method in urban areas and indoors, where A-GPS produces lesser results or fails altogether. Conversely, A-GPS would be selected in extreme rural areas where it can produce very accurate results. The technology election can use predictive or historical data in the decision or the two technologies may operate in parallel and the best result returned. See U.S. Pat. Nos. 6,603,428, "Multiple Pass Location Processing"; U.S. Pat. No. 6,873,290, "Multiple pass location processor"; and U.S. Pat. No. 7,023,383, "Multiple pass location processor".

Secondly, two location technologies such as A-GPS and U-TDOA can operate simultaneously, and the results are mathematically combined the to obtain enhanced results. The combined location calculations produce location estimates at substantially higher accuracy than A-GPS or U-TDOA alone. See U.S. Pat. No. 7,440,762, "TDOA/GPS Hybrid Wireless Location System" and U.S. patent application Ser. No. 12/192,057, filed Aug. 14, 2008, "Hybrid GNSS and TDOA Wireless Location System". Combining multiple location technologies to leverage the benefits of each, the TruePosition Hybrid Location Solution can gain higher accuracy and consistency than any other single location technology.

Alternative Embodiments

As an alternative to the embodiments described above, a completely passive location system can be used and identification of mobile devices can be accomplished a at later time by receiving and demodulating unencrypted uplink and downlink control channel transmissions via a geographically distributed set of radio network monitors and locating the mobile device via TOA, UTDOA, AoA, CGI, CGI+TA, ECID or any combination thereof and storing this information in a database for further analysis. Mobiles devices operating on a commercial GSM network can be located when they access the wireless network without direct connection to the wireless network. Consider a local GSM network with a number of GSM BTSs distributed over a geographic area to provide wireless communications coverage. Geolocation of mobiles that access this GSM wireless network can be accomplished without a direct physical connection to the GSM network by deploying a network of interconnected Radio Network Monitors (RNM) (as introduced in U.S. patent application Ser. No. 11/150,414, filed Jun. 10, 2005, entitled "Advanced Triggers for Location Based Service Applications in a Wireless Location System,") throughout the same approximate coverage area. These RNMs discover all of the Access Grant Channels (AGCH) associated with the network by monitoring the downlink transmissions from the BTSs in the network. A mobile attempts to access the network by transmitting a RACH burst to a nearby BTS. If successful the BTS will respond to the mobile on its downlink with an Immediate Assignment Command on the AGCH. This downlink transmission is received and demodulated by the mobile as well as one or more of the RNMs. Information in the immediate assignment command permits the location system to receive the uplink transmission of the mobile on the Standalone Dedicated Control Channel (SDCCH) and use a multiplicity of techniques to locate the mobile.

Using the near-real time location estimation techniques already described in various patents owned by TruePosition, Inc. (the assignee of the present application), geolocation with AoA or UTDOA techniques is unaffected by encryption. Identification and location via cellular system techniques such as cell-ID and ECID of the mobile device is accomplished by recording the uplink and downlink SDCCH transmissions between the mobile and base stations and as received at a multiplicity of RNM sites. This information is stored in a database for further analysis and association with the U-TDOA or AoA location of mobile device.

Another alternative embodiment is where the RNM is equipped with database and decryption facilities so that the mobile device location and the decrypted identity information can be associated in near real-time and subsequent, traffic channel locations can be performed. In a typical GSM network only a portion of the transmissions from the BTS and mobiles are unencrypted. Once a mobile goes through the ciphering procedure with the BTS all of the information that it sends from then on will be encrypted. Specifically, the unique identifier of the mobile, IMSI, and the traffic channel information will be encrypted. This information can be decrypted but the decryption process generally creates some latency or time delay. Once the information has been decrypted the mobile can be followed to the traffic channel (TCH) where it can be located again with various location techniques. Again, this information can be stored in a database for further analysis.

Network Autonomous Location in Inoperative Wireless Communications Networks

In September 2001, TruePosition's technology got its first disaster response application in New York following the attacks of Sep. 11, 2001. This effort used TruePosition's TDOA equipment to locate mobile phones and devices on the Verizon AMPS and CDMA networks.

TruePosition personnel, working with emergency crews searching for victims at the site of the World Trade Center, used TruePosition's TDOA system to locate 1,600 cell phones, placing temporary receiving antennae and receivers amidst the rubble of the World Trade Center. Since that time, TruePosition has disclosed systems and methods for locating mobile devices from portable, mobile or aerial receiver stations. TruePosition's U.S. Pat. No. 7,427,952 "Augmentation of commercial wireless location system (WLS) with moving and/or airborne sensors for enhanced location accuracy and use of real-time overhead imagery for identification of wireless device locations," teaches such systems and methods and is incorporated herein via reference.

With the advanced capabilities offered by the present Network Autonomous WLS, an improved network autonomous emergency location system can be offered when the underlying network is partially or totally inoperative (such as in the Hurricane Katrina 2005 or Hurricane Ike 2008 incidents). While base stations may be required by the FCC (see Federal Communications Commission's ORDER ON RECONSIDERATION, #FCC 07-177, "*Recommendations of the Independent Panel Reviewing the Impact of Hurricane Katrina on Communications Networks*" Adopted: Oct. 2, 2007) to have eight hours of backup power, mobile phones can have days or even weeks of power in standby. This means that idle mobiles are available for location using a network autonomous wireless location to poll and locate said mobiles.

The following examples use aerial versions of the LMU, RNM and NE components as already described in this specification, but combinations of portable, permanent, and aerial LMU, RNM and NE components can also be used. As part of the emulated downlink beacon optimization (known as campaign planning), provisioning of the wireless communications network frequency plan into the network emulator from the cooperative wireless network operator's databases may be performed, allowing for the dynamic setting of frequencies, cell identities and location area codes transmitted by the network emulator within the downlink beacon.

Figure 12:
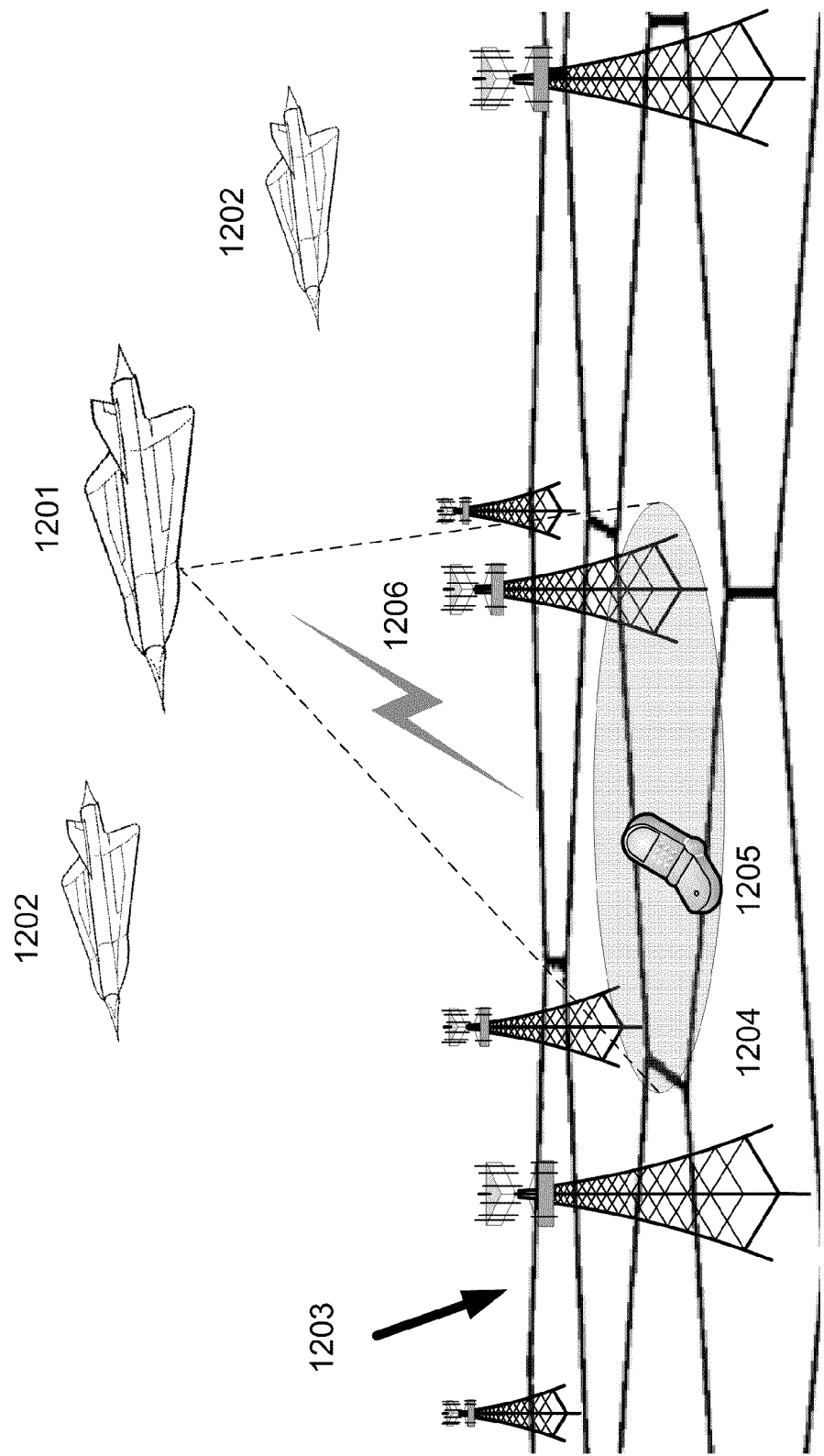
FIG. 12—Illustration of aerial polling of defunct wireless network for mobile location via TDOA, mobile-based GNSS techniques or TDOA with GNSS hybrids.

In FIG. 12, an aerial platform 1201 broadcasts the beacon (the beacon contents having been optimized to provoke a responsive uplink signal) toward the ground covered by the inoperative wireless communications network 1203, resulting in a coverage radio footprint 1204. Mobile devices 1205 within the radio footprint will attempt to register with the emulated network. This registration will be detected by both the unit bearing the NE 1201, but also the cooperating units 1202. LMU receivers on all units, so equipped and within range, 1201, 1202, will then perform a location estimation using TDOA, AoA, or hybrid methods.

Figure 13:
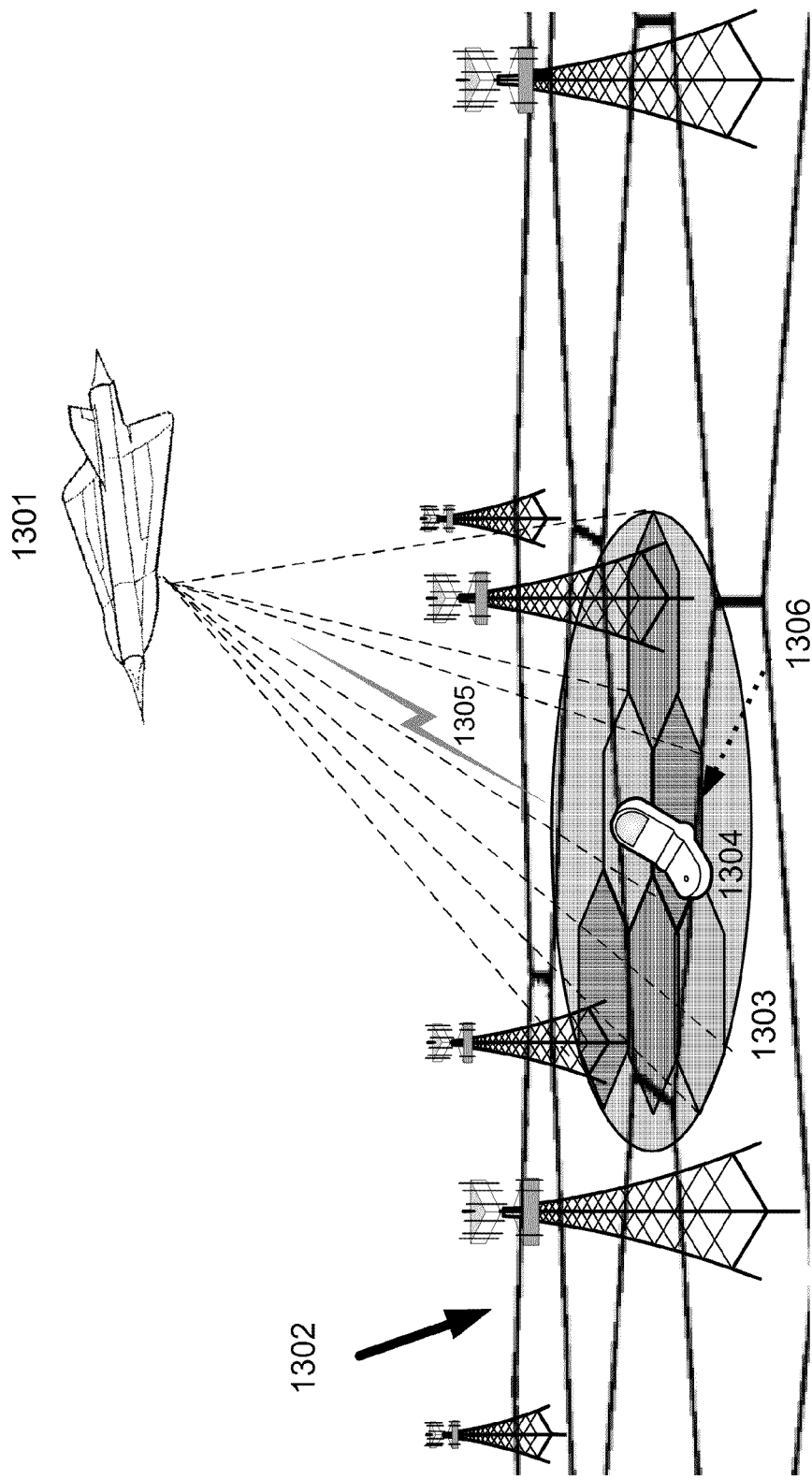
FIG. 13—Illustration of aerial polling of defunct wireless network for mobile location via beamforming.

In an alternative example, shown in FIG. 13, an aerial platform 1301 with beamforming capabilities is used. The beam forming capability may be part the downlink (beacon) transmission subsystem, the uplink receiver, or both the transmitter and receiver. Using beamforming for the beacon transmission, not only can the beacon differ in each beam within the radio footprint 1303, but the individual beam footprint 1306 may be used to localize the radio response 1305 from the mobile device 1304. The beamforming footprint localization can be used either with FDOA, TDOA or AoA techniques or in place of them if coupled with the RNM receiver's location triggering functionality and the location, speed, bearing and altitude of the receiver antennae. The emulated beacon, or beacons, in these two examples have been optimized to provoke a response from the mobile devices in the geographic area covered by the defunct wireless communications network 1302, for example campaign planning using carrier provided radio network topology maps or settings tables.

In another embodiment, involving mobile devices with on-board location system that do not rely on the wireless network broadcasts (such as one or more of the GNSS systems, e.g., GPS), the network emulator may be used to replace the radio data communications and the SMLC may be used to emulate land-side server components, allowing use of the mobile's on-board GNSS receiver for location.

Passive Network Autonomous Geolocation System

FIG. 14 shows an illustrative embodiment of a completely passive network autonomous geolocation system. The antenna/RF subsystem 1401 possesses antennas for reception of the wireless network's downlink and uplink signals as well as bandpass filtering and low noise amplifiers in the appropriate RF bands as well as distribution 1402 of the received signals to the receivers in the Radio Network Monitoring Subsystem 1403 and Wireless Location System 1404.

The radio network monitoring (RNM) subsystem 1403 scans the wireless network's RF band(s) for downlink frequencies. Once detected, the downlink frequencies are monitored for triggering information to locate mobiles with the Wireless Location System 1404. The untethered wireless location system 1404 locates mobiles with UTDOA and CGI+TA from triggering information provided by the radio network monitoring subsystem and/or the Location Applications Server 1410. Depending on the technology deployed, AoA or hybrid TDOA/AoA location techniques may be utilized by the wireless location system 1404.

Shown in FIG. 14 as independent, the radio network monitoring subsystem 1403 and the wireless location system 1404 may be deployed sharing common antennae and circuitry. The RNM 1403 and U-WLS 1404 combination 1405 is the preferred deployment option.

The backhaul subsystem provides transport of data to and from the remotely located network elements the remotely located network elements. The backhaul may consist of wired or wireless data communications or combinations thereof. As shown in FIG. 14, the RNM backhaul link 1406 may be separate from the WLS backhaul link 1407, but a single shared backhaul communications link is not precluded.

The database 1409 serves as a repository for network events captured by the radio network monitoring subsystem and locations calculated by the wireless location system. This includes the positions of base stations in the local wireless communications network developed from the downlink beacon transmissions. Applications that utilize the location information reside on the location application server 1410. For example, analysis of archived location information in the database may be performed to find specific mobiles, display real-time location information, etc.

The remote access gateway 1411 permits access to the system from remote terminals. Dependent on deployment, access controls may be applied. The OMA&P subsystem 1412 permits configuration and provisioning of the different network elements, health monitoring of network elements and display of alarm conditions.

The Packet Data Network 1408 may be a Local-area-network or Wide-area-network dependent on the deployment of the passive network autonomous geolocation system.

FIG. 15

The unique location of a mobile-of-interest (MOI) can be obtained with a Time-Of-Arrival (TOA) technique without use of LMUs if the distance from the MOI to three or more U-BTSs can be determined. The RNM component of the NAWLS is preferably incorporated into the physical and electronic U-BTS chassis, but in cases of isolated, highly attenuated indoor environments, or in non-covert deployments, the RNM can be deleted from the NAWLS. Deletion of the RNM will cause the NE to supply all location triggering.

The TOA location estimation can be performed in a network autonomous fashion through the use of Network Emulator (NE) with a group of distributed U-BTSs transceivers. In the process of sampling, acquisition and/or capture, a MOI utilizing time-division-multiple-access techniques (TDMA), e.g., GSM, the NE instructs the MOI to align its timing with the U-BTS TDMA framing. In GSM this is done with a timing advance (TA) parameter with an Immediate Assignment Command (IMM_ASS_CMD) from the NE via the U-BTS to the MOI. The TA value that the U-BTS determines and provides to the MOI is essentially a quantized distance measurement from the NE to the MOI.

Technical Specifications ETSI TS 05.10 and 3GPP TS 45.010 describe the TA value adjustment procedures. The TA value is normally between 0 and 63, with each step representing an advance of one symbol period (approximately 3.69 microseconds). With radio waves travelling at about 300,000, 000 meters per second (that is 300 meters per microsecond), one TA step then represents a change in round-trip distance (twice the propagation range) of about 1,100 meters. This means that the TA value changes for each 550-metre change in the range between a mobile and the base station.

The location of a mobile-of-interest (MOI) operating on a UMTS network can be obtained with a time-of-arrival (TOA) technique if the distance from the MOI to three or more Node Bs can be determined. This can be accomplished in a network autonomous fashion through the use of a group of distributed NEs that can emulate Node Bs. The measurement of the distance to the mobile from a sector of the Node B is a standard process in UMTS networks via the Round Trip Time (RTT) report. RTT is a standard Node B measurement that is performed on the Dedicated Physical Channel (DPCH) in UMTS. The Node B measures the time difference between the beginning of the Downlink (DL) (e.g. DPCH or CPICH) frame transmission and the reception of the corresponding Uplink (UL) Dedicated Physical Control Channel (DPCCH)/ Dedicated Physical Data Channel (DPDCH) frame from the first detected path. The RTT measurement possesses the latency of the UE which must be accounted for. This is accounted for by measuring the Rx-Tx time difference, which is measured by the UE and reported to the SRNC, and subtracted from the RTT measurement.

The MOI is captured from the commercial network by one of the NEs in the group of distributed NEs. The NE will make the first RTT measurement. The second RTT measurement can be accomplished by either forcing the captured MOI to do a hard handover to another NE or if the MOI is in soft, or softer handover, with another NE. more RTT measurements can be obtained. Once three or more RTT measurements have been made from three or more NE is the group of distributed NEs and location of the MOI can be determined.

Technical specification 3GPP 25.215 "*Technical Specification Group Radio Access Network; Physical layer—Measurements (FDD)*" section 5.2.8 defines the Round-Trip-Time (RTT) while Technical Specification 3GPP TS 25.305 "*3rd Generation Partnership Project; Technical Specification Group Radio Access Network; Stage 2 functional specification of User Equipment (UE) positioning in UTRAN*". Section 8 describes a method for using the RTT with the Cell-ID (CI) to determine a mobile's (a UE in UMTS terminology) location in a UMTS wireless communications system. The UMTS (UTRAN) W-CDMA air interface bandwidth is 5 MHz and W-CDMA operates at a high chip rate 3.84 Mcps/sec, which allows improved resolution in timing measurements as compared to GSM. The basic timing resolution of the RTT measurement in UMTS (as defined in 3GPP TS 25.133, "*Requirements for support of radio resource management (FDD)*" Section 9.2.8), with one sample per chip, is 260 nanoseconds which corresponds to a radio propagation distance granularity of ~78 m. Use of oversampling can be used to reduce the inherent inaccuracy of the RTT measurement steps; for example, an oversampling rate of 2× the chip rate (2×3.84 Mcps/second) yields an improved timing resolution of 130 nanoseconds which corresponds to propagation distances granularity of ~39 m.

Once one U-BTS, in a group of distributed U-BTSs under one or more NEs, has acquired the MOI it can hand the MOI over to another U-BTS, at a different but known location, and that U-BTS will provide the MOI an appropriate TA value as well. Repeating this process with 3 or more U-BTSs provides a sufficient number of distance measurements to determine the unique location of the MOI with a least squares solution.

Figure 15:
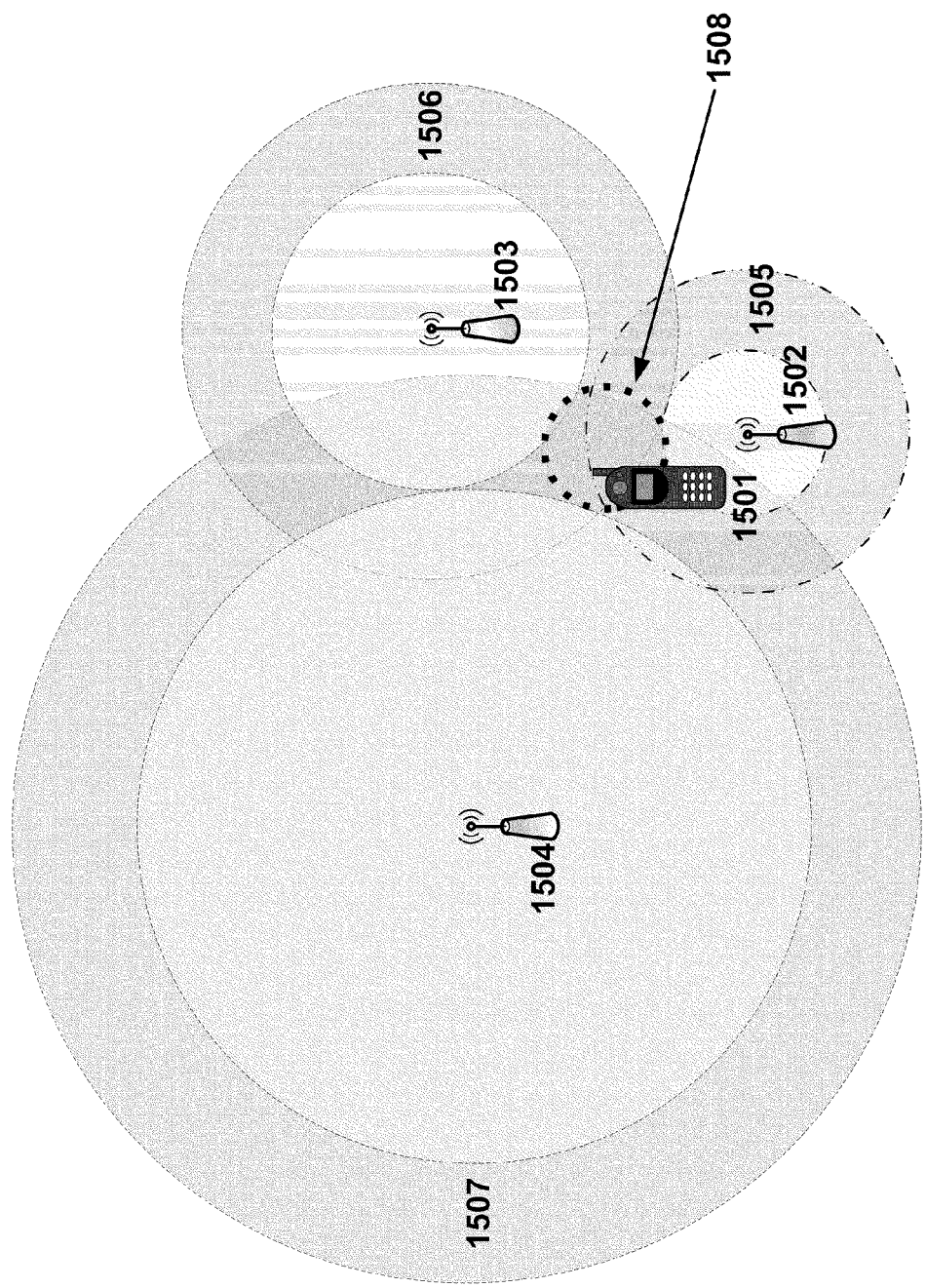
FIG. 15—Illustration of TOA location determination using distributed U-BTS transceiver stations in a single mode GSM wireless communication network.

In FIG. 15, an illustrative example is provided of the TOA location determination using the NE's distributed U-BTS transceiver stations in a single mode GSM wireless communication network. The mobile device (MD) 1501 is acquired and captured by the NE via the GSM Location Update procedure. Once the mobile device 1501 has been captured and a traffic channel assigned on the serving U-BTS 1502, the NE using the Handover Procedure. In the course of each handover, each U-BTS develops a radio time of flight estimate (known as Timing Advance in GSM). In geographic terms, the TA forms an annulus around the U-BTS.

The handover procedure is performed for at least 3 U-BTS sites up to the total number of U-BTSs deployed in the general proximity of the original acquiring U-BTS. In FIG. 5 for instance, the mobile device 1501 is acquired by U-BTS 1502 and a timing advance 1505 developed. The captured mobile is then handed-over to a second U-BTS 1503 and second timing advance 1506 developed. Handoff is then performed with a third U-BTS 1504 and a third timing advance 1507 developed.

Using the least squares method, a probability distribution function is constructed to determine the smallest possible search area for the MOI 1501 within a set probability, in this example figure (FIG. 15) shown as a circular error probability area 1508.

In a multi-mode network (e.g. GSM and UMTS), the NAWLS, equipped with a multi-mode Network Emulator can capture a collect a mobile via the well-known location update procedure, identified or handed over to GSM for identification and then be assigned a traffic channel either on the mimicked GSM network or handed off to the mimicked UMTS network. In a NAWLS deployment without LMUs, such as system with the described multiple handover and handoff procedure may be used to localize multi-mode mobile devices.

Conclusion

The true scope the present invention is not limited to the presently preferred embodiments disclosed herein. For example, the foregoing disclosure of a presently preferred embodiment of a Wireless Location System uses explanatory terms, which should not be construed so as to limit the scope of protection of the following claims, or to otherwise imply that the inventive aspects of the NAWLS are limited to the particular methods and apparatus disclosed. Moreover, as will be understood by those skilled in the art, many of the inventive aspects disclosed herein may be applied in location systems that are not based on currently standardized techniques such as U-TDOA, cell-ID and A-GPS. For example, the invention is not limited to systems employing receivers constructed as described above. The receivers, network emulators, network controllers and radio network monitors are, in essence, programmable data collection and processing devices that could take a variety of forms and combinations without departing from the inventive concepts disclosed herein. Given the rapidly declining cost of digital signal processing and other processing functions, it is easily possible, for example, to transfer the processing for a particular function from one of the functional elements described herein to another functional element without changing the inventive operation of the system. In certain cases, the specific implementation of a functional element described herein is merely a designer's preference and not a hard requirement. Accordingly, except as they may be expressly so limited, the scope of protection of the following claims is not intended to be limited to the specific embodiments described above.

We claim:

1. A network autonomous wireless location system (NAWLS) configured to locate a mobile device having a wireless communications transceiver for communicating with a wireless communications network (WCN), comprising:
 a) a radio network monitor (RNM) configured to passively monitor two or more radio air interfaces;
 b) a network emulator (NE) configured to emulate one or more WCN, said one or more WCN possessing one or more radio air interfaces; and
 c) an untethered wireless location system (U-WLS), said U-WLS comprising a plurality of mobile receiver sites, wherein each of said mobile receiver sites includes a receiver configured to receive uplink radio signals from said mobile device, and means for determining a precise location and velocity for the mobile receiver site, said U-WLS configured to determine a precise location and velocity of the mobile device from radio signal information received by said plurality of mobile receiver sites;
 wherein said U-WLS is connected to the NE via a digital data link, and wherein said U-WLS is configured to use said digital data link to inform the NE that a location has been completed, that additional power is needed to locate the mobile device, that an inter-RAT (radio access technology) handoff is needed, and/or that allocation to a traffic channel is needed.

2. A network autonomous wireless location system (NAWLS) configured to locate a mobile device having a wireless communications transceiver for communicating with a wireless communications network (WCN), comprising:
 a) a radio network monitor (RNM) configured to passively monitor two or more radio air interfaces;
 b) a network emulator (NE) configured to emulate one or more WCN, said one or more WCN possessing one or more radio air interfaces; and
 c) an untethered wireless location system (U-WLS), said U-WLS comprising a plurality of mobile receiver sites, wherein each of said mobile receiver sites includes a receiver configured to receive uplink radio signals from said mobile device, and means for determining a precise location and velocity for the mobile receiver site, said U-WLS configured to determine a precise location and velocity of the mobile device from radio signal information received by said plurality of mobile receiver sites;
 wherein said NE is connected to the U-WLS via a digital data link, and wherein said NE is configured to use said digital data link to trigger and task the U-WLS to perform a location based on a Network Transaction trigger.

3. A system as recited in claim 2, wherein said digital data link is further configured for use by the U-WLS and NE to employ on-board location technology resident on the mobile device.

4. A network autonomous wireless location system (NAWLS) configured to locate a mobile device having a wireless communications transceiver for communicating with a wireless communications network (WCN), comprising:
 a) a radio network monitor (RNM) configured to passively monitor two or more radio air interfaces;
 b) a network emulator (NE) configured to emulate one or more WCN, said one or more WCN possessing one or more radio air interfaces; and
 c) an untethered wireless location system (U-WLS), said U-WLS comprising a plurality of mobile receiver sites, wherein each of said mobile receiver sites includes a receiver configured to receive uplink radio signals from said mobile device, and means for determining a precise location and velocity for the mobile receiver site, said U-WLS configured to determine a precise location and velocity of the mobile device from radio signal information received by said plurality of mobile receiver sites;
 wherein said RNM comprises a passive software defined radio receiver configured to receive uplink and downlink transmissions from the mobile device, the radio access network (RAN) and the NE.

5. A network autonomous wireless location system (NAWLS) configured to locate a mobile device having a wireless communications transceiver for communicating with a wireless communications network (WCN), comprising:
   a) a radio network monitor (RNM) configured to passively monitor two or more radio air interfaces;
   b) a network emulator (NE) configured to emulate one or more WCN, said one or more WCN possessing one or more radio air interfaces; and
   c) an untethered wireless location system (U-WLS), said U-WLS comprising a plurality of mobile receiver sites, wherein of each said mobile receiver sites includes a receiver configured to receive uplink radio signals from said mobile device, and means for determining a precise location and velocity for the mobile receiver site, said U-WLS configured to determine a precise location and velocity of the mobile device from radio signal information received by said plurality of mobile receiver sites;
   wherein said NE comprises a set of transceivers and servers and is connected to the U-WLS via a digital data link allowing the NE to task the U-WLS to locate the mobile device when said mobile device is involved in a network transaction.

6. A system as recited in claim 5, wherein said digital data link includes a wireless connection, and wherein said network transaction includes messaging for at least one member of the following group: Mobile Origination, Mobile Termination, Location Update, Cell Change Command, AnyTimeInterrogation, SMS Origination, SMS Termination, Periodic Registration, and Identity Request.

7. A network autonomous wireless location system (NAWLS) configured to locate a mobile device having a wireless communications transceiver for communicating with a wireless communications network (WCN), comprising:
   a) a radio network monitor (RNM) configured to passively monitor two or more radio air interfaces;
   b) a network emulator (NE) configured to emulate one or more WCN, said one or more WCN possessing one or more radio air interfaces; and
   c) an untethered wireless location system (U-WLS), said U-WLS comprising a plurality of mobile receiver sites, wherein each of said mobile receiver sites includes a receiver configured to receive uplink radio signals from said mobile device, and means for determining a precise location and velocity for the mobile receiver site, said U-WLS configured to determine a precise location and velocity of the mobile device from radio signal information received by said plurality of mobile receiver sites;
   wherein said RNM is connected to said NE via a digital data link allowing the RNM to inform the NE of broadcast control channel (BCCH) frequency, power levels and informational content.

8. A system as recited in claim 7, wherein said RNM is further configured to monitor NE-emulated downlink beacons and second mobile uplink and downlink signals to detect interference and to cause the NE to reduce a broadcast radio power level and to reduce power levels of emulated uplink and downlink signals.

9. A system as recited in any one of claims 1, 2, 4, 5 and 7, wherein said precise location includes a longitude, latitude and altitude.

10. A system as recited in any one of claims 1, 2, 4, 5 and 7, wherein each of the means for determining a precise location and velocity of the mobile receiver site comprises a global navigation satellite system (GNSS) receiver configured to receive GNSS signals.

11. A system as recited in any one of claims 1, 2, 4, 5 and 7, wherein said mobile receiver sites further comprise antennae and receivers configured to receive global navigation satellite system (GNSS) signals for the purpose of time synchronization.

12. A system as recited in any one of claims 1, 2, 4, 5 and 7, wherein said mobile receiver sites further comprise antennae and receivers configured to receive global navigation satellite system (GNSS) signals for the purpose of frequency synchronization.

13. A system as recited in any one of claims 1, 2, 4, 5 and 7, said mobile receiver sites further comprise antennae and receivers configured to receive global navigation satellite system (GNSS) signals for the purpose of determining the location of the mobile receiver site.

14. A system as recited in any one of claims 1, 2, 4, 5 and 7, wherein each of the means for determining a precise location and velocity of the mobile receiver site comprises a radio receiver configured to receive terrestrial radio broadcast timing signals.

15. A system as recited in any one of claims 1, 2, 4, 5 and 7, wherein said mobile receiver sites further comprise antennae and receivers configured to receive radio broadcast timing signals for the purpose of time synchronization.

16. A system as recited in any one of claims 1, 2, 4, 5 and 7, wherein said mobile receiver sites further comprise antennae and receivers configured to receive radio broadcast timing signals for the purpose of frequency synchronization.

17. A system as recited in any one of claims 1, 2, 4, 5 and 7, wherein said mobile receiver sites further comprise antennae and receivers configured to receive radio broadcast timing signals for the purpose of determining the location of the mobile receiver site.

18. A system as recited in any one of claims 1, 2, 4, 5 and 7, wherein said radio air interfaces comprise a first radio access network (RAN) technology and a second RAN technology.

19. A system as recited in any one of claims 1, 2, 4, 5 and 7, wherein said NE is configured to supply, on an individual mobile device basis, a second mobile uplink and downlink signaling paths to the mobile device, for use in cases where a traffic/data channel allocation is necessary to identify, locate or silence the mobile device.

20. A system as recited in any one of claims 1, 2, 4, 5 and 7, wherein said RNM comprises a set of receivers and is connected to the U-WLS via a digital data link allowing the RNM to task the U-WLS to locate the mobile device when said mobile device is involved in a radio transaction.

21. A system as recited in any one of claims 1, 2, 4, 5 and 7, wherein said radio air interfaces include first and second downlink beacons, wherein said first and second downlink beacons comprise broadcast control channel (BCCH) beacons.

22. A system as recited in claim 21, wherein said first downlink beacon comprises a first radio access network (RAN) technology and said second downlink beacon comprises a second RAN technology.

23. A system as recited in claim 22, wherein said first RAN technology comprises GSM and said second RAN technology comprises at least one of UMTS, LTE, WiMAX, and CDMA.

24. A system as recited in any one of claims 1, 2, 4, 5 and 7, wherein said radio air interfaces comprise a first radio access network (RAN) technology, a second RAN technology and an emulated radio air interface.

25. A system as recited in claim 24, wherein said emulated radio air interface comprises a first radio access network (RAN) technology and a second RAN technology.

26. A system as recited in any one of claims 1, 2, 4, 5 and 7, wherein said NE is configured to provide an independent wireless communications network, emulating both a radio access network (RAN) and a core network (CN).

27. A system as recited in claim 26, wherein said NE is further configured to provide an emulated downlink beacon.

28. A system as recited in claim 27, wherein said emulated downlink beacon is configured to actively acquire the mobile device.

29. A system as recited in any one of claims 1, 2, 4, 5 and 7, wherein said U-WLS provides at least one of the following location technologies to locate the mobile device using uplink transmissions from the mobile device: Time-of-Arrival (TOA), uplink time-difference-of-arrival (U-TDOA), angle-of-arrival (AoA), and hybrid TDOA/AoA location technologies.

30. A system as recited in claim 29, wherein said U-WLS is further configured to provide location server functionality for handset-based location techniques.

31. A system as recited in claim 30, wherein said handset-based location techniques include at least one member of the following group:
Enhanced-Observed-Time-Difference (E-OTD), Observed-Time-Difference-of-Arrival (OTDOA), Assisted Global Navigation Satellite System (A-GNSS), and a hybrid technique including U-TDOA/A-GNSS.

32. A system as recited in claim 31, wherein said A-GNSS is the Navstar Global Positioning System.

33. A system as recited in any one of claims 1, 2, 4, 5 and 7, comprising an aerial component providing radio relay service between mobile cell sites.

34. A system as recited in claim 33, wherein said aerial component further provides airborne imaging.

35. A system as recited in claim 33, wherein said aerial component further serves as a mobile cell site platform providing extended coverage and three dimensional receiver diversity for location calculation.

36. A system as recited in claim 33, wherein said aerial component further serves as a mobile cell site platform providing extended coverage and three dimensional receiver diversity for location and velocity calculation.

37. A system as recited in any one of claims 1, 2, 4, 5 and 7, further comprising means for adjusting the transmission power of the NE to minimize interference while optimizing broadcast power.

38. A system as recited in claim 37, further comprising means for adjusting transmitted information.

39. A system as recited in claim 38, wherein the means for adjusting the transmitted information enables optimization of the rate of mobile device signal sampling by balancing sampling network capabilities while minimizing communication network impacts.

40. A method for locating a mobile device having a wireless communications transceiver for communicating with a local wireless communications network including a radio access network (RAN) and a core network (CN), comprising:
using a network autonomous wireless location system (NAWLS) to collect mobile-specific information, including temporary and permanent identifiers, via radio messaging without using a wired connection to the local wireless communications network; and
locating said mobile device using uplink signals transmitted by said mobile device;
wherein said NAWLS comprises a network of interconnected network emulators (NEs) configured for capturing a GSM mobile from an operating commercial GSM network by emulating said network, determining the distance that the captured GSM mobile is from a first NE via the timing advance (TA) parameter, handing over the captured GSM mobile to a second NE, determining the distance that the captured GSM mobile is from the second NE via the TA parameter, handing over the captured GSM mobile to a third NE, determining the distance that the captured GSM mobile is from the third NE via the TA parameter, and determining the location of the captured mobile with a time-of-arrival (TOA) geolocation technique.

41. A method for locating a mobile device having a wireless communications transceiver for communicating with a local wireless communications network including a radio access network (RAN) and a core network (CN), comprising:
using a network autonomous wireless location system (NAWLS) to collect mobile-specific information, including temporary and permanent identifiers, via radio messaging without using a wired connection to the local wireless communications network; and
locating said mobile device using uplink signals transmitted by said mobile device;
wherein said NAWLS comprises a network of interconnected network emulators (NEs) configured for capturing a UMTS mobile from an operating GSM network by emulating said network, determining the distance that the captured UMTS mobile is from a first NE via the Round Trip Time (RTT) parameter modified by a Rx-Tx time from the captured UMTS mobile, determining the distance that the captured UMTS mobile is from a second NE from another RTT parameter when the captured UMTS mobile is in soft handover or is handed over to a second NE, determining the distance that the captured UMTS mobile is from a third NE from another RTT parameter when the captured mobile is in soft handover or is handed over to the third NE, and determining the location of the captured UMTS mobile with a time-of-arrival (TOA) geolocation technique.

42. A method for locating a mobile device having a wireless communications transceiver for communicating with a local wireless communications network including a radio access network (RAN) and a core network (CN), comprising:
using a network autonomous wireless location system (NAWLS) to collect mobile-specific information, including temporary and permanent identifiers, via radio messaging without using a wired connection to the local wireless communications network; and
locating said mobile device using uplink signals transmitted by said mobile device;
wherein said NAWLS includes an untethered wireless location system (U-WLS) comprising a set of geographically distributed receivers and mobile location servers coupled with one or more network emulator (NE) transceivers, and said U-WLS is employed to determine the identity and location of mobile GSM and multi-mode mobile devices without physical connection to the local wireless communications network.

43. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising capturing a GSM mobile phone from an operating commercial GSM wireless network by emulating said network, causing a successful Location Update and providing false paging channel and neighbor cell information while determining the location of said GSM mobile phone by geolocating on a Location Update control channel transmission of said mobile phone.

44. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising acquiring a GSM mobile phone from an operating commercial GSM wireless network by emulating said network and determining the location, speed and heading of said GSM mobile phone by geolocating on a Location Update control channel transmission of said mobile phone.

45. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising acquiring a GSM mobile phone from an operating commercial GSM wireless network by emulating said network and determining the identity, TMSI, IMSI and IMEI, of said mobile phone through the use of an Identity Request ($Iden_{13}Reg$) message.

46. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising denying wireless service to a GSM mobile phone from an operating commercial GSM wireless network by emulating said network, capturing said mobile phone, determining the identity of said mobile phone, and assigning said mobile phone to a silent traffic channel.

47. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising denying wireless service to a GSM mobile phone from an operating commercial GSM wireless network by emulating said network, capturing said mobile phone, determining the location of said mobile phone, determining that the mobile phone is in a defined cold zone geographic area, and putting said mobile phone on a silent traffic channel.

48. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising determining whether to deny wireless service to a GSM mobile phone from an operating commercial GSM wireless network by emulating said network, capturing said mobile phone, determining the location of said mobile phone, verifying said mobile phone is located in a cold zone, determining the identity of said mobile phone, checking to see if the identifying information of said mobile phone is on an allowed list and putting said mobile phone on a silent traffic channel if the identifying information of said mobile phone is not on an allowed list.

49. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising locating a GSM mobile phone on a traffic channel (TCH) serviced by an operating commercial GSM wireless network, without direct physical connection to said GSM network by emulating said network, capturing said mobile phone, assigning said mobile phone to a silent traffic channel, and determining the location of said mobile phone on the traffic channel with time-of-arrival (TOA), power-of-arrival (POA), uplink-time-difference-of-arrival (U-TDOA), angle-of-arrival (AoA), enhanced Cell-ID (ECID), power-difference-of-arrival (PDOA), cell/sector ID with timing advance (CGI+TA), or any combination thereof.

50. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising locating a GSM mobile phone operating on a GSM network, wherein said mobile phone comprises a GPS or AGPS receiver, by emulating said GSM network, capturing said mobile phone, assigning said mobile phone to a silent traffic channel, and requesting the position of said mobile phone from the internal GPS or AGPS receiver of said mobile phone.

51. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising determining the location of a mobile phone operating on a commercial UMTS network without a direct physical connection to said network by emulating said network and determining the location of said mobile phone by geolocating on a Location Update control channel transmission of said mobile phone.

52. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising determining the identity of a UMTS/GSM mobile phone operating on a UMTS/GSM network without physical connection to that network by emulating the UMTS/GSM network, capturing said mobile phone, commanding said mobile phone to move to the emulated UMTS/GSM network, and determining the mobile identity of said mobile phone with an Identity Request ($Iden_{13}Req$) command.

53. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising denying wireless service to a UMTS/GSM mobile phone from an operating commercial UMTS/GSM wireless network without a physical connection to any wireless network by emulating said UMTS/GSM network, capturing said mobile phone, commanding said mobile phone to move to the emulated UMTS/GSM network, determining the identity of said mobile phone, and assigning said mobile phone to a silent traffic channel.

54. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising determining the location of a mobile phone operating on a commercial UMTS or GSM network without a direct physical connection to said network by emulating said network and determining the location of said mobile phone by geolocating on a Location Update control channel transmission of said mobile phone, commanding the mobile phone to move to an emulated UMTS or GSM network, moving said mobile phone to a UMTS or GSM traffic channel and geolocating said mobile phone again.

55. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising locating a UMTS/GSM mobile phone operating on a UMTS network, wherein said mobile phone comprises a GPS or AGPS receiver, by emulating said UMTS network, capturing said mobile phone, commanding said mobile phone to move to an emulated UMTS network, assigning said mobile phone to a silent traffic channel, and requesting the position of said mobile phone from the internal GPS or AGPS receiver of said mobile phone.

56. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising receiving and demodulating uplink transmissions from wireless devices operating on GSM networks, both unencrypted and encrypted, and storing said transmissions to a high speed database for further analysis.

57. A method for locating a mobile device having a wireless communications transceiver for communicating with a local wireless communications network including a radio access network (RAN) and a core network (CN), comprising:

using a network autonomous wireless location system (NAWLS) to collect mobile-specific information, including temporary and permanent identifiers, via radio messaging without using a wired connection to the local wireless communications network; and locating said mobile device using uplink signals transmitted by said mobile device; and further comprising locating a GSM mobile phone on a traffic channel in a GSM network without any physical connection to said network by receiving and demodulating uplink and downlink transmissions from said mobile phone and said GSM network, storing said transmissions to a database, decrypting appropriate demodulated transmissions, and locating said mobile phone with decrypted information via time-of-arrival (TOA), power-of-arrival (POA), uplink-time-difference-of-arrival (U-TDOA), angle-of-arrival (AoA), enhanced Cell-ID (ECID), power-difference-of-arrival (PDOA), cell/sector ID with timing advance (CGI+TA), or any combination thereof.

58. A method as recited in any one of claims 40, 41, 42, 43, 44, 45, 46, 47, 48, 49, 50, 51, 52, 53, 54, 55, 56 and 57, wherein said NAWLS is operated to minimize disruption of the local wireless communications network by monitoring the local wireless communications network and NE and adjusting NE transmissions and parameters as needed.

59. A method as recited in any one of claims 40, 41, 42, 43, 44, 45, 46, 47, 48, 49, 50, 51, 52, 53, 54, 55, 56 and 57, wherein the NAWLS is used to generate ad hoc geo-fenced areas.

60. A method as recited in any one of claims 40, 41, 42, 43, 44, 45, 46, 47, 48, 49, 50, 51, 52, 53, 54, 55, 56 and 57, further comprising generating ad hoc quiet zones where subscriber service is limited or denied.

* * * * *

UNITED STATES PATENT AND TRADEMARK OFFICE
CERTIFICATE OF CORRECTION

PATENT NO. : 8,213,957 B2  Page 1 of 1
APPLICATION NO. : 12/428325
DATED : July 3, 2012
INVENTOR(S) : Jeffrey F. Bull et al.

It is certified that error appears in the above-identified patent and that said Letters Patent is hereby corrected as shown below:

In the Claims

Column 39, line 15, at claim 5, line 13, delete "of each" and insert --each of-- therefor.

Column 43, line 48, at claim 45, line 16, delete "($Iden_{13}Reg$)" and insert --($Iden\_Req$)-- therefor.

Column 45, line 50, at claim 52, line 19, delete "($Iden_{13}Req$)" and insert --($Iden\_Req$)-- therefor.

Signed and Sealed this
Twenty-fourth Day of June, 2014

Michelle K. Lee
*Deputy Director of the United States Patent and Trademark Office*